United States Patent [19]

Rudewicz et al.

[11] Patent Number: 5,688,423
[45] Date of Patent: Nov. 18, 1997

[54] VENDING MACHINE INCLUDING MULTIPLE HEAT SOURCES WITH PROGRAMMABLE COOK CYCLES

[75] Inventors: Paul T. Rudewicz, Mission Viejo; Thom Thomas, Ventura; James W. Bradfield, Mill Valley, all of Calif.

[73] Assignee: KRh Thermal Systems, So. San Francisco, Calif.

[21] Appl. No.: 299,927

[22] Filed: Aug. 31, 1994

[51] Int. Cl.⁶ .................................................. H05B 1/02
[52] U.S. Cl. .................... 219/501; 219/506; 219/486; 219/679; 221/150 HC; 221/150 A; 221/9
[58] Field of Search .................................. 219/451, 452, 219/501, 506, 497, 508, 509, 714, 483, 679, 486; 221/6, 150 HC, 155, 174–178, 150 A, 1, 2, 9

[56] References Cited

U.S. PATENT DOCUMENTS

| | | | |
|---|---|---|---|
| 2,497,718 | 2/1950 | Early et al. | 221/11 X |
| 2,890,781 | 6/1959 | Gore . | |
| 3,857,420 | 12/1974 | Newman | 221/224 X |
| 3,884,213 | 5/1975 | Smith | 126/21 A |
| 3,951,303 | 4/1976 | Hobden et al. | 221/96 |
| 4,057,171 | 11/1977 | Hatori et al. | 221/6 |
| 4,109,825 | 8/1978 | Weitzman | 221/14 |
| 4,338,911 | 7/1982 | Smith | 126/21 A |
| 4,398,651 | 8/1983 | Kumpfer | 221/6 |
| 4,409,453 | 10/1983 | Smith | 219/10.55 A |
| 4,456,148 | 6/1984 | Newman et al. | 221/132 |
| 4,480,764 | 11/1984 | Takagi et al. | 221/11 |
| 4,492,839 | 1/1985 | Smith | 219/10.55 R |
| 4,632,274 | 12/1986 | Garbe | 221/132 A |
| 4,679,542 | 7/1987 | Smith et al. | 126/21 A |
| 4,816,635 | 3/1989 | Edamura | 219/10.55 B |
| 4,945,216 | 7/1990 | Tanabe et al. | 235/462 |
| 4,991,739 | 2/1991 | Levasseur | 221/14 |
| 5,011,042 | 4/1991 | Bunce et al. | 219/10.55 E |
| 5,077,462 | 12/1991 | Newell et al. | 235/381 |
| 5,127,544 | 7/1992 | Robinson et al. | 221/150 R X |
| 5,131,841 | 7/1992 | Smith et al. | 432/59 |
| 5,147,994 | 9/1992 | Smith et al. | 219/10.55 |
| 5,163,356 | 11/1992 | Chigira | 99/282 |
| 5,207,351 | 5/1993 | Lesar | 221/224 X |
| 5,209,373 | 5/1993 | Gondek et al. | 221/150 HC |
| 5,210,387 | 5/1993 | Smith et al. | 219/10.55 M |
| 5,219,092 | 6/1993 | Morand | 221/191 X |
| 5,310,978 | 5/1994 | Smith et al. | 219/681 |
| 5,344,046 | 9/1994 | Maldanis et al. | 222/2 |
| 5,367,949 | 11/1994 | Nitschke et al. | 99/334 |

FOREIGN PATENT DOCUMENTS

| | | |
|---|---|---|
| 0339806 | 11/1989 | European Pat. Off. . |
| 2 667 421 | 4/1992 | France . |
| 2675931 | 10/1992 | France . |
| 1 236 996 | 3/1967 | Germany . |
| 2209331 | 5/1989 | United Kingdom . |

OTHER PUBLICATIONS

"New Drive Provides Smooth Indexing Motion", Theodore Weber, Machine Design, Jul. 9, 1993, pp. 46–50.

*Primary Examiner*—Mark H. Paschall
*Attorney, Agent, or Firm*—Skjerven, Morrill, MacPherson, Franklin & Friel; David E. Steuber; Omkar K. Suryadevara

[57] ABSTRACT

In accordance with the present invention, a vending machine has one or more programmable cook cycles for use with one or more heat sources in cooking a food package to be dispensed to the customer. In one embodiment of this invention, each cook cycle includes a start time and a duration. Each cook cycle is associated with a heat source and a product code indicating the type of food to be cooked. Initially, cook cycles are copied into a random access memory from default cook cycles hard coded in the software program code and stored in electrically erasable programmable read only memory (EEPROM) of the vending machine controller. The cook cycles in RAM can be over written by an operator for the various type of foods to be cooked. The cook cycles in RAM are used by the vending machine to automatically cook a food product selected by a customer, without any further inputs.

38 Claims, 47 Drawing Sheets

Microfiche Appendix Included
(3 Microfiche, 285 Pages)

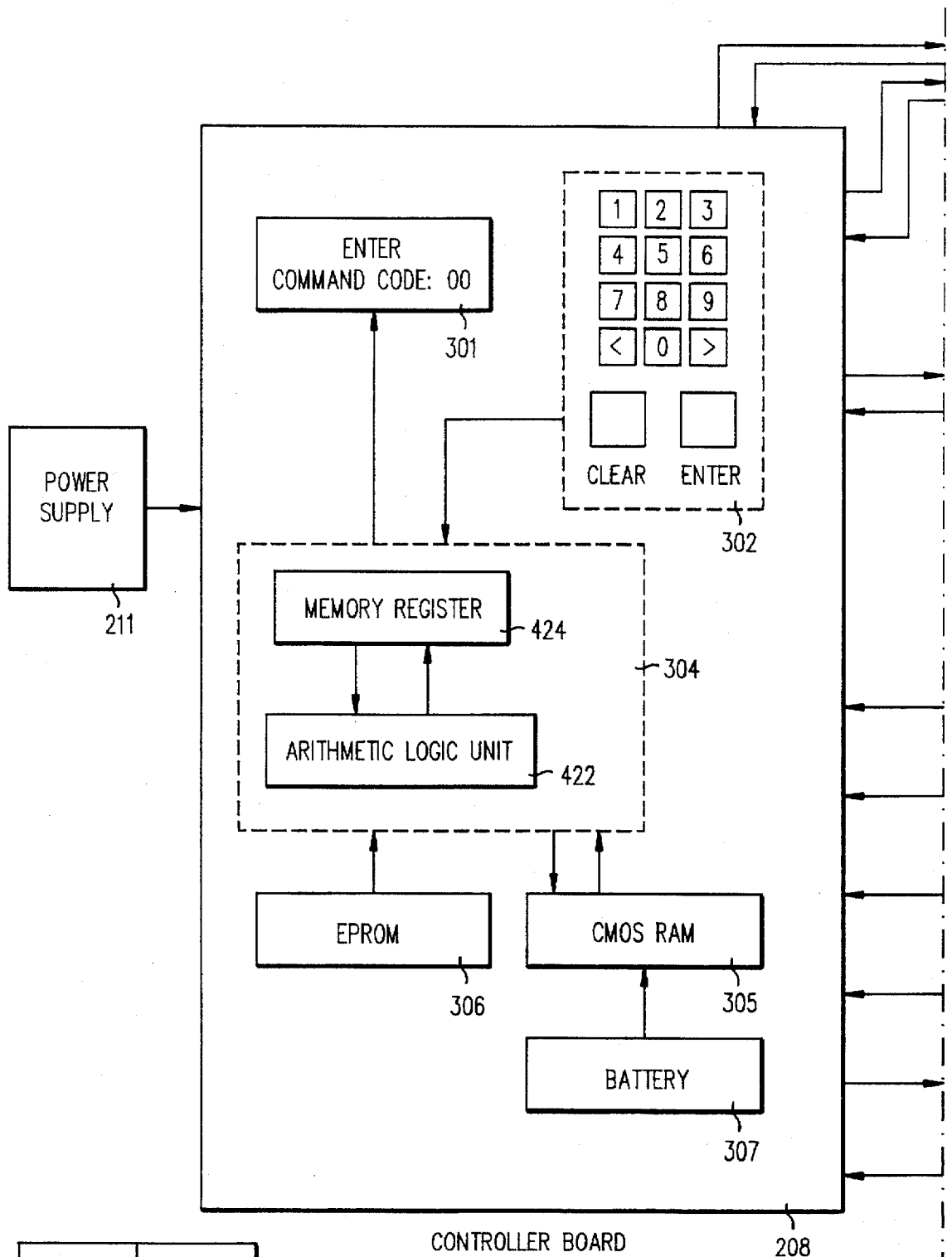
FIG. 4A1

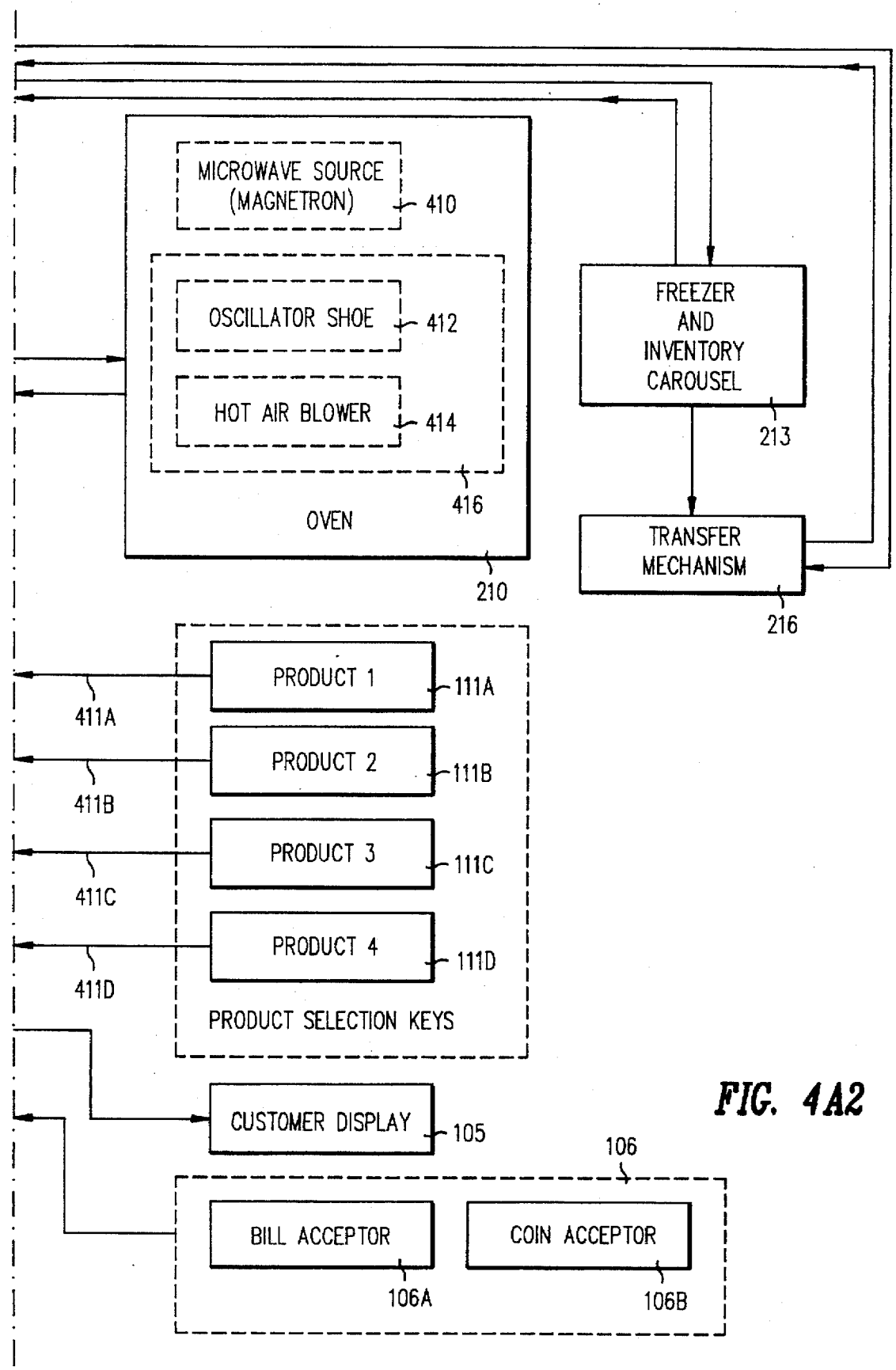
FIG. 4A2

ENTER COMMAND CODE: 00

Enter Product Code: 01

Select Source to Pgm:
1: Microwave  2: Hot Air

Product: 1  Source: MW
Program Which Cycle?  _

Product: 1  Source: MW
On at 0:0Q   On for 0:40

Product: 1  Source: MW
On at 0:00   On for 0:4Q

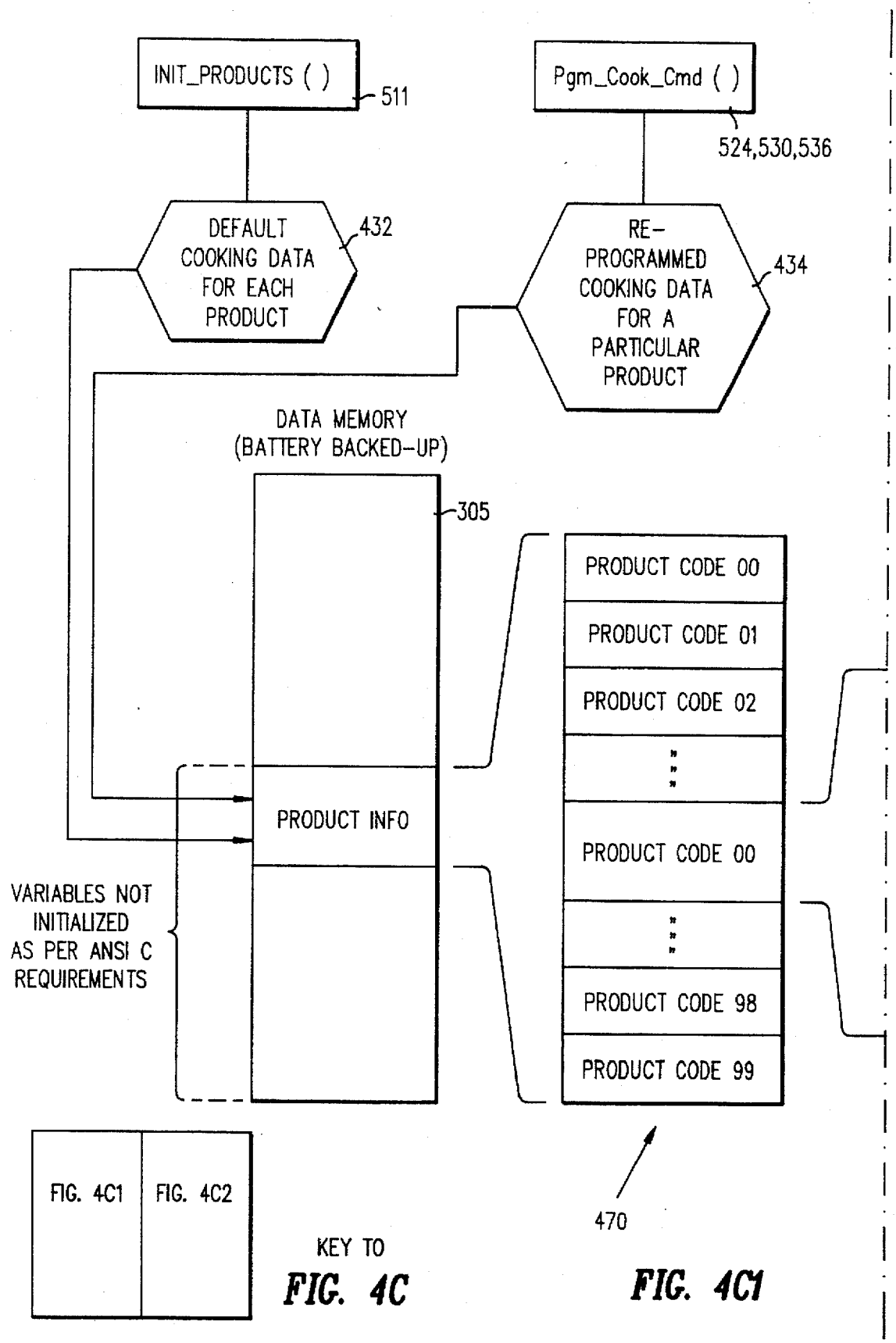

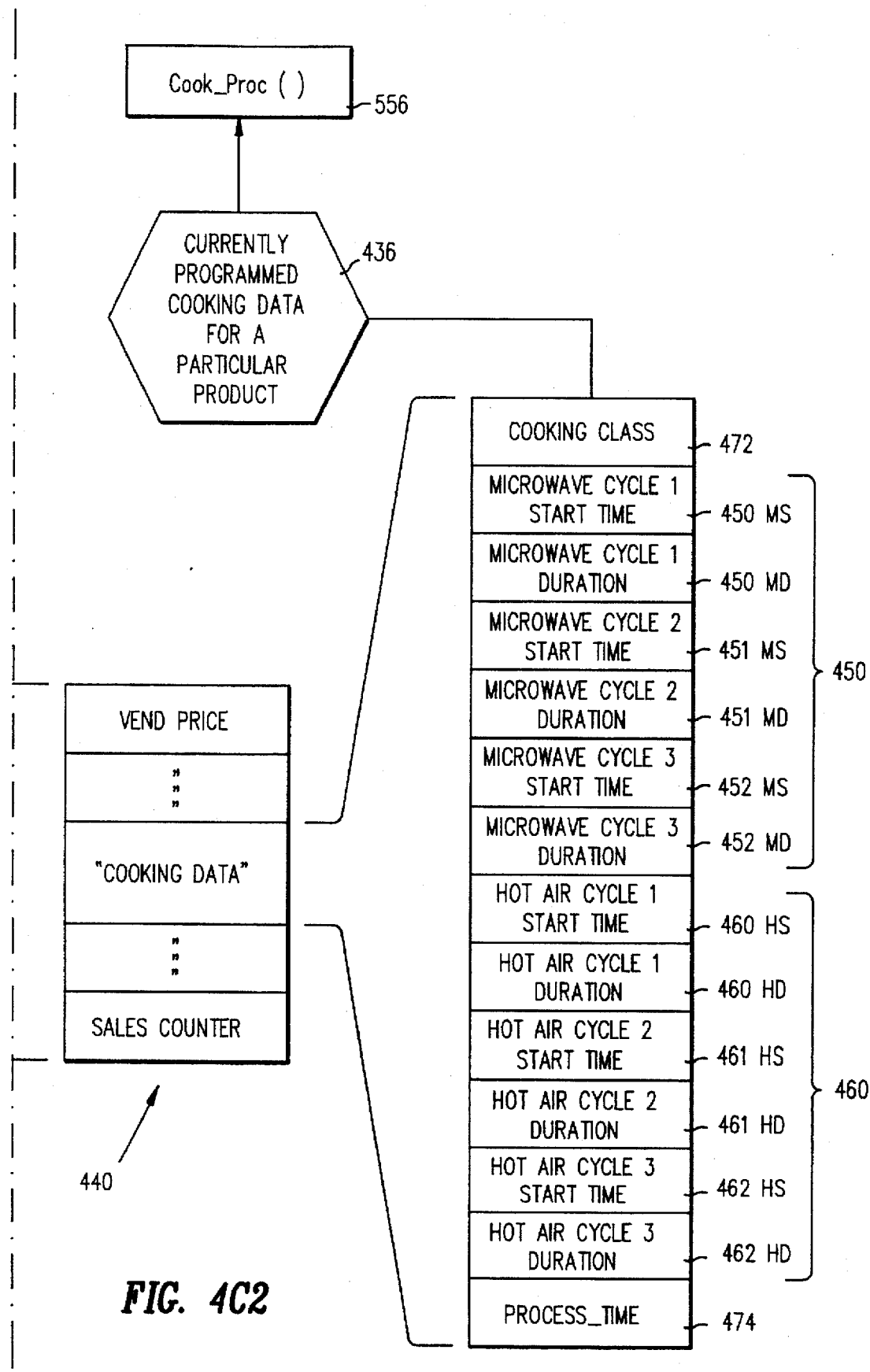
FIG. 4C2

KEY TO FIG. 8

| FIG. 8A | FIG. 8B |

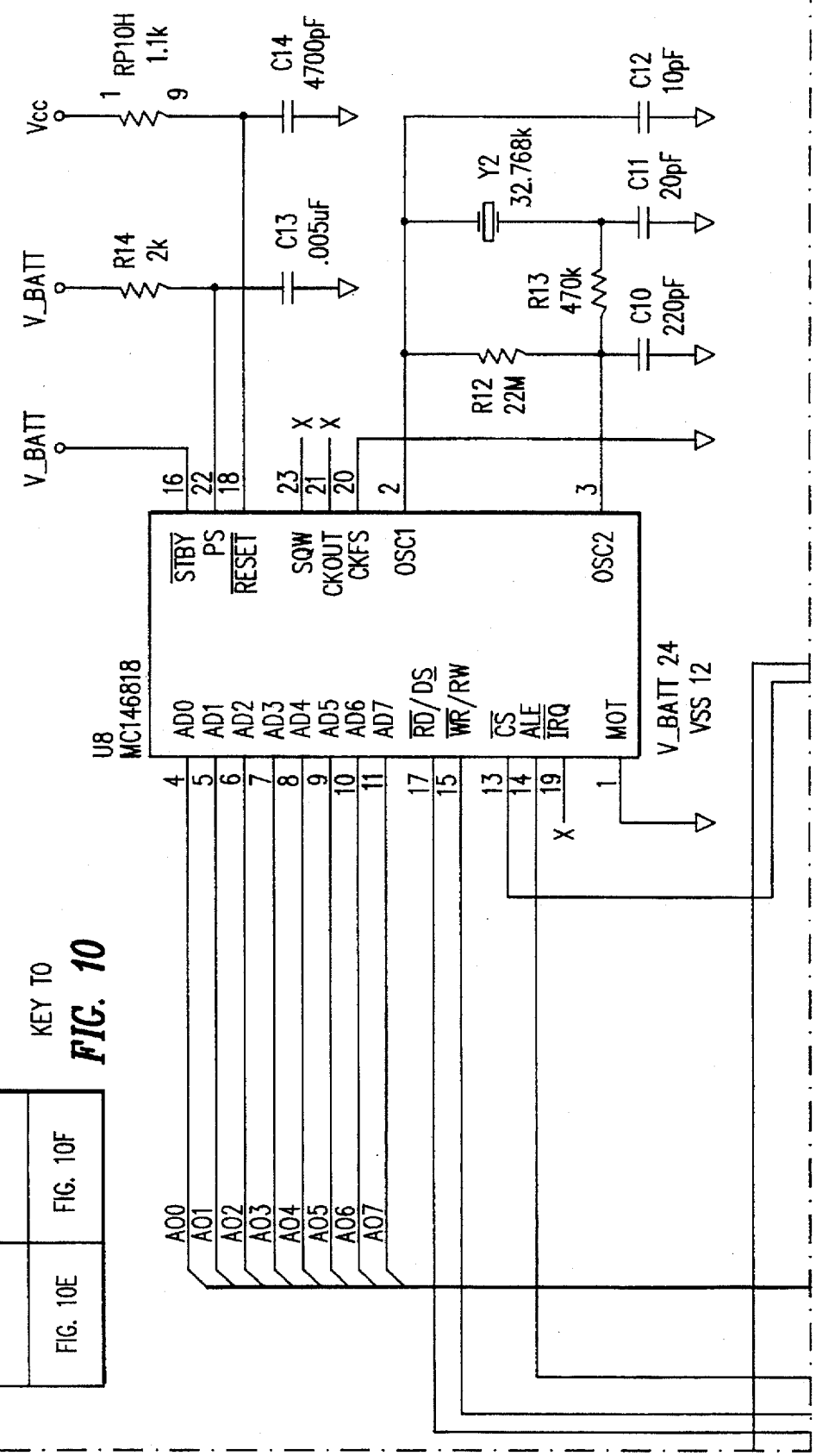

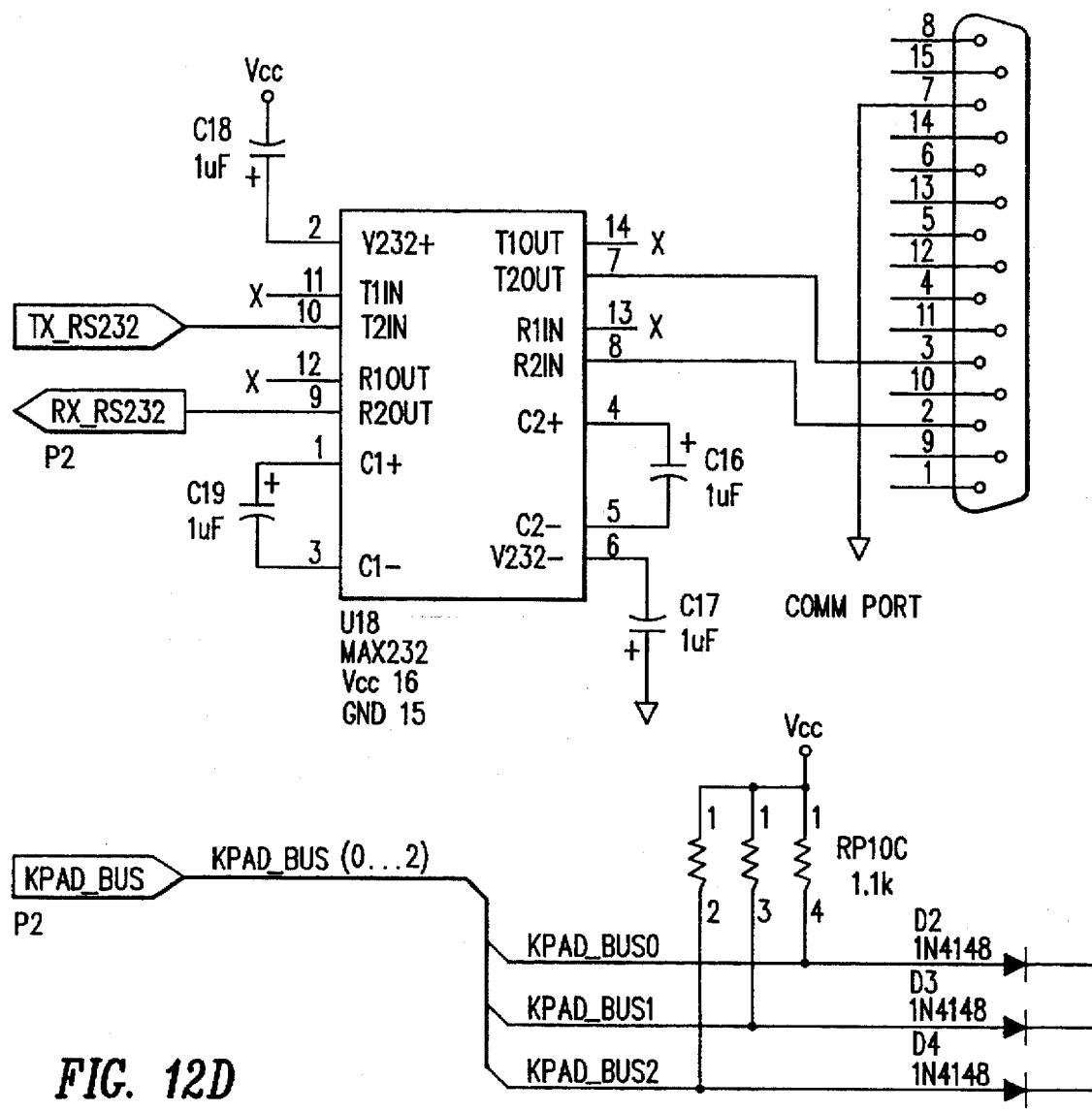

KEY TO

P5

| | P9 | |
|---|---|---|
| MAGNETRON RELAY | 1 | |
| MAGNETRON FAN | 2 | |
| HEATER RELAY | 4 | |
| VACUUM MOTOR RELAY | 3 | |
| MAG REL MOTOR | 22 | MAGAZINE RELEASE |
| IFPD MOTOR 1 | 20 | FREEZER DOOR |
| IFPD MOTOR 2 | 18 | |
| TRAY MOTOR 1 | 12 | PACKAGE TRAY |
| TRAY MOTOR 2 | 10 | |
| DUMP MOTOR 1 | 8 | DUMP TRUCK |
| DUMP MOTOR 2 | 24 | |
| POD MOTOR 1 | 23 | OVEN DOOR |
| POD MOTOR 2 | 7 | |
| DE/RE MOTOR 1 | 9 | DESLEEVE/RESLEEVE RAM |
| DE/RE MOTOR 2 | 11 | |
| IC MOTOR 1 | 17 | CAROUSEL |
| IC MOTOR 2 | 19 | |
| | 21 | |
| BLOWER RELAY | 15 | |
| DE/RE SUCTION VALVE | 14 | |
| | 13 | |
| | 16 | |
| | 5 | |
| DS RELAY | 6 | |

KEY TO FIG. 14

| FIG. 14A | FIG. 14B | FIG. 14C |

FIG. 14B

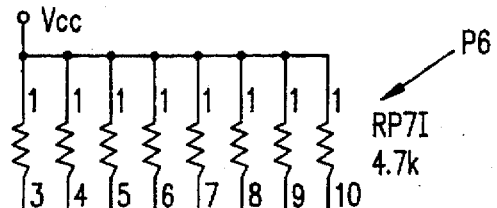

U28 74HC245

| Pin | A | B | Pin | Signal |
|---|---|---|---|---|
| 2 | A1 | B1 | 18 | IC POS1 |
| 3 | A2 | B2 | 17 | IC POS2 |
| 4 | A3 | B3 | 16 | IC POS3 |
| 5 | A4 | B4 | 15 | IC POS4 |
| 6 | A5 | B5 | 14 | IC POS5 |
| 7 | A6 | B6 | 13 | IC POS6 |
| 8 | A7 | B7 | 12 | IC POS7 |
| 9 | A8 | B8 | 11 | IC POS8 |

19 G
1 DIR

Vcc 20
GND 10

SNS1_PORT

P6 RP7I 4.7k

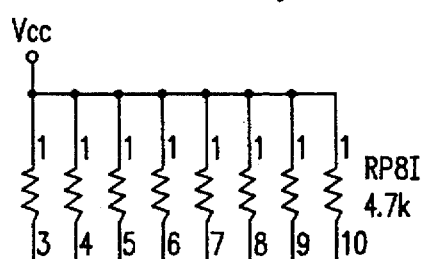

U29 74HC245

| Pin | A | B | Pin | Signal |
|---|---|---|---|---|
| 2 | A1 | B1 | 18 | IFPD OPEN SENSOR |
| 3 | A2 | B2 | 17 | IFPD CLOSED SENSOR |
| 4 | A3 | B3 | 16 | EMPTY MAGAZINE SENSOR |
| 5 | A4 | B4 | 15 | RELEASE MECH SENSOR |
| 6 | A5 | B5 | 14 | POD OPEN SENSOR |
| 7 | A6 | B6 | 13 | POD CLOSED SENSOR |
| 8 | A7 | B7 | 12 | |
| 9 | A8 | B8 | 11 | PACKAGE SENSOR |

19 G
1 DIR

Vcc 20
GND 10

SNS2_PORT

RP8I 4.7k

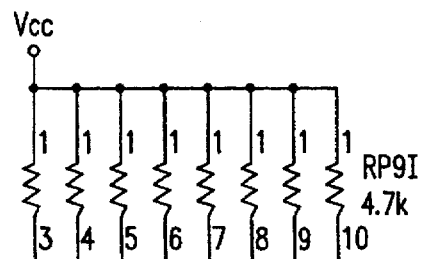

U30 74HC245

| Pin | A | B | Pin | Signal |
|---|---|---|---|---|
| 2 | A1 | B1 | 18 | DEL DOOR SENSOR |
| 3 | A2 | B2 | 17 | (CAB OVERTEMP SENSOR) |
| 4 | A3 | B3 | 16 | (IFPD OVERTEMP SENSOR) |
| 5 | A4 | B4 | 15 | (INSPECTION SWITCH) |
| 6 | A5 | B5 | 14 | MAG INDEXED SENSOR |
| 7 | A6 | B6 | 13 | |
| 8 | A7 | B7 | 12 | |
| 9 | A8 | B8 | 11 | |

19 G
1 DIR

Vcc 20
GND 10

SNS3_PORT

RP9I 4.7k

VENDING MACHINE INCLUDING MULTIPLE HEAT SOURCES WITH PROGRAMMABLE COOK CYCLES

CROSS REFERENCE TO RELATED APPLICATIONS

This application is related to and incorporates by reference the U.S. patent application Ser. No. 08/231,195 filed Apr. 21, 1994 now U.S. Pat. No. 5,503,300 issued on Apr. 2, 1996, and assigned to the same assignee as the present application, entitled "VENDING MACHINE INCLUDING REFRIGERATION AND OVEN COMPARTMENTS" by Jack R. Prescott et al.

CROSS REFERENCE TO MICROFICHE APPENDIX

Appendix B, which is a part of the present disclosure, is a microfiche appendix consisting of three sheets of microfiche having 3 Fiches with a total of 285 frames. Microfiche Appendix B is a listing of computer programs and related data in one embodiment of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention pertains generally to the field of vending machines and in particular to a vending machine with one or more programmable cook cycles for use with one or more heat sources in cooking food products to be sold to a customer.

BACKGROUND OF THE INVENTION

Vending machines are well known in the art. Typical vending machines sell various types of food products such as sandwiches, fruits, candy, gum, cigarettes, fruit drinks and soda pop. Prior art vending machines can also sell hot drinks, for example coffee, tea and hot chocolate.

U.S. Pat. No. 3,884,213 granted to Smith discloses a cooking apparatus including a microwave generator for heating the interior of a food product in combination with apparatus to direct spaced discrete high velocity jets of heated air to impinge against exterior surfaces of the food product. Smith discloses a manually operated timer that can be set by a user to energize a magnetron for four minutes. The user must activate another manually operated timer for turning on the motor for blowing hot air while continuing to microwave for a period of two minutes (col. 7, lines 1–5). According to Smith, when cooking is completed, the timers automatically reset the same cycle (col. 7, lines 10–12). For other products, the timer must be readjusted by a user to program proper heating time (col. 7, lines 12–14). Therefore to cook a different product, Smith's apparatus requires the user to have knowledge of a cook cycle suitable for the product.

U.S. Pat. No. 4,409,453 granted to Smith discloses a cooking apparatus similar to that described above in reference to U.S. Pat. No. 3,884,213.

SUMMARY OF THE INVENTION

In accordance with the present invention, an oven is operated according to one or more operator programmable cook cycles to cook a food product. In one embodiment of this invention, the start time and duration for various cook cycles are stored in electronic memory of a vending machine and used for cooking a food product selected by a customer. Up to three cook cycles associated with each one of two heat sources, microwave and hot air impingement apparatus, can be used in combination to cook a customer selected food product thus resulting in hot freshly cooked foods without sacrificing quality.

Initially, at the vending machine factory, default cook cycles are stored in an electrically erasable programmable read only memory (EEPROM) of the vending machine. The default cook cycles are loaded into a battery backed random access memory of the vending machine and are used by a microcontroller to cook customer selected food products. The cook cycles in the random access memory can be overridden and new cook cycles programmed by an operator for various type of foods. An operator may program cook cycles for a variety of reasons such as, different types of food packages being stocked in the vending machine, local climatic factors (for example local elevation of the vending machine site) and local tastes and preferences.

Once an operator has programmed new cook cycles into the random access memory, from that point on the microcontroller uses the operator programmed cook cycles to cook the customer selected food products. The operator programmed cook cycles are saved even during a power loss because they are stored in a battery backed memory.

In one embodiment of this invention, the vending machine microcontroller runs software that includes two routines: cookit() and progrm(). The routine cookit() uses cook cycles in the random access memory to control the cooking of the customer selected food products. The routine progrm() responds to operator commands and overrides current cook cycles in random access memory by storing new cook cycles at the same memory locations.

BRIEF DESCRIPTION OF THE DRAWINGS

FIG. 4A is a block diagram showing the overall system level architecture of an embedded real time microcontroller system that uses cook cycles in the vending machine of FIG. 1.

FIG. 4C illustrates the storage and use of cook cycles in the RAM of FIG. 4A.

FIG. 8 is a key for assembling FIGS. 8A and 8B into a flow chart.

FIG. 12 is a key for assembling FIGS. 12A–12F into a circuit diagram.

FIGS. 12A–12F show a circuit diagram of the service interface circuit of FIG. 9.

FIG. 14 is a key for assembling FIGS. 14A–14C into a circuit diagram.

FIGS. 14A–14C show a circuit diagram for the sensors interface circuit of FIG. 9.

FIG. 5 is a key for assembling FIGS. 15A–15B into a circuit diagram.

DETAILED DESCRIPTION OF THE PREFERRED EMBODIMENTS

The present invention provides a system for operator programming of cook cycles in a vending machine using one or more heat sources. In the following description, in order to illustrate the present invention, references are made to various devices such as a money acceptor, an oven and a controller board. It will be obvious, however, to one of ordinary skill in the art that these devices are merely illustrative and are not required to practice the present invention. For example, although a money acceptor is described below as including a bill acceptor and a coin acceptor, in another embodiment, the money acceptor includes, for example, a credit card acceptor and/or a bank automated teller machine (ATM) acceptor.

Figure 1:
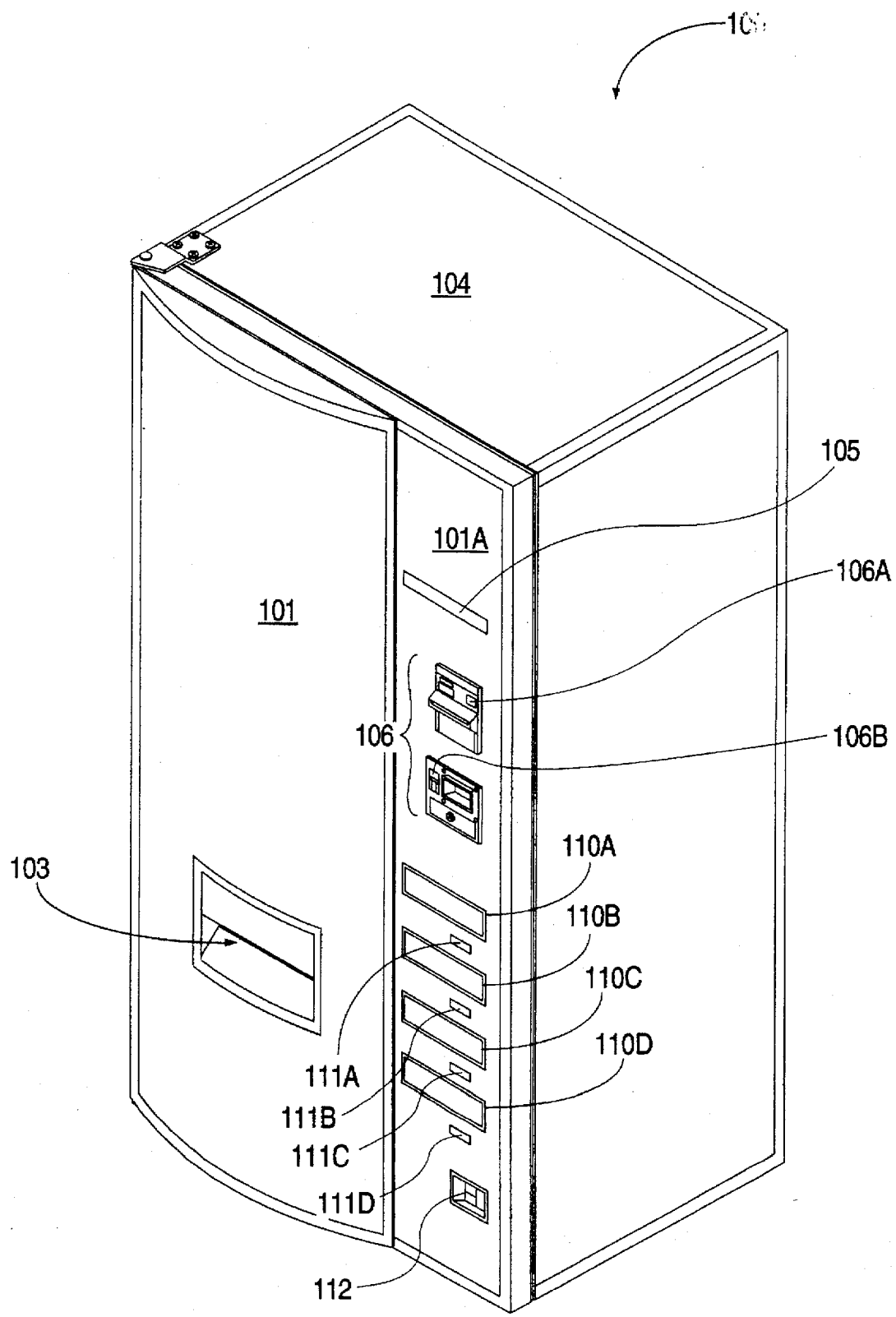
FIG. 1 is a perspective view of a vending machine for use with one embodiment of this invention.

FIG. 1 is a perspective view of a vending machine 100 for use with one embodiment of this invention. Various components of vending machine 100 discussed briefly below are explained in detail in copending commonly owned U.S. patent application Ser. No. 08/231,195 entitled "Vending Machine including Refrigeration and Oven Compartments" filed by Jack R. Prescott et al. on Apr. 21, 1994, now U.S. Pat. No. 5,503,300 issued on Apr. 2, 1996, which is incorporated herein in its entirety.

As shown in FIG. 1, a front service door 101 and a main cabinet 104 form an enclosure (illustrated below in FIG. 2) within which are housed various components of vending machine 100. Front service door 101 has a delivery chute 103 for delivery of cooked food products to the customer. Front service door 101 also has a flat portion 101A in which are formed various customer interface features, e.g. a customer display 105 for displaying messages to a customer, a money acceptor 106 including bill acceptor 106A for accepting paper money and a coin acceptor 106B for accepting coin money.

Flat portion 101A has four price displays 110A, 110B, 110C, and 110D which illustrate to the customer the prices for each of the different foods available from vending machine 100. Also provided on flat portion 101A are product selection keys 111A, 111B, 111C and 111D (corresponding to price displays 110A, 110B, 110C and 110D) which enable a customer to select a desired food product e.g. french fries, pizza, chicken and strudel as shown by the corresponding price display.

Once the required money has been deposited through bill acceptor 106A and/or coin acceptor 106B, and a selection made by striking one of product selection keys 111A, 111B, 111C and 111D, no further input is required from a customer to cook the desired food product. The customer interface of FIG. 1 is simple and "idiot-proof" because the only keys a customer can strike are product selection keys 111A, 111B, 111C and 111D (other than those inherent in bill acceptor 106A and coin acceptor 106B), allowing even children to cook food products in vending machine 100. Therefore a customer, totally unaware of any cook cycles can receive hot cooked food from vending machine 100 by merely depositing money and making a desired selection.

Figure 2:
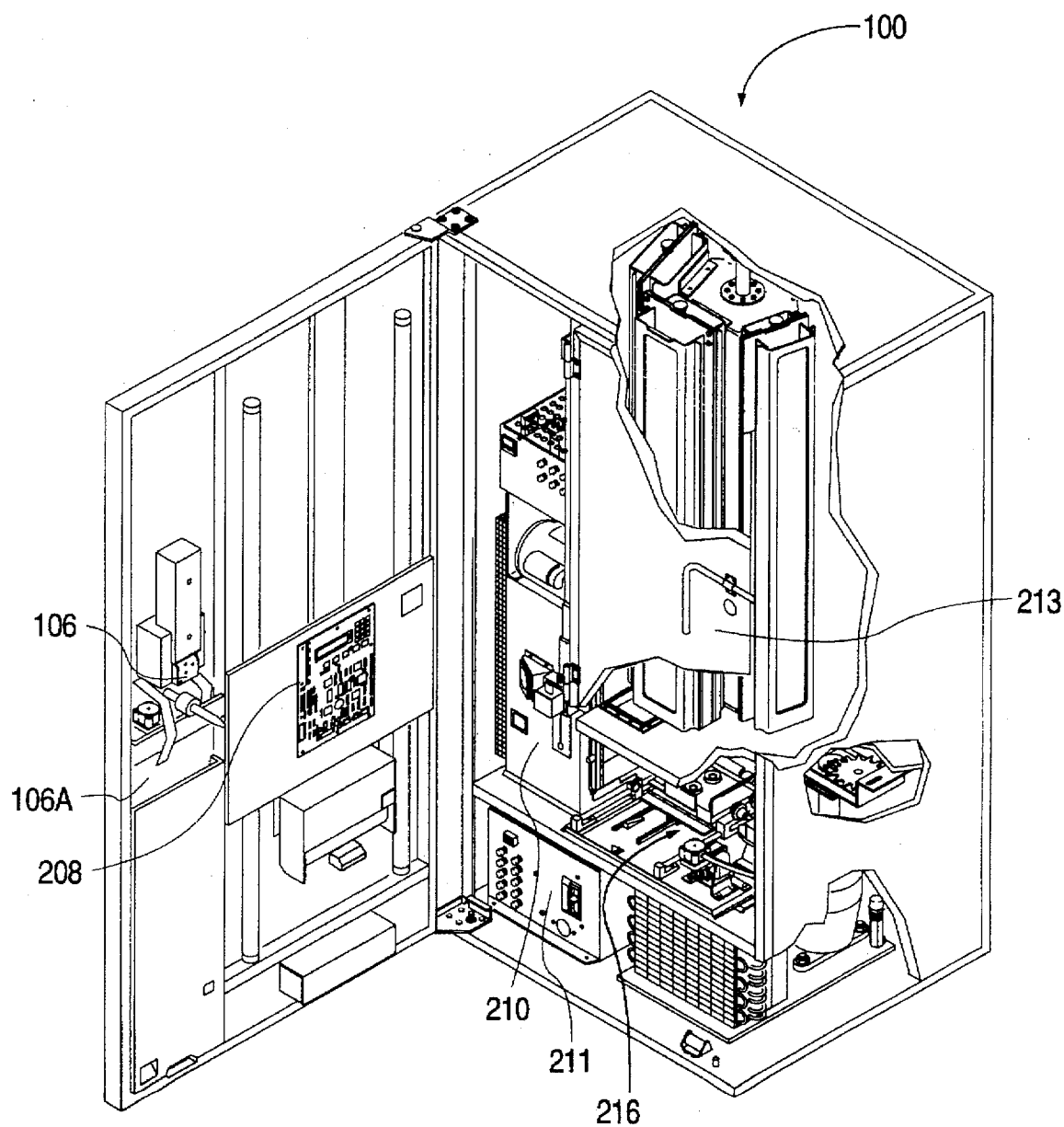
FIG. 2 is a perspective view of the vending machine of FIG. 1 with the front service door in an open position, illustrating components within the interior of the vending machine.

FIG. 2 is a perspective view of vending machine 100 of FIG. 1 with front service door 101 in an open position, illustrating components within the interior of vending machine 100. Various components of vending machine 100 not describe herein are described in detail in one or more of the following U.S. Pat. Nos. 3,884,213, 4,154,861, 4,289,792, 4,338,911, 4,409,453, 4,492,839, 4,679,542, 5,131,841, 5,147,994 and 5,210,387, each of which is incorporated by reference herein in its entirety.

As shown in FIG. 2, vending machine 100 includes a refrigeration compartment 213 for holding packaged food products, and an oven 210 for cooking the food products. The refrigeration compartment 213 is cooled by a refrigeration unit that includes a set of refrigeration coils and a compressor such as Model #AE2415-A commercially available from Tecumseh Products Company of Tecumseh, Mich. One embodiment of oven 210 is described in detail in U.S. Pat. No. 5,147,994 referenced above.

A transfer mechanism 216, described in the above referenced co-pending U.S. patent application Ser. No. 08/231,195 by Jack R. Prescott et al. now U.S. Pat. No. 5,503,300, is provided in vending machine 100 for moving the food products. A controller board 208, described below, monitors and controls various devices in vending machine 100. A power supply 211 provides power to various components of vending machine 100. In one embodiment, power supply 211 provides 5 volts to customer display 105, 24 volts to bill acceptor 106A and 12 volts to various other components (such as product selection keys 111A, 111B, 111C and 111D, operator display 301 and operator keypad 302).

On indication of a valid selection by a customer, (as described above), a package of the selected food product is transferred from refrigeration compartment 213 via transfer mechanism 216 into oven 210. The food product is cooked using cook cycles stored in controller board 208 (as described below), without any further customer inputs. While the food product is being cooked, a count down timer is displayed on display 105 indicating the amount of time the customer must wait for the cooked food product to be delivered. On completion of cooking, the cooked food product is transferred from oven 210 via transfer mechanism 216 to delivery chute 103, and presented to the customer.

Figure 3:
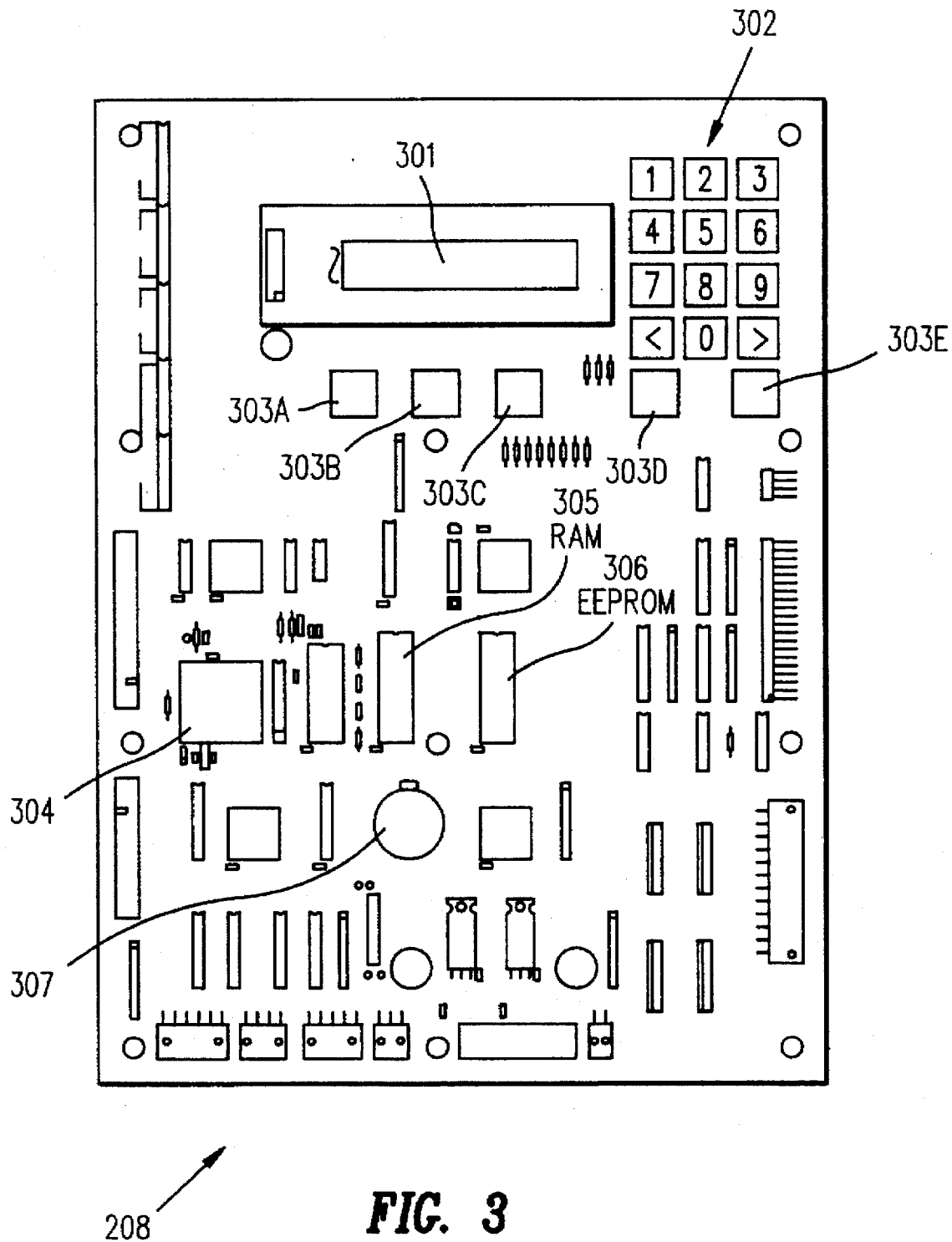
FIG. 3 shows an illustrative layout of the controller board of the vending machine of FIG. 2.

FIG. 3 shows an illustrative layout of controller board 208 of vending machine 100 of FIG. 2. Generally understood components of embedded microcontroller systems are not individually labelled in FIG. 3 and are not described in detail so as to avoid unnecessarily burdening the description of the present invention. Any references to various devices such as displays, buttons, numeric keypads, relays, microcontrollers, memories and power supplies are merely illustrative and are not required to practice the present invention.

As shown in FIG. 3, controller board 208 is a printed circuit board to which are attached various components. An operator display 301 displays messages to an operator. An operator keypad 302 is used (in close conjunction with operator display 301) by an operator for entry of commands. Operator display 301 and operator keypad 302 can be used to invoke commands and enter the data to program various cook cycles in vending machine 100. Function keys 303A, 303B, 303C, 303D and 303E provide an alternative interface for an operator to enter a command. In one embodiment, key 303B can be used to initiate programming of the package of food product currently in load position, key 303D is an "ENTER" key that indicates completion of entries and key 303E is a "CLEAR" key that sets a currently displayed entry to zero. Operator display 301 displays at a very minimum the ascii character equivalent of operator entries.

A microcontroller 304 on controller board 208 implements various functions including programmable cook cycles. A random access memory (RAM) 305 is used for storing programmable cook cycles input by an operator. An electrically erasable, programmable read only memory (EEPROM) 306 stores software program code and default data (including cook cycles) for use in microprocessor 304.

Although power supply 211 is the primary power supply for vending machine 100, controller board 208 also has a battery 307 which is connected to and which powers RAM 305. In one embodiment, battery 307 is a flat lithium battery, BR2325 available from Panasonic, which is connected in the same manner as in conventional IBM PC motherboards. Battery 307 ensures that data stored in RAM 305 is saved even in the event of loss of power to other components of controller board 208 from power supply 211. Therefore backup battery 307 saves operator programmed cook cycles even if vending machine 100 is shut down and started up (for example at a different location), or even if controller board 208 is unplugged, serviced and replugged. In view of the following description in reference to FIGS. 9-15, a controller board 208 for use with this invention can be fabricated by a person of ordinary skill in the art of microprocessor based controllers.

FIG. 4A is a block diagram showing the overall system-level architecture of one embodiment of an embedded real-time microcontroller system that implements programmable cook cycles in accordance with this invention. As shown in FIG. 4A, microcontroller 304 is a microprocessor with an arithmetic logic unit 422 and a memory register 424. In one embodiment, microcontroller 304 is a Phillips 80C552 microprocessor available from the Signetics Corporation. Microcontroller 304 monitors and/or controls the operation of user display 105, food selection keys 111A, 111B, 111C, and 111D, operator display 301, operator keypad 302, oven 210, transfer mechanism 216 and refrigeration compartment 213.

Oven 210 includes an oscillating shoe 412, a microwave oven 410 and a hot air blower 414. Shoe 412 and blower 414 form a hot air impingement apparatus 416. Microwave oven 410 and hot air impingement apparatus 416 act as heat sources for a food product in oven 210. Other heat sources can also be used such as those described in U.S. Pat. No. 4,492,839 granted to Smith which is incorporated herein in its entirety.

A customer can use vending machine 100 to cook a food product using cook cycles stored in RAM 305. When a customer strikes a food selection button such as 111A, 111B, 111C and 111D, a switch (not shown) closes and a selection signal is transmitted to controller board 208 on one of selection lines 411A, 411B, 411C and 411D (FIG. 4A). Microcontroller 304 on controller board 208 periodically checks the addresses assigned to the I/O ports for selection lines 411A, 411B, 411C and 411D, receives the selection signal and cooks the selected food product using cook cycles stored in RAM 305 (as discussed below in reference to the cookit() routine).

An operator can use keypad 302 to program new cook cycles which over-write cook cycles currently stored in RAM 305. When an operator strikes a key on operator keypad 302, a keycode signal (in the format defined in progrm.h of Appendix B) is transmitted to controller board 208. An interrupt service routine in microcontroller 304 receives the keycode entry and invokes a routine to process operator commands (as discussed below in reference to the program () routine).

Figures 4B, 7A, 7B, 7C, 7D, 7E, 7F:
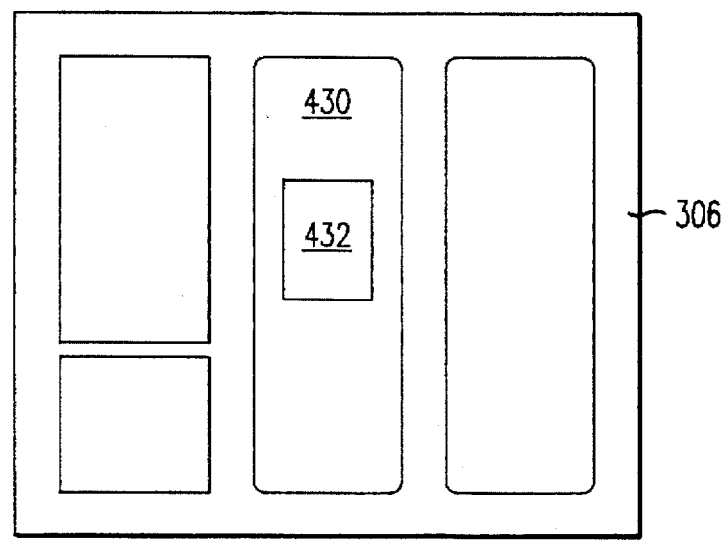
FIG. 4B illustrates the storage of factory programmed cook cycles in the EEPROM of FIG. 4A.
FIGS. 7A–7F illustrate the operator prompts for programming cook cycles.

Microcontroller 304 uses a software program 430 which is stored in EEPROM 306 (FIG. 4B). Source code of software program 430 for one embodiment of this invention is listed in Appendix B. In one specific embodiment of this invention, an executable image of the source code in Appendix B is generated by an Archimedes C-8051 Compiler available from Archimedes Software, Inc., 2159 Union Street, San Francisco, Calif. 94123-9923.

The cook cycles used to cook a food product which are stored in RAM 305 can be default cook cycles 432 (FIG. 4B) pre-programmed at the factory into EPROM 306 as part of software program 430 and which are copied into RAM 305 during installation of vending machine 100 (as discussed below in reference to routine CSTARTUP). Alternatively the cook cycles currently stored in RAM 305 can be cook cycles 434 (FIG. 4C) which were most recently programmed by an operator (as discussed below in reference to the command_ processor () 521) at the installation site, taking into account local factors such as elevation, humidity and ambient temperature. In one embodiment of this invention RAM 305 stores current cook cycles 436 (used by Cook_proc() as discussed below) as part of a data structure productinf_440 (FIG. 4C) defined in NOINIT.H as follows:

```
struct product_info {   ...
    ...
    char cooking_class;
    unsigned char micro_data[3][2];
    unsigned char heater_data[3][2];
    char process_time;
};
```

Cooking_class variable 472 (defined in Cookit.H) stores the number of microwave and/or hot air impingement cook cycles for cooking the food product. Cooking_class variable 472 is used to count down the cook cycles as the food product is cooked (as described below).

Current cook cycles 436 are stored as microwave cook cycles 450 and hot air cook cycles 460. Microwave cook cycles 430 include micro_data start times 450 MS, 451 MS, 452 MS and micro_data duration 450 MD, 451 MD, 452 MD. Hot air cook cycles 460 include heater data start times 460 HS, 461 HS, 462 HS and heater data duration 460 HD, 461 HD and 462 HD. In the embodiment of FIG. 4C, microwave cook cycles 450, in array micro_data[][], contain the start time and duration for up to three microwave cook cycles to be used during cooking of the food product. Hot air cook cycles in array 460, heater_data[][], contain the start time and duration for up to three hot air impingement cook cycles to be used during cooking of the food product. Therefore an operator can program up to three cook cycles for microwave 410 and three cook cycles for hot air impingement apparatus 416. A typical cook cycle is programmed by entering the time at which the cook cycle starts and the duration of the cook cycle. The start time and duration are entered by the operator in minutes and seconds and are converted into the corresponding total number of seconds. In this embodiment, the duration of any single cook cycle does not exceed 254 seconds. Therefore, an operator must exercise care to ensure that the cook cycle being entered does not exceed this limit.

The process_time variable 474 in product_info 440 contains the total cooking process time in seconds required to process a package of the food product, including the time needed to transfer the package from the freezer to the oven and time for cooking and delivery of the cooked product to the customer. The operator must ensure that the total cooking process time (including all cook cycles) for any one food product does not exceed 254 seconds.

An array 470 (FIG. 4C) of product_info data structures, indexed by a unique product code representative of a food product, is declared as follows (defined in NOINIT.H in Appendix B):

·no_init struct product_info product_codes [MAX_PRODUCT_CODE];

A product code used to index array 470 is a two digit number between 01 and 99, with product code 00 being an illegal value indicating "no product" during normal vend operation (although legal as operator input in some programming contexts).

In the above declaration, the no_init attribute causes array 470 to be resident in battery backed RAM 305 so that the information in array 470 (including operator programmed cook cycles) is not lost when power is lost from power supply 211. Array 470 is not returned to its default cook cycle values until the battery and all power to the controller have been removed for a period of not less than 30 seconds. Array 470 is initialized during start up only if array 470 was never initialized (for example on the first installation of vending machine 100) or upon an operator initiated deep reset. Such an initialization of the cook cycles in RAM 305 is from default cook cycles 432 hard-coded in software program code 430 resident in EEPROM 306 (FIG. 4B). Default cook cycles 432 resident in EEPROM 306 in one embodiment of this invention are listed in Table 1 (below).

TABLE 1

| | | Default Cook Cycles | | | | | |
|---|---|---|---|---|---|---|---|
| Product Code | Product Name | Cycle 1 MW | Cycle 2 MW | Cycle 3 MW | Cycle 1 HA | Cycle 2 HA | Cycle 3 HA |
| 01 | Pizza | 0:00 for 60 | 0:00 for 00 | 0:00 for 00 | 0:00 for 60 | 0:00 for 00 | 0:00 for 00 |
| 02 | Chicken | 0:00 for 60 | 0:00 for 00 | 0:00 for 00 | 0:00 for 50 | 0:00 for 00 | 0:00 for 00 |
| 03 | Strudel | 0:00 for 10 | 0:00 for 00 | 0:00 for 00 | 0:00 for 50 | 0:00 for 00 | 0:00 for 00 |
| 04 | Fries | 0:00 for 40 | 0:00 for 00 | 0:00 for 00 | 0:00 for 70 | 0:00 for 00 | 0:00 for 00 |

The cook cycle data is organized in array 470 to allow a programmer to refer to the same attribute for different product codes, for example, product_info [04]. vend_price provides the price for fries. Furthermore, the above arrangement for the hot air and microwave cycle timings is the most efficient for this type of data for obtaining the maximum code efficiency in execution of the various cooking cycles during an iteration. Code efficiency results in savings in the memory needed for code and/or data, which can be a significant factor if a code update requiring larger memory forces a board redesign.

On initial power up of vending machine 100, a reset vector of microcontroller 304 jumps to a segment of code in CSTARTUP, a start up program listed in Appendix A. At the end of CSTARTUP is an lcall to resets() (which is listed in Appendix B). In another embodiment, CSTARTUP from Archimedes is used and the Archimedes CSTARTUP contains an ljmp to main().

Figure 5A:
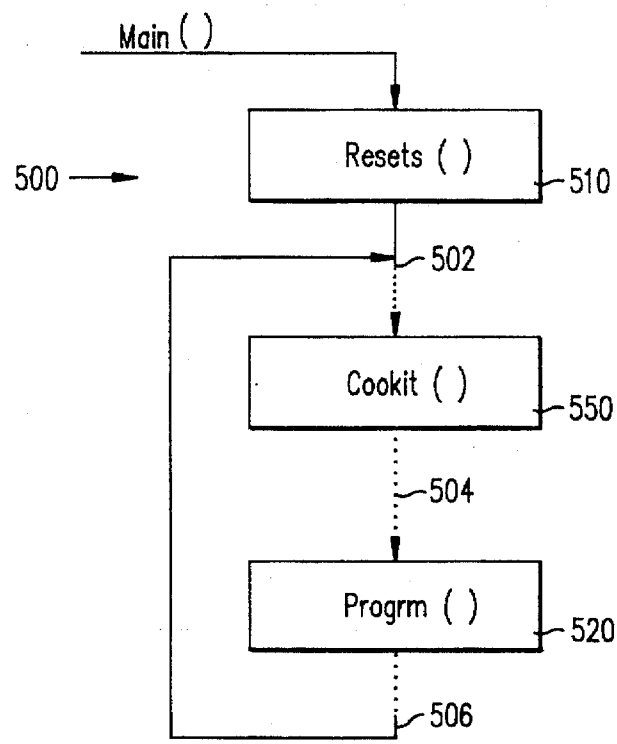
FIG. 5A illustrates a flow chart of the software running on the microcontroller shown in FIG. 4A.

FIG. 5A illustrates a flow chart of main() 500 running on microcontroller 304 during normal operation of vending machine 100.

Figure 5B:
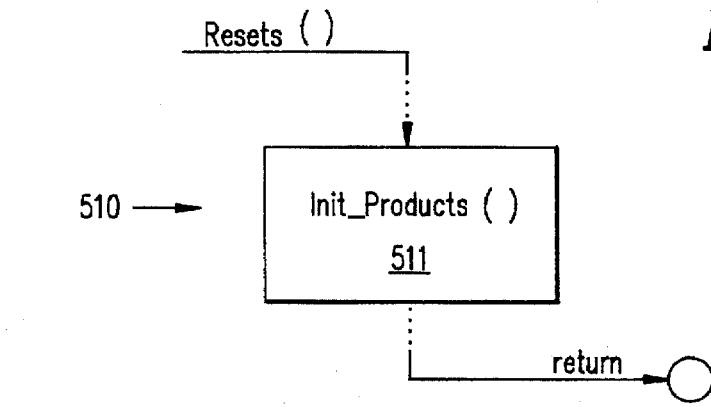
FIGS. 5B, 5C and 5D illustrate flowcharts of resets (), program () and cookit() shown in FIG. 5A.
Figure 5B:
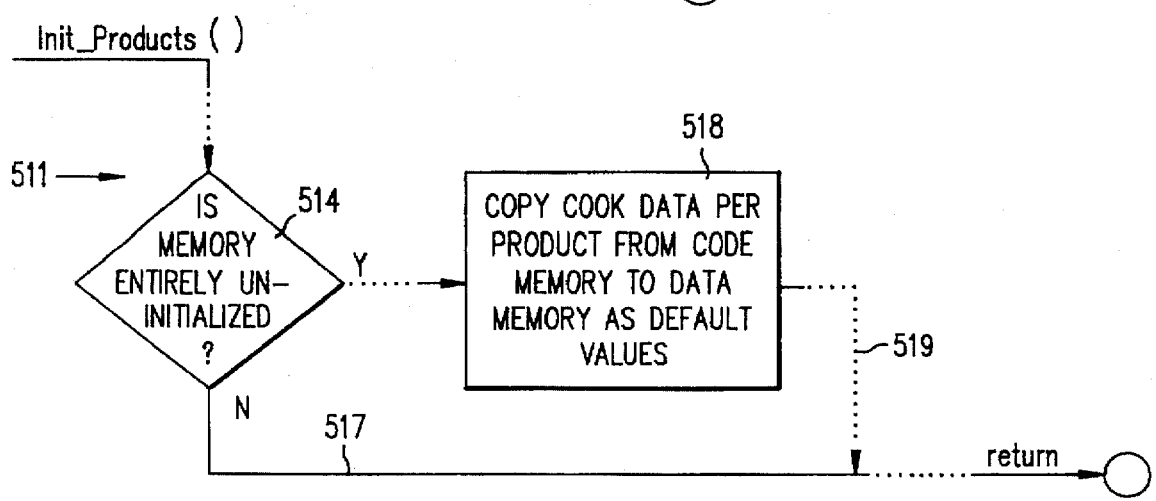

Main() 500 is a top level program which has as its first statement a call to resets() 510 (Appendix B). Resets() 510 (FIG. 5B) initializes the registers of microcontroller 304 through Init_products() 511. Init_products () 511 invokes History_of_time() in step 514 which determines whether the current execution was due to power up, and whether the battery backed up memory has never been initialized i.e. whether a variable "cold_reset" is set indicating that all power (external and battery) was removed for greater than or equal to 30 seconds. A deep reset can be initiated by command code 26 to return all variables (except vend sales history and total sales) to default values.

A deep reset or never initialized memory condition results in branch 516 and execution of step 518 which causes complete reset of all variables in controller board 208, including initialization of cook cycles 436 in RAM 305 to default cook cycles 432 thus overriding cook cycles 434 previously programmed by an operator. When a vending machine 100 is shipped from the factory, variable cold_reset can be set so that all variables in RAM 305 are set to default values. Resets() returns to main() 500 through branch 519 or alternatively through branch 517 if memory is not initialized by resets() 510.

After executing resets() 510 as described above, main() 500 enters an endless loop as shown by arrows 502, 504 and 506 (FIG. 5A), looping through various routines including Cookit() 550 and progrm() 520. Main() 500 processes customer input by calling Cookit() 550 to cook the selected food product using cook cycles 436 in RAM 305. Main() 500 processes operator input by calling progrm() 520 to program new cook cycles 434 into RAM 305.

Although processing inputs by humans, main() 500 continues to ensure that all of the devices in vending machine 100 are controlled in real time. Main() 500 implements multitasking to carry out its various real time activities by using a step_processor as described below. Most routines invoked by main() and their subroutines are implemented in multiple passes with only a small amount of work being done in a single pass. Therefore main() 500 does not spend much time in any single routine.

All routines invoked by main() 500 and their subroutines are included in the software listing in microfiche Appendix B. Main () 500 executes in an endless loop as long as power is maintained to vending machine 100. The software listing for main () 500 in Appendix B illustrates that the software is organized into various modules each of which is implemented by a major C function. Moreover, there is an initialization function for each module which initializes variables used during implementation of the module. All the initialization functions are called once, soon after main () 500 is started and then main () 500 executes in an endless loop.

Figures 5C, 5D:
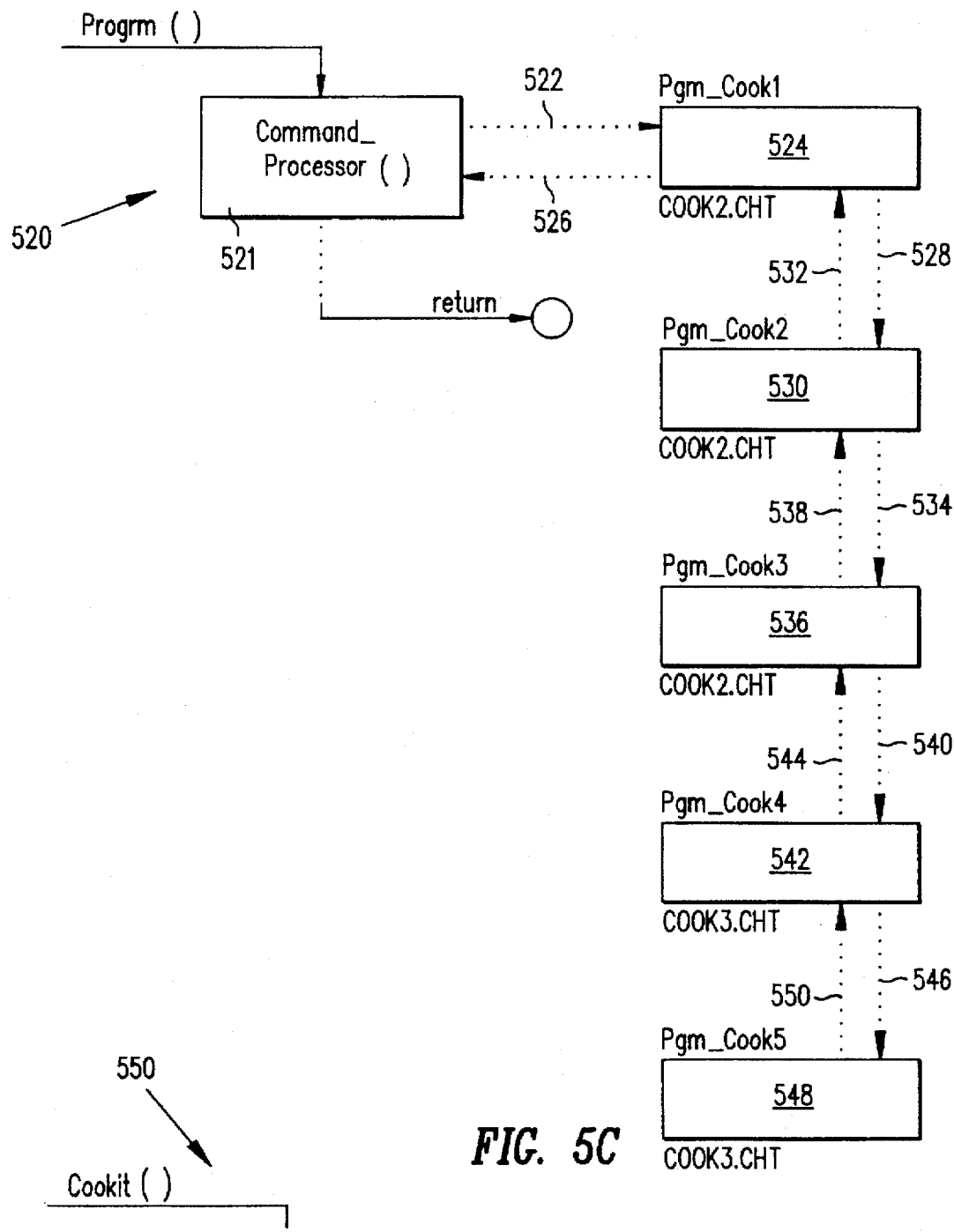

FIGS. 5C and 5D illustrate flowcharts of progrm() 520 and Cookit() 550 of FIG. 5A. Cookit() 550 calls step processor 552. As shown by arrow 554, step processor 552 in turn calls cook_proc() 556 (discussed below). However, due to its real time nature, even before any product is cooked or vended by cook_proc() 556, execution returns to main() 500 as shown by arrows 516 and 560. Main() 500 then calls progrm() 520 as shown by arrow 504. Progrm() 520 calls command_processor() 521 which in turn calls Pgm_cook1 524 (see arrow 522), Pgm_cook2 530 (see arrow 528), Pgm_cook3 536 (see arrow 534), Pgm_cook4 542 (see arrow 540) and Pgm_cook5 548 (see arrow 546). Due to its real time nature, even if an operator is in the middle of inputting a cook cycle, execution returns to the main program 500 (see arrows 550, 544, 538, 532 and 526).

Main() 500 again calls Cookit() 550 as shown by arrows 506 and 502, after executing various routines (not shown). Thus main() 500 runs in an endless loop cycling through, among other routines, Cookit() 550 and progrm() 520. The two routines Cookit() 550 and progrm() 520 run independently of each other and can be invoked by customer input or operator input in any order.

Command_processor() 521 (FIG. 5C) processes command codes received from operator keypad 302 (FIG. 3). In one embodiment of this invention a command code is a two digit number between 00 and 99 entered by an operator to indicate a routine to command_processor() 521. The indicated routine is executed by Command_processor() 521 on striking enter key 303D. A command code can also be entered by pressing one of the function keys 303A, 303B and 303C which are preprogrammed at the factory to indicate certain common command codes. Command codes can be entered independent of the machine's current activity, except for commands requiring step processor 552. If step processor 552 is in use, in some instances possession of step processor 552 may not be relinquished, and an operator command may not execute.

In one embodiment of this invention, command codes are entered at a command code prompt (FIG. 7A). In one specific embodiment, if an operator enters command code 10, main() 500 calls progrm() 520 to program new cook cycles. After entering command code 10 at operator keypad 302, if the operator strikes Enter key 303b, Command_processor() 521 eventually invokes Pgm_Cook1 524 as shown by arrow 522, after obtaining a product code from the operator via init_prod_key_Cmd1 (not shown in FIG. 7A). Pgm_Cook1 524, Pgm_Cook2 530, Pgm_Cook3 536, Pgm_Cook4 542 and Pgm_Cook5 548 interact with an operator through a series of prompts (see FIGS. 7B–7E) and store new cook cycles 434 (entered by the operator) into RAM 305, over-riding any cook cycles 436 currently in RAM 305.

Figures 6A, 6B:
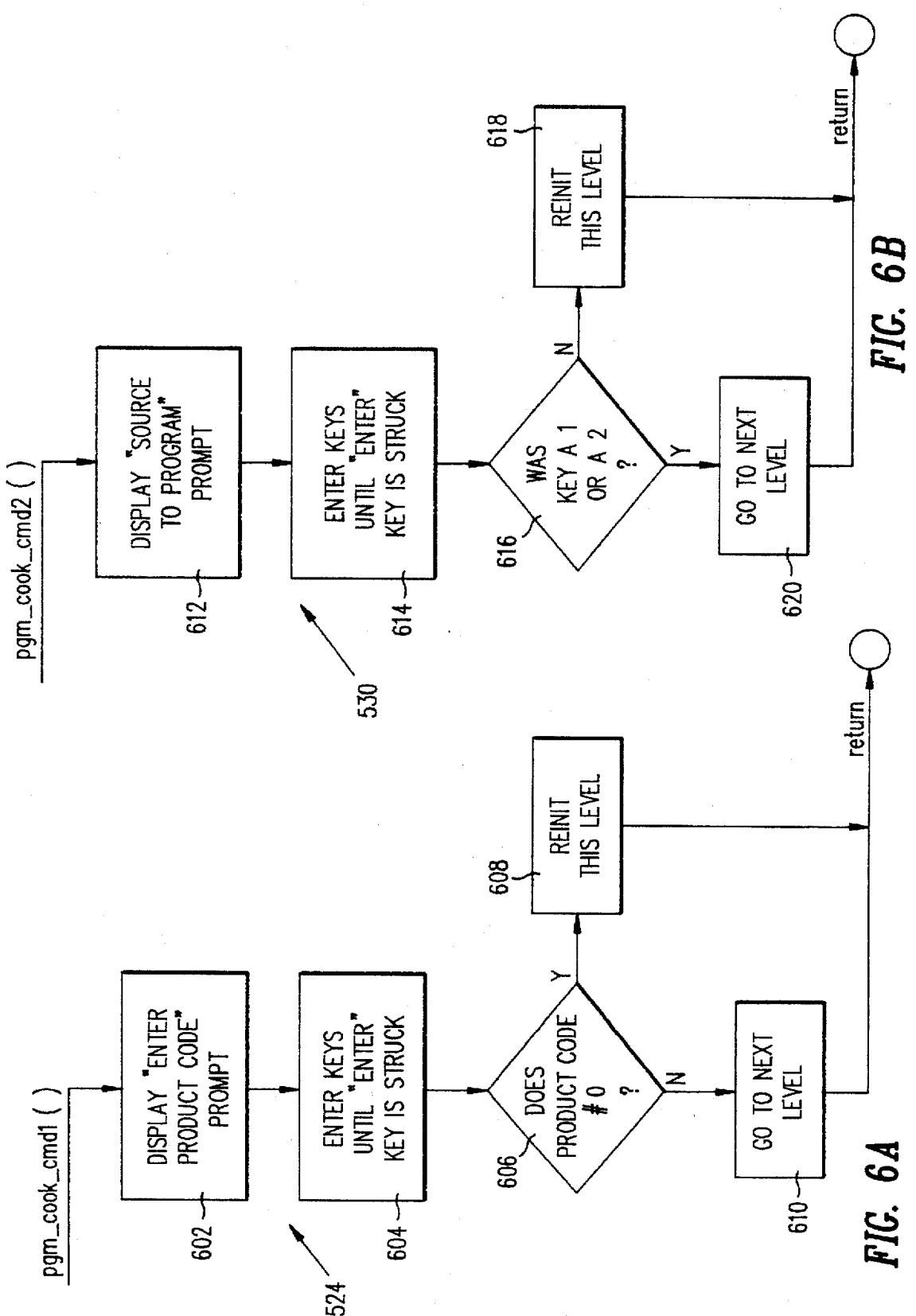
FIGS. 6A–6E are illustrative flowcharts for the various routines of progrm() of FIG. 5A.

Pgm_Cook1 524 is shown in FIG. 6A. In initial step 602, Pgm_Cook1 524 prompts the operator with a message "Enter product code" (FIG. 7B). Next, in step 604, Pgm_Cook1 524 accepts operator entries of a product code for a cook cycle to be modified on operator keypad 302. Pgm_Cook1 524 is repeatedly called in multiple passes of main() 500 until the enter function key 303D is struck (step 604). After the enter function key 303D is struck by the operator, Pgm_Cook1 524 executes in step 606 to check if the product code entered by the operator is equal to zero. If the product code is zero, Pgm_Cook1 524 executes step 608 which reinits the same level. As used in this application the word "reinit" indicates that the current routine is reexecuted after clearing any inputs received in the current routine. Therefore product code zero is rejected in step 608 as an illegal entry. If the product code was not zero, as shown in step 610, Pgm_Cook1 524 goes to the next level. On completion, Pgm_Cook1 524 returns execution to Command_processor 521 as shown by arrow 526 (FIG. 5C) which returns execution to main() 500.

On the next pass of execution from main() 500, although command_processor() 521 invokes Pgm_Cook1 524 once more, Pgm_Cook1 524 executes step 610 and goes to the next level which results in the calling of Pgm_cook2 530 by command_processor() 521. Pgm_Cook2 530 executes step 612 (FIG. 6B) which prompts the operator with the message "source to program" for one of two heat sources: microwave 410 and hot air impingement apparatus 416 (FIG. 7C). In step 614, Pgm_Cook2 530 receives entries from keypad 302 until the enter function key 303D is struck. An operator must enter only 1 or 2 at this step. In step 616, Pgm_Cook2 530 checks if the operator entered a 1 indicating microwave 410 or 2 indicating a hot air impingement apparatus 416. If the operator indicated neither 1 nor 2 Pgm_Cook2 530 executes step 618 which reinits the same level. If the operator indicated a valid heat source (1 or 2) Pgm_Cooks 530 executes step 620 which goes to the next level. Then Pgm_Cook2 530 executes a return to allow the current pass of main() 500 to continue on.

Figure 6C:
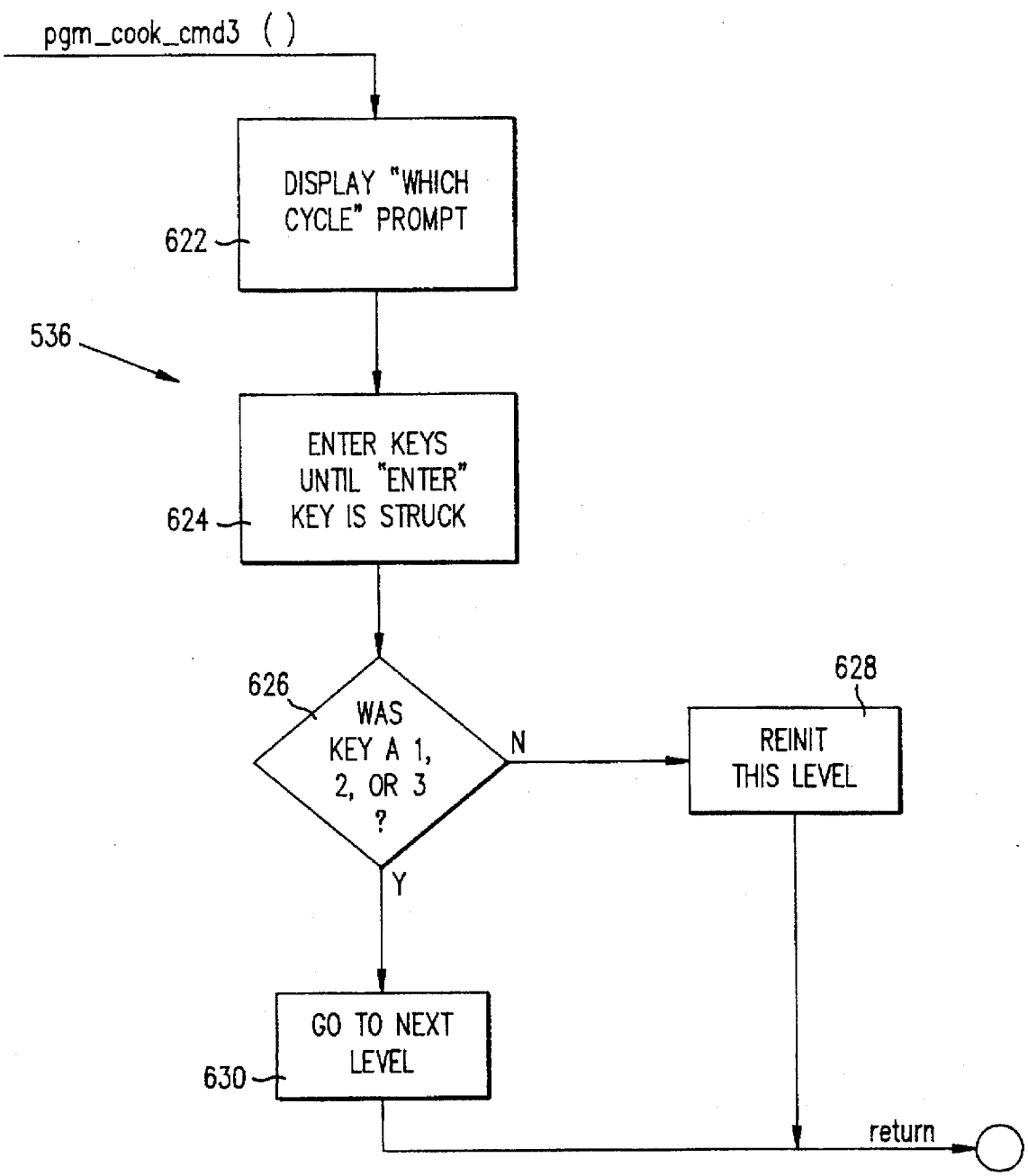

Pgm_Cook3 536 (FIG. 6C) is invoked as the next level by Pgm_Cook2 530 in Step 620. Pgm_Cook3 536 has steps 622, 624, 626, 628 and 630 similar to Pgm_Cook2 530 steps 612, 614, 616, 618 and 620 except that the message "Program Which Cycle" prompts the operator in step 622 and Pgm_Cook3 536 checks if operator entered a 1, 2 or 3 in step 626, which indicates a valid cook cycle (FIG. 7D). Therefore, in this embodiment, the Operator can program three cook cycles for each heat source for cooking each food product.

Figure 6D:
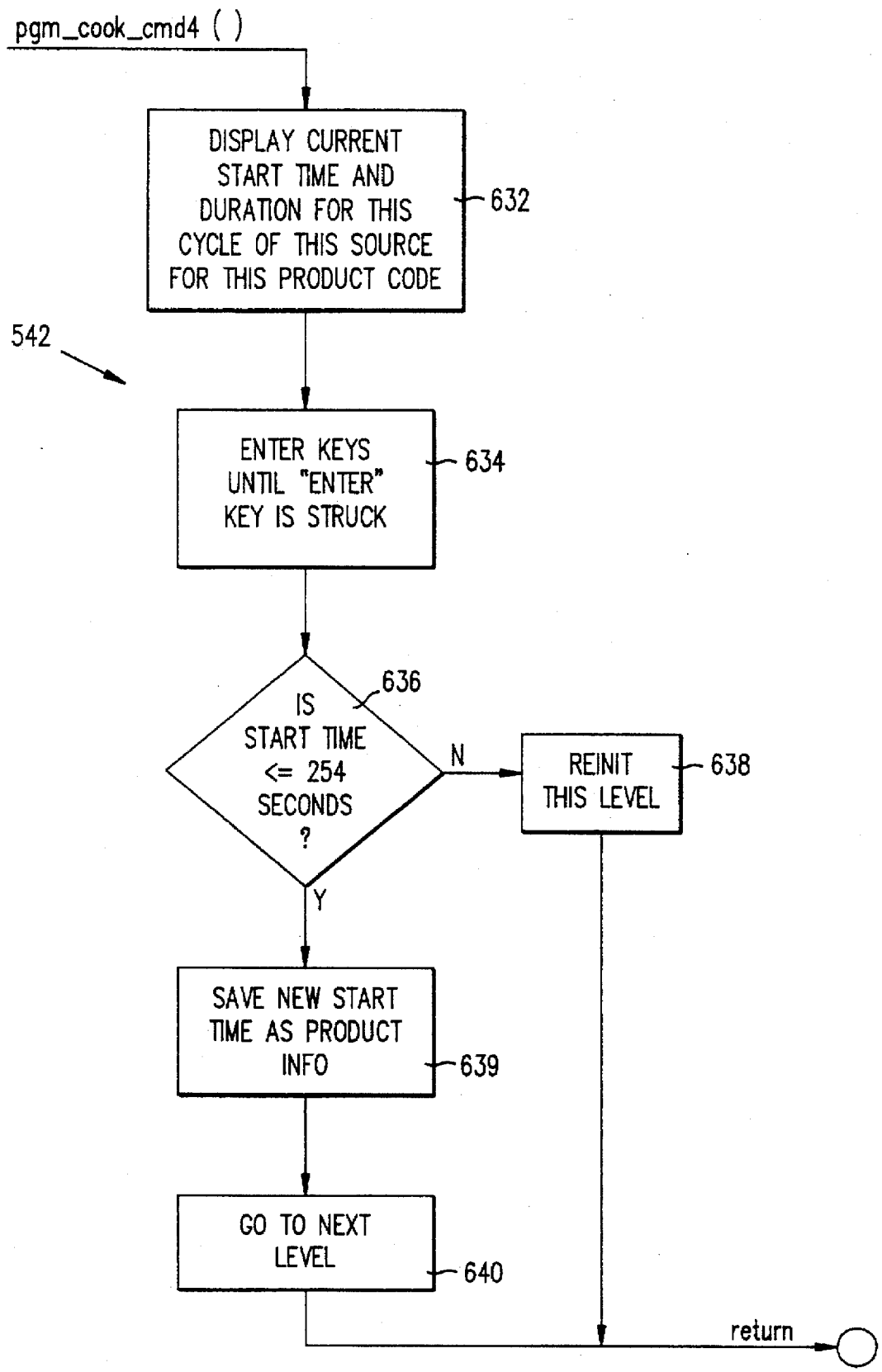
Figure 6E:
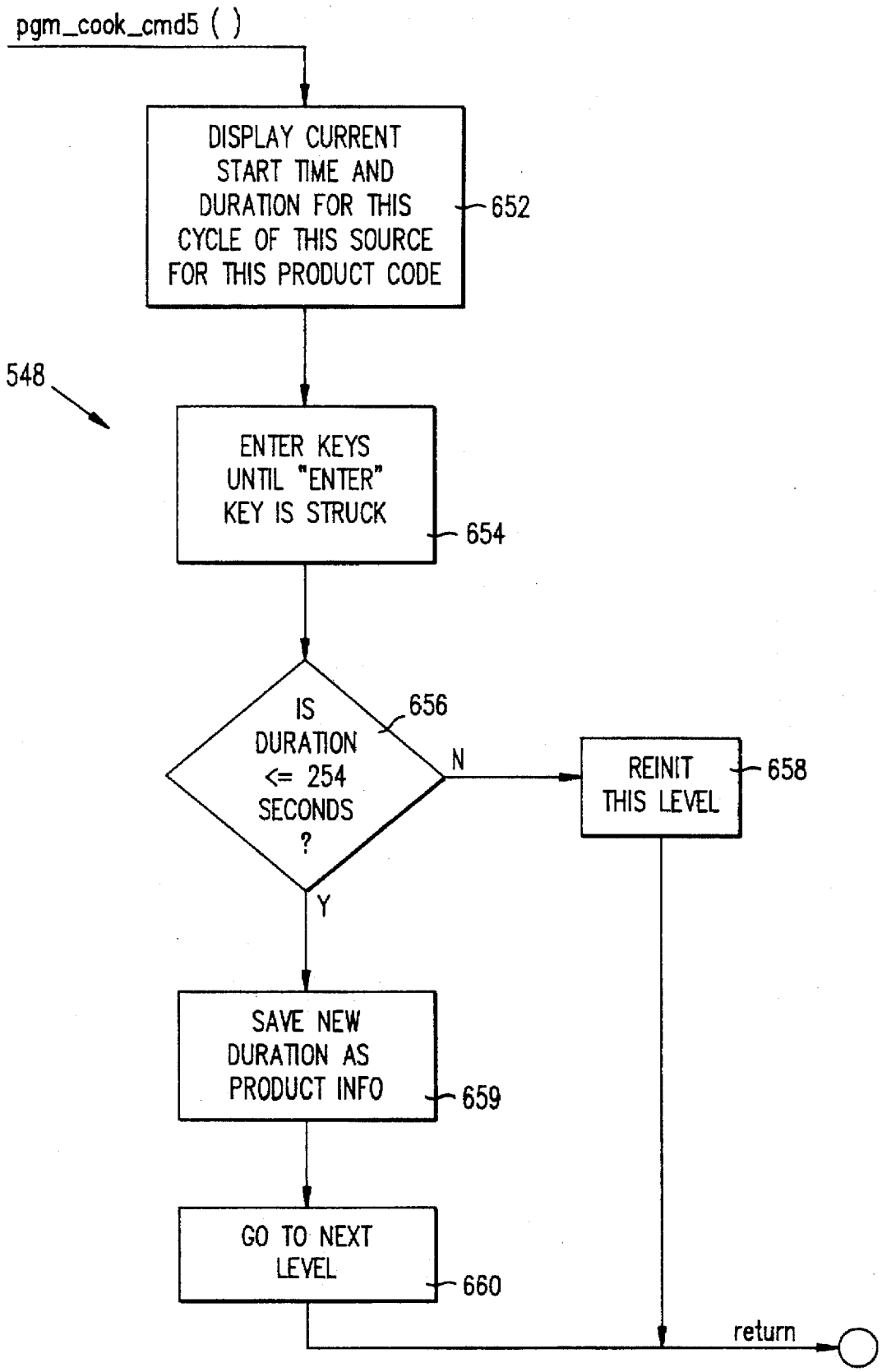

Pgm_Cook4 542 (FIG. 6D) and Pgm_Cook5 548 (FIG. 6E) are similar to each other with Pgm_Cook4 542 receiving the cook cycle start time and Pgm_Cook5 548 receiving the cook cycle duration. Initial step 632 of Pgm_Cook4 and initial step 652 of Pgm_Cook5 both display the current start time and duration for the product, heat source and cook cycle entered by the operator in Pgm_Cook1 524, Pgm_Cook2 530 and Pgm_Cook3 536 respectively (see FIGS. 7E and 7F). Operator must enter the start time and duration in minutes and seconds at these prompts. An operator can default to the current start time or duration displayed in the prompt by not entering any numbers on keypad 302 and striking enter key 303D. Steps 634 and 654 of Pgm_Cook4 and Pgm_Cook5 respectively receive input from operator keypad 302 until the enter function key 303D is struck.

In steps 636 and 656, Pgm_Cook4 542 and Pgm_Cook5 548 respectively check to see if the start time and the duration respectively are less than or equal to 254 seconds. If the result of steps 636 and 656 is false then the current level is reinited in steps 638 and 658 respectively. If, however, the start time and the duration have been properly entered then in steps 639 and 659 Pgm_Cook4 542 and Pgm_Cook 5 548 save the new start time and duration respectively in product_info 440 in the same memory locations in RAM 304 as the current start time and duration. In this manner, cook cycles stored in RAM 304 are over-ridden by operator programmed cook cycles 434. Then control goes to the next level in steps 640 and 660 from Pgm_Cook4 542 and Pgm_Cook5 548 respectively. The next level for Pgm_Cook4 542 is Pgm_Cook5 548. After Pgm_Cook5 548, the command terminates and execution eventually reverts to main() 500.

Due to the display of both start time and duration in steps 632 and 652 (FIGS. 7E and 7F), after the operator updates the start time the cursor merely goes over to the duration although these two steps are performed in different routines Pgm_Cook4 542 and Pgm_Cook5 548 and the two prompts are displayed independent of each other.

The cook cycles for any given heat source (microwave or hot air impingement apparatus) are executed by Cookit() 550 in sequential order (i.e. cycle 1 is executed first, cycle 2 is executed next and cycle 3 is executed last). Therefore, prior to programming a new cook cycle, an operator must ensure that the start time for a later cycle (such as cycle 3) is larger than an earlier cycle (such as cycle 2 or 1) start time plus the duration. A later cycle is not executed by Cookit() 550 if an earlier cycle's duration was zero.

Idle () in cookit.c (Appendix B) checks for product selection key actuation and determines which product code is requested. Cook_proc retrieves the cooking data associated with the requested product code. Cookit () contains the means by which a pointer to the step process array containing the step process embodying the vend process is handed to the step processor. The vend process, as shown in Appendix B, does various functions, for example checking the price of the selected food product against the amount of money received.

Cook cycles 436 stored in RAM 305 are used to cook a food product selected by a customer. When a customer makes a valid selection, cookit() 550 calls step processor 552. The software program code for step processor 552 is listed in Appendix B. Step processor 552 is a multipass function that takes two arguments and returns a character (static char proc_status). The first argument is a pointer to a step array and the second argument indicates where to begin.

Step processor 552 sequentially executes the process steps of an array of routines and reports back the status of that execution. Initially a first_pass flag is set TRUE. If the status is PROC_WAITING, then the step process function did not complete the first pass successfully and needs to be run again and the first_pass flag stays TRUE. If the status is PROC_DONE, then the step process function did complete the first_pass successfully and the current step is incremented to the next step in the sequence and first_pass flag is set to FALSE. If the status is PROC_WORKING, then the process is still in operation.

Step processor 552 invokes Cook_proc() 556 which is one of the many step process functions invoked by step processor 552. All step process functions are invoked through three variable arguments which are stored in a data structure step process. The step process structure's first element is a pointer to a step process function, and its second and third elements correspond with to second and third element of the step processor function. Arrays of pointers to step process structures are arranged in arrays of routines and contain a first element referencing an error handling routine with the second and last elements always being end tags. The end tags signal step processor 552 the end of execution of the array of routines currently being processed.

Figure 8A:
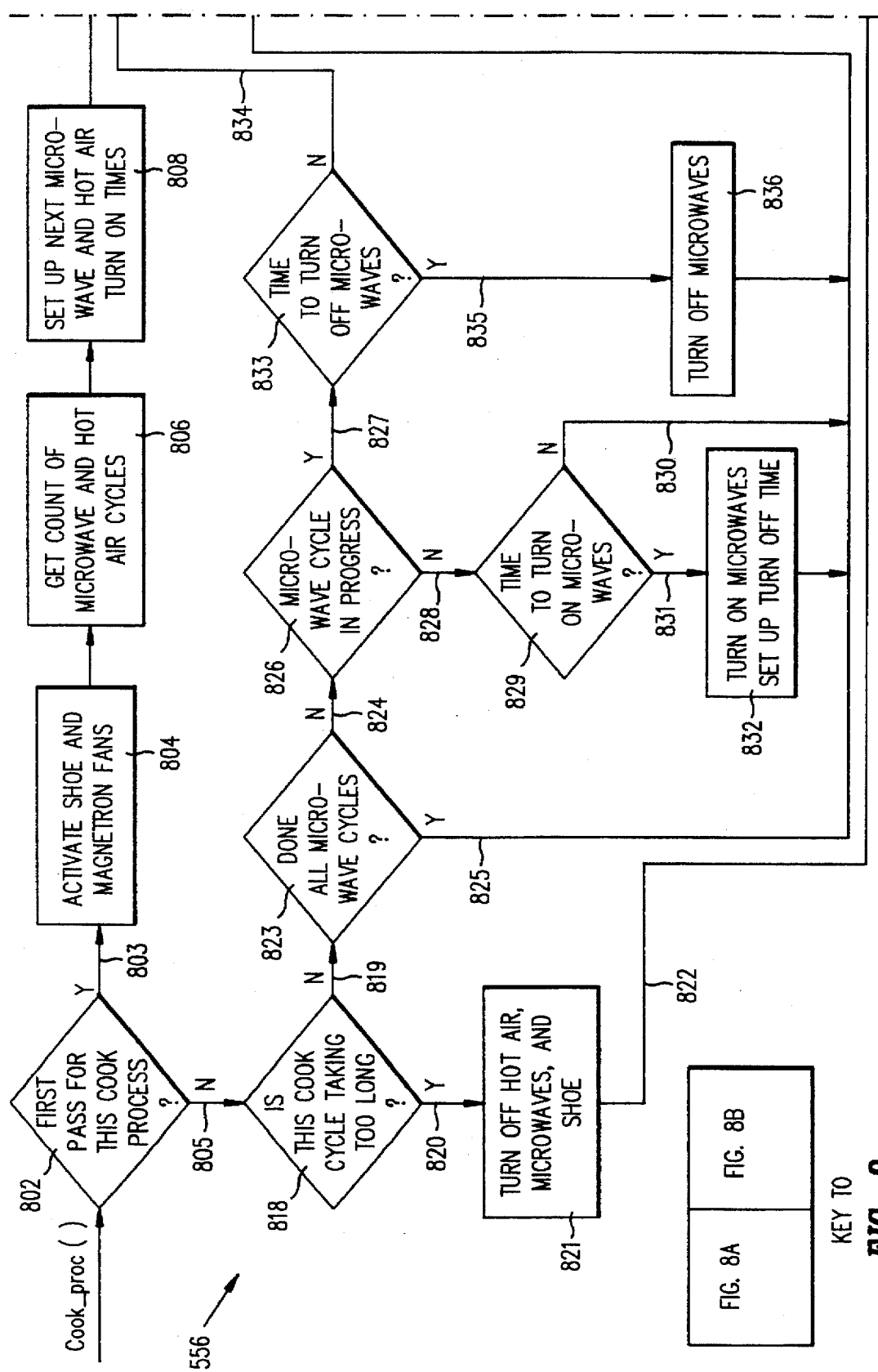
FIGS. 8A and 8B are parts of an illustrative flowchart for the routine cookit() of FIG. 5A.
Figure 8B:
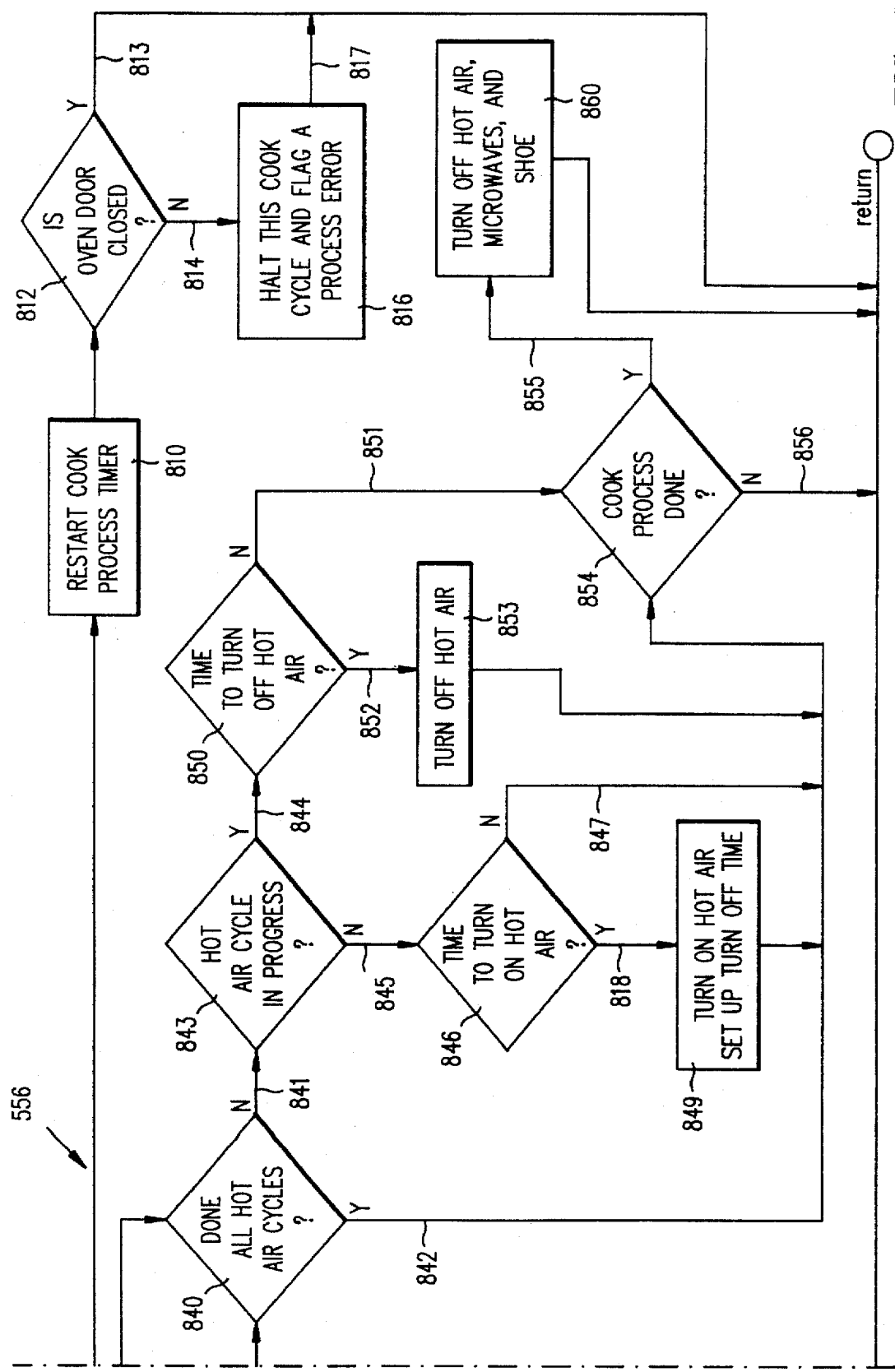

FIG. 8 shows a flowchart for Cook_proc() which implements the cooking of a food product selected by the customer. Cook_proc() 556, in first step 802 checks to see if the current pass is the first pass for the cook process. If the current pass is a first pass, branch 803 is taken which results in initialization and setup of various variables and checking of initial conditions. During a first pass, in step 804 oscillating shoe 412 and the fans of magnetron 410 are activated.

Then in the next step 806, the number of microwave and hot air cycles (i.e. cooking_class) are obtained from RAM 305. The next step 808 sets up start times for microwave 410 and hot air impingement apparatus 416 (for example, microwave cycle 1 start line 450 MS from product_info array 470 of FIG. 4C). Cook_proc() 556 also sets up a count up clock called cook timer which is set to zero, and automatically incremented once every second.

The cook timer starts incrementing when the selected food product is in the oven and the oven door is shut. The cook timer is compared to the start and/or stop times of the hot air and/or microwave cycles to determine when to turn on/off these devices (for example in steps 829 and 833). At this point, the cook process timer which measures the total elapsed time from the selected food product's introduction into the oven to its subsequent delivery is displayed to the user in display 105. In the next step 810, the cook process timer is restarted. The cook process timer is a variable cook timer defined in system.h.

The next step 812 checks to see if the door of oven 210 is closed. If the oven door is closed, branch 813 is taken which results in a normal return completion of a first pass and going to the next pass. If the oven door is not closed then branch 814 leads to step 816 wherein the cook cycle currently in progress is halted and a process error is flagged before the process completes the first pass and returns. In such a case, because the first pass was not completed, the entire vending machine must be "fault cleared" before another food product can be sold.

If the current pass for cook_proc() 556 is not the first pass, branch 805 leads to the step 820 wherein the cook timer is compared with the maximum cook process time (254 seconds) to check if cooking is too long. If a cook cycle is taking too long, as shown by branch 820, the cook_proc() 556 executes step 821 wherein blower 414, microwave 410 and oscillating shoe 412 are turned off and then executes return via branch 822. On the other hand if the cook cycle is not taking too long, as shown by branch 819, cook_proc() 556 executes step 823.

In step 823 cook_proc() 556 checks to see if all microwave cycles 450 are done by comparing the variable cycles variable, which indicates the number of variables associated with the heat source, to micro_cycles or heater_cycles. Micro_cycles or heater_cycles contain the number of hot air and microwave cycles to be performed obtained from CookClass_defs[][] which contains hard-coded cycles for each product code's cooking class.

If all of microwave cycles 450 are done, as shown by branch 824, cook_proc() 556 goes to step 840 described below. If all microwave cycles 450 are not done, cook_proc() 556 goes to decision box 826 via branch 824.

In next step 826, cook_proc() 556 checks to see if a microwave cycle is in progress. If a microwave cycle is not in progress, branch 828 is taken to step 829 in which cook_proc() 556 compares the start time of the next microwave cycle (one of 450 MS, 451 MS and 452 MS stored in RAM 305) with the cook timer (count up clock), to see if the time has been reached to turn on microwave 410. If it is not the time to turn on microwave 410, cook_proc() 556 goes via branch 830 to decision box 840 described below.

If, however, the time has been reached to turn on microwave 410, cook_proc() 556 goes via branch 831 to step 832 in which microwave 410 is turned on and a turn off time is set up. After that, cook_proc() 556 goes to decision box 840. If the result of step 826 was that a microwave cycle is in progress, cook_proc() 556 goes via branch 827 to step 833 which checks to see if it is time to turn off microwave 410 by comparing the sum of the start time and duration with the cook timer (count up clock). If it is not time to turn on microwave 410, branch 834 is taken to decision box 840 described below. If, however, it is time to turn off microwave 410, branch 835 is taken to step 836 in which microwave 410 is turned off and then step 840 is executed.

The above described logic for implementing microwave cook cycles 450 is identical to the logic implementing hot air cook cycles 460 in steps 840, 843, 846, 849, 850 and 853 through branches 841, 842, 844, 845, 847, 848, 851, and 852 (which will not be described in detail herein). At the end of the logic for implementing hot air cook cycles 460, cook_proc() 556 checks in step 854 to see if the entire cooking process is done. If the cooking process is done, cook_proc() 556 goes via branch 855 to step 860 where hot air blower 414, microwave 410, and oscillating shoe 412 are turned off and then executes return. If the cooking process is not done in step 854, branch 856 is taken in which case cook_proc() 556 continues processing in the next pass of step processor 552.

As each heat source is processed independently of the other heat sources, vending machine 100 can cook a food product by turning on a heat source (such as microwave 410 or hot air impingement apparatus 416) either simultaneously with another heat source or while another heat source is on or after another heat source has been turned off, depending on the cook cycles start time and duration programmed by the operator.

As noted above, a cook process timer is displayed to the customer on customer display 105 and counted down to indicate the remaining amount of time the customer must wait while a food product is being cooked. This display function is implemented by (Appendix B) using a simple count down timer initialized to process-time 474 in product_info associated with the food product being cooked. The cook process time displayed includes in addition to the cook cycle time, the prep time which is the time interval from the time a button 111A, 111B, 111C or 111D is pressed until the food product is transferred. The customer need not know the various cook cycles and heat sources necessary to cook the food product. All cooking is done automatically, once the customer selects a food product by hitting one of product selection keys 111A, 111B, 111C and 111D.

After cooking is complete, controller board 208 causes the packaged food product to be discharged through chute 103 in the manner as described in the aforementioned commonly owned co-pending U.S. Patent application.

Figure 9:
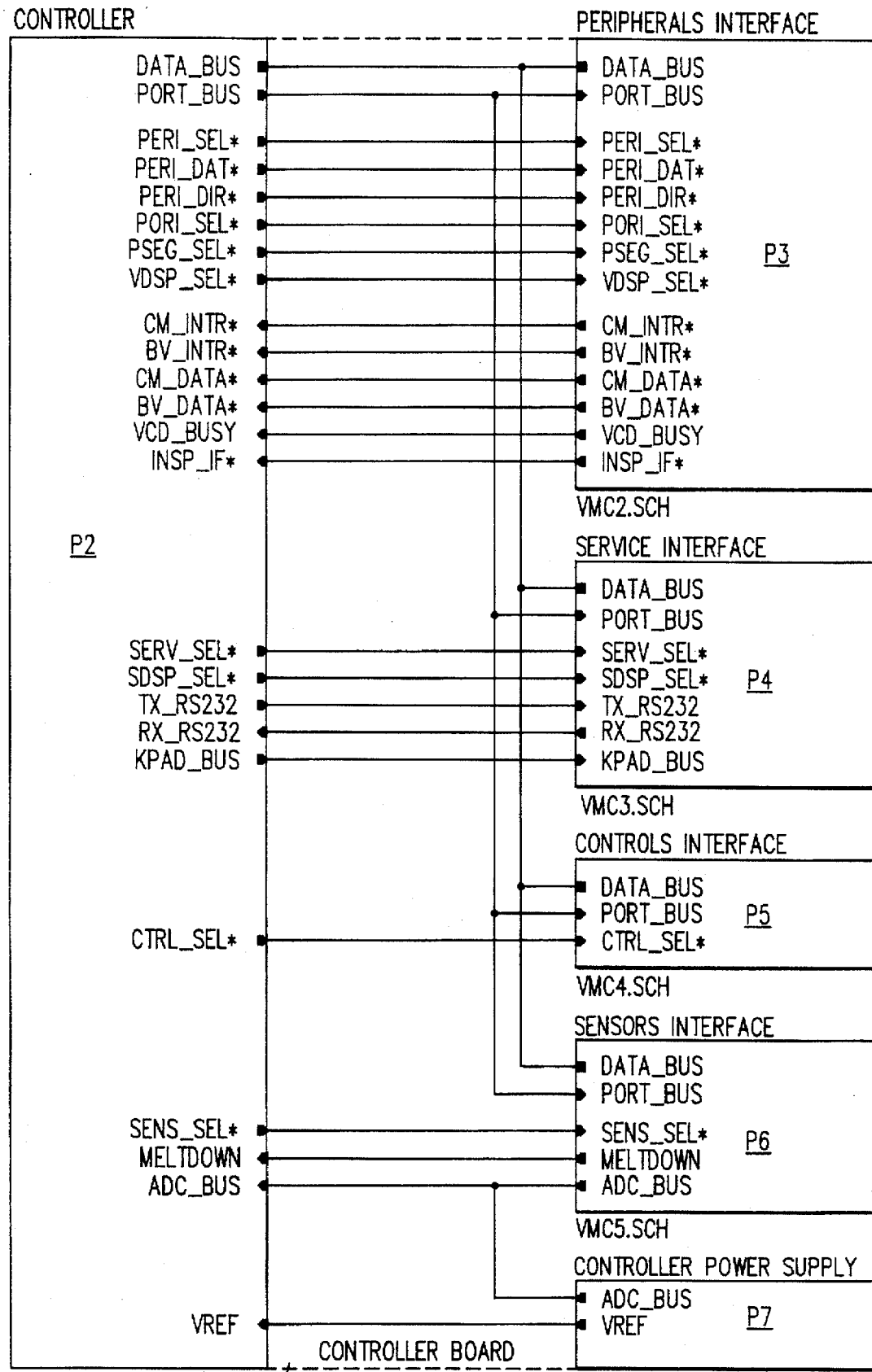
FIG. 9 is an illustrative circuit diagram for the controller board of FIG. 3.
Figure 10A:
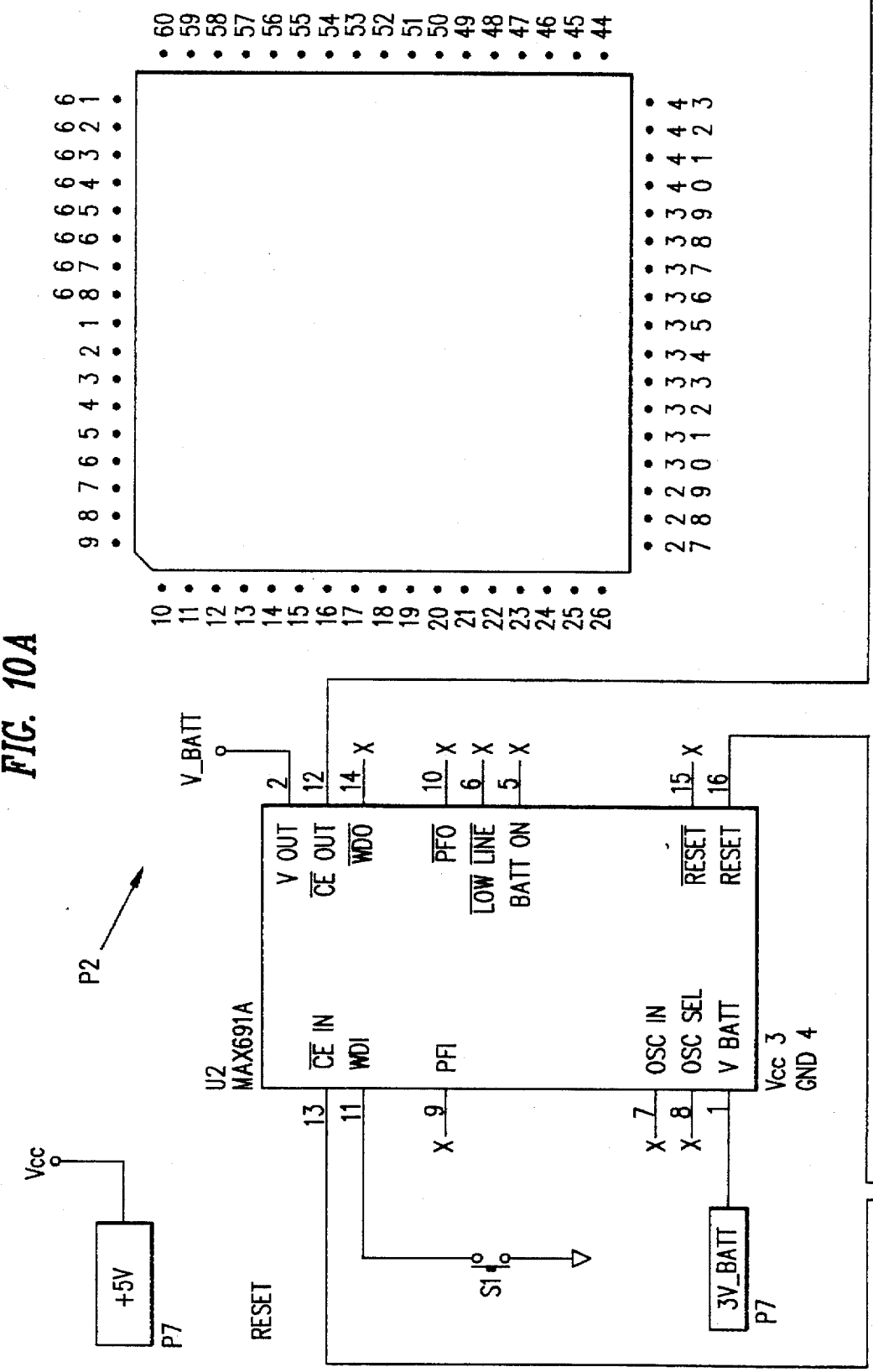
FIGS. 10A and 10F show a circuit diagram for the controller circuit of FIG. 9.
Figure 10C:
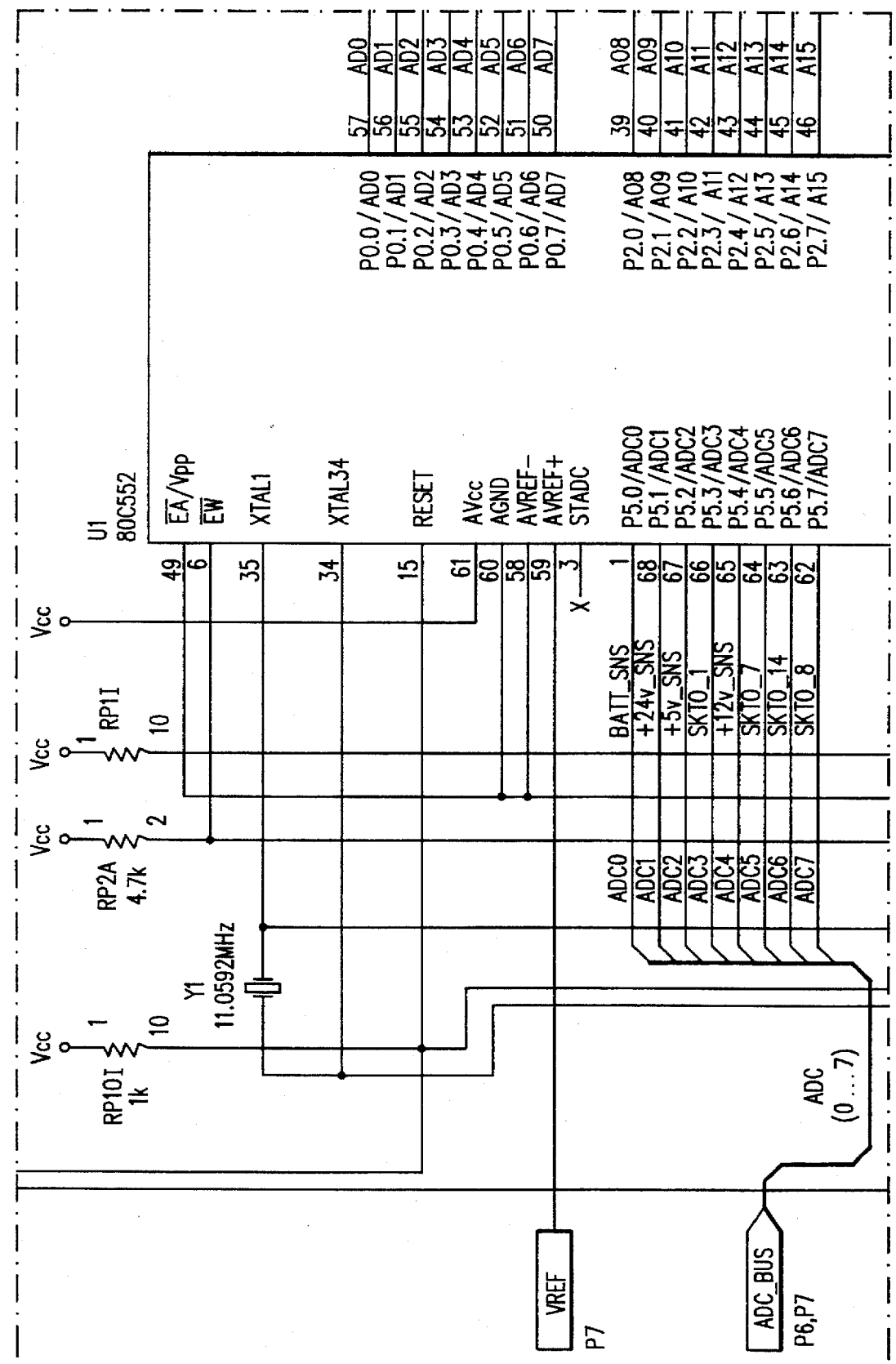
FIG. 10 is a key for assembling FIGS. 10A–10F into a circuit diagram.
Figure 10D:
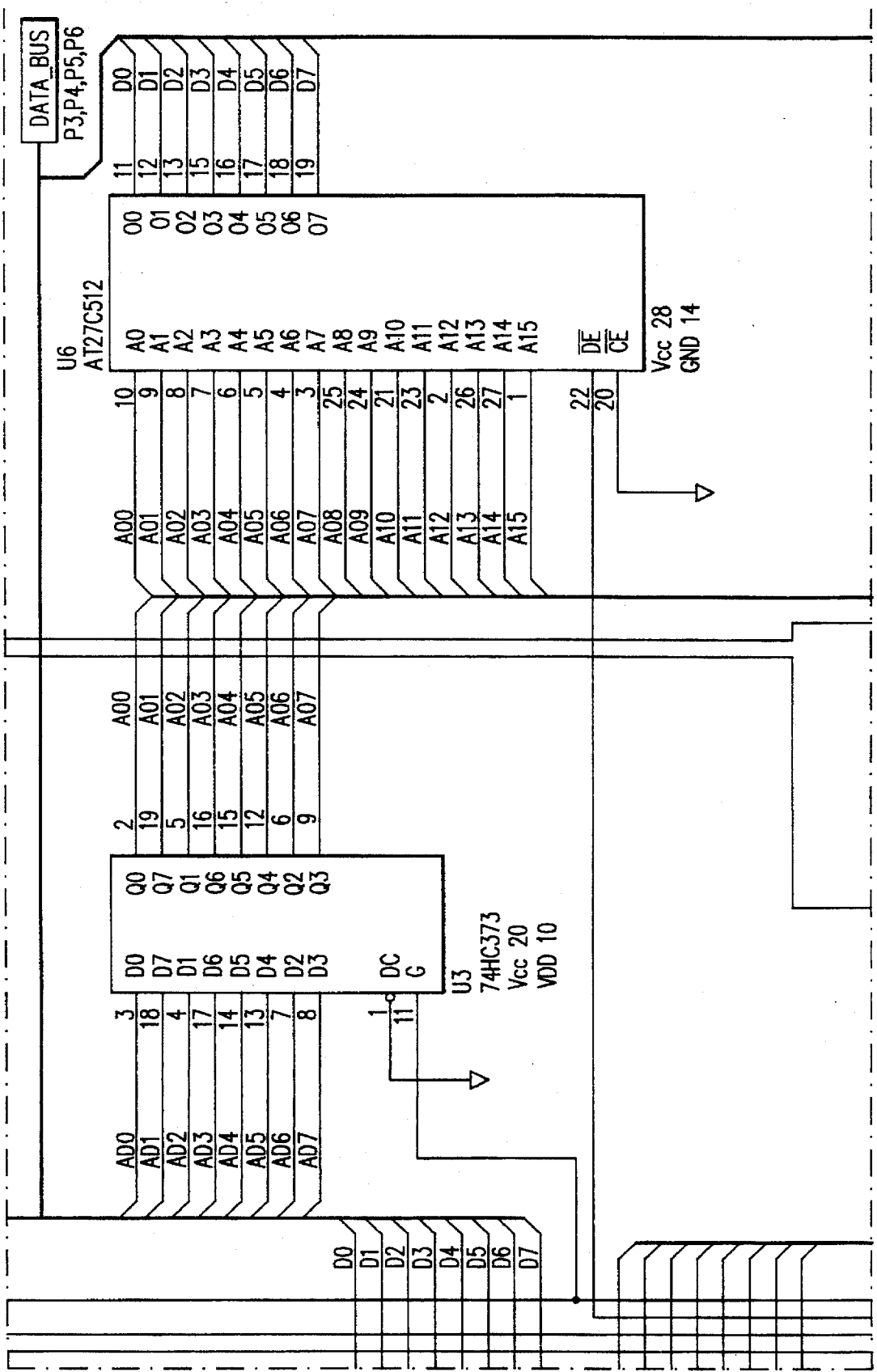
Figure 10E:
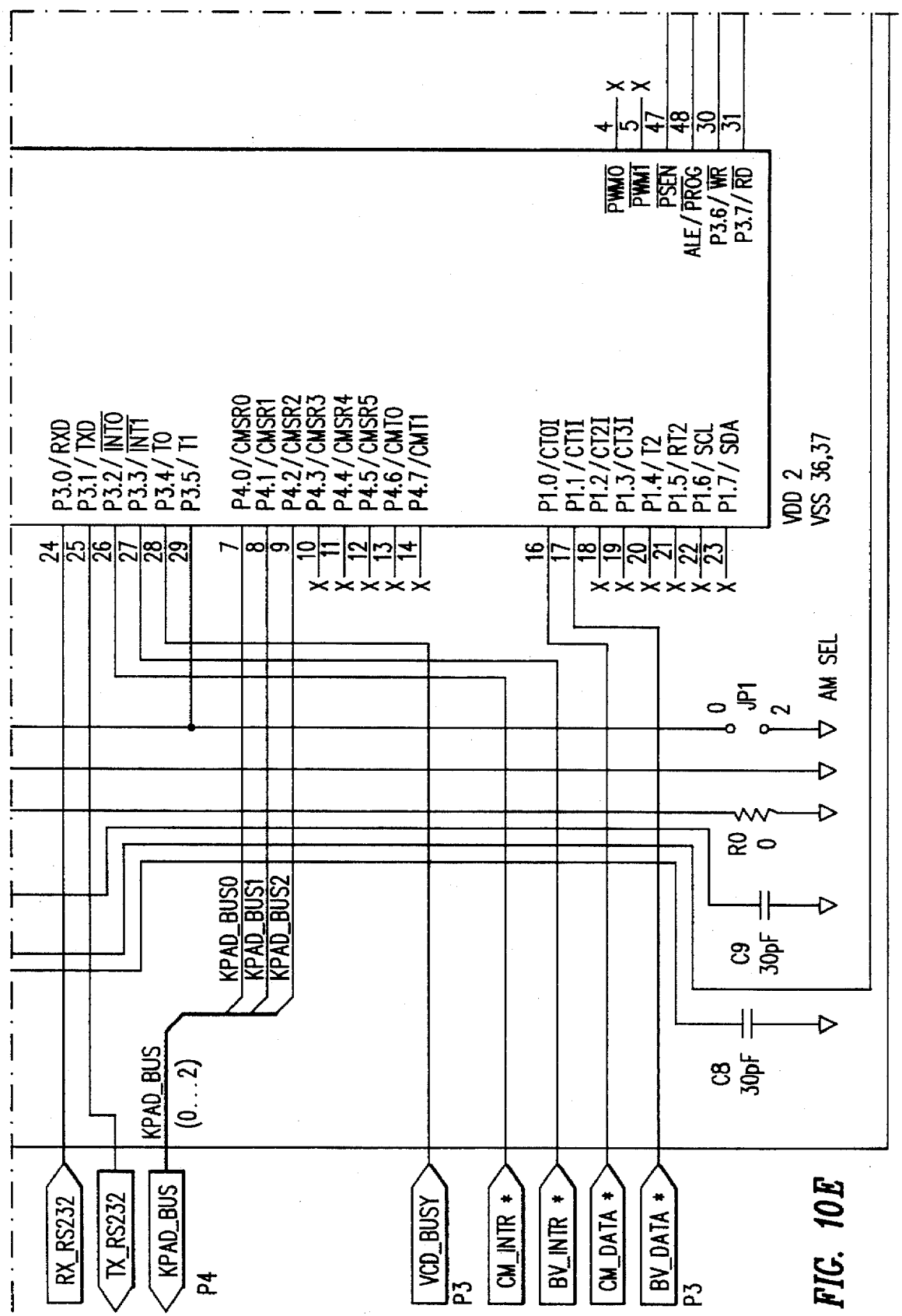
Figure 10F:
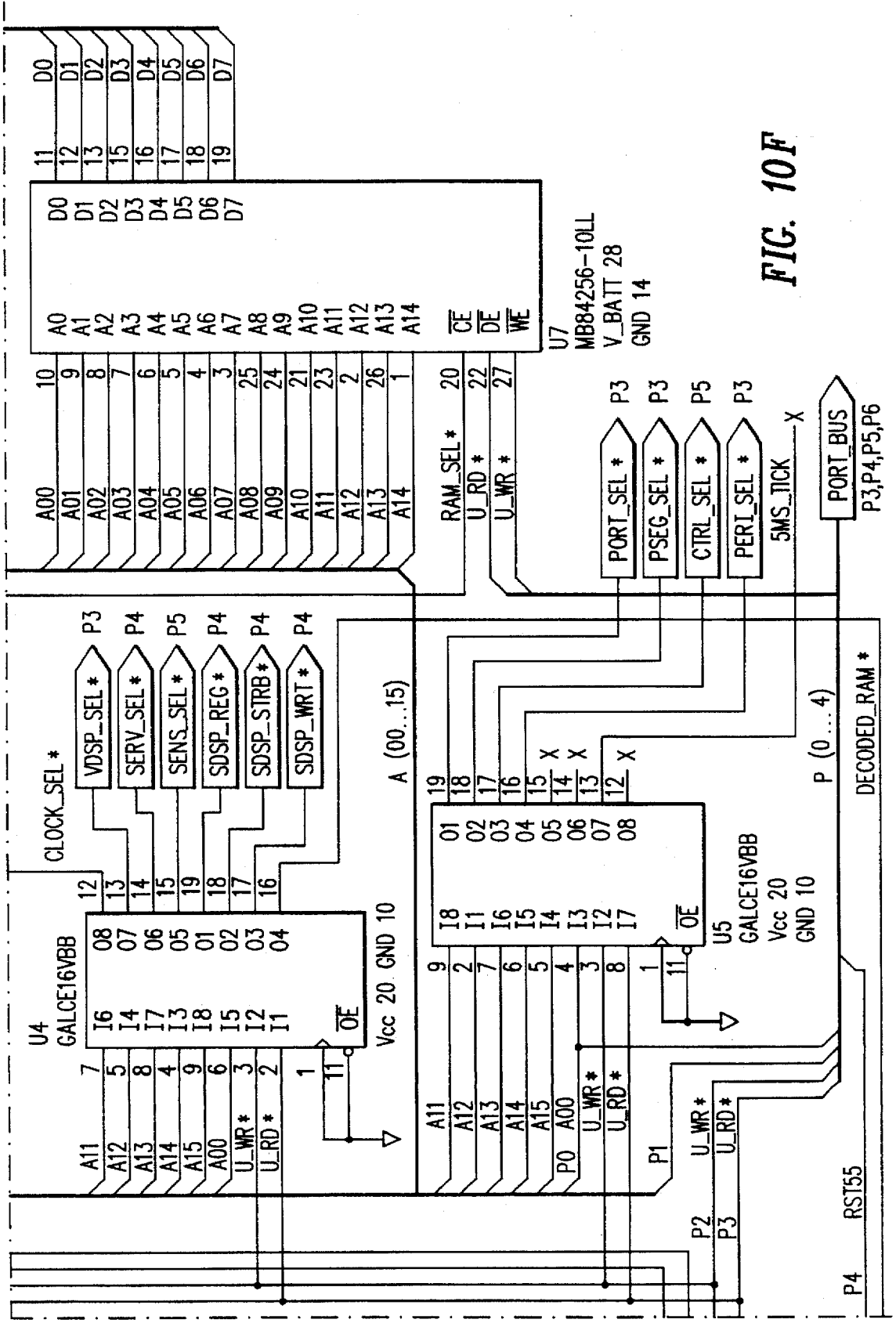

FIG. 9 is a circuit diagram for controller board P1 which is one embodiment of controller board 208 shown in FIGS. 3 and 4A. Controller board P1 includes control circuit P2 connected to peripherals circuit P3, service interface circuit P4, controls interface circuit P5, sensors interface circuit P6 and controller power supply circuit P7. Two buses, DATA_BUS and PORT_BUS connect the various components of controller board P1.

FIGS. 10A–10F show a circuit diagram of the controller circuit P2 of FIG. 9. A microprocessor U1, in this embodiment 80C552, acts as microcontroller 304 of FIGS. 3 and 4A. Controller circuit P2 includes a clock chip U8 for generating the clock for controller board P1. U3, U4 and U5 are programmable logic devices for doing various interface tasks between address bus and PORT_BUS and for driving various other signals.

Controller circuit P2 also includes an EPROM U6 which is one embodiment of EPROM 306 of FIG. 4A. EPROM U6 stores the default cook cycles 432 (FIGS. 4B and 4C) programmed at the factory. Controller circuit P2 also includes a non-volatile RAM U7 powered by a battery V_BATT 28. V_BATT 28 and RAM U7 are embodiments of battery 307 and RAM 305 described above in reference to FIG. 3.

The default cook cycles stored in EPROM U6 are transferred to RAM U7 after a cold reset. Thereafter, whenever microprocessor U1 needs a cook cycle, the cook cycle is retrieved from RAM U7. Whenever an operator makes changes to a cook cycle, the changed cook cycles are entered via keys of keypad 302 and are transferred by microprocessor U1 into RAM U7.

Figure 11A:
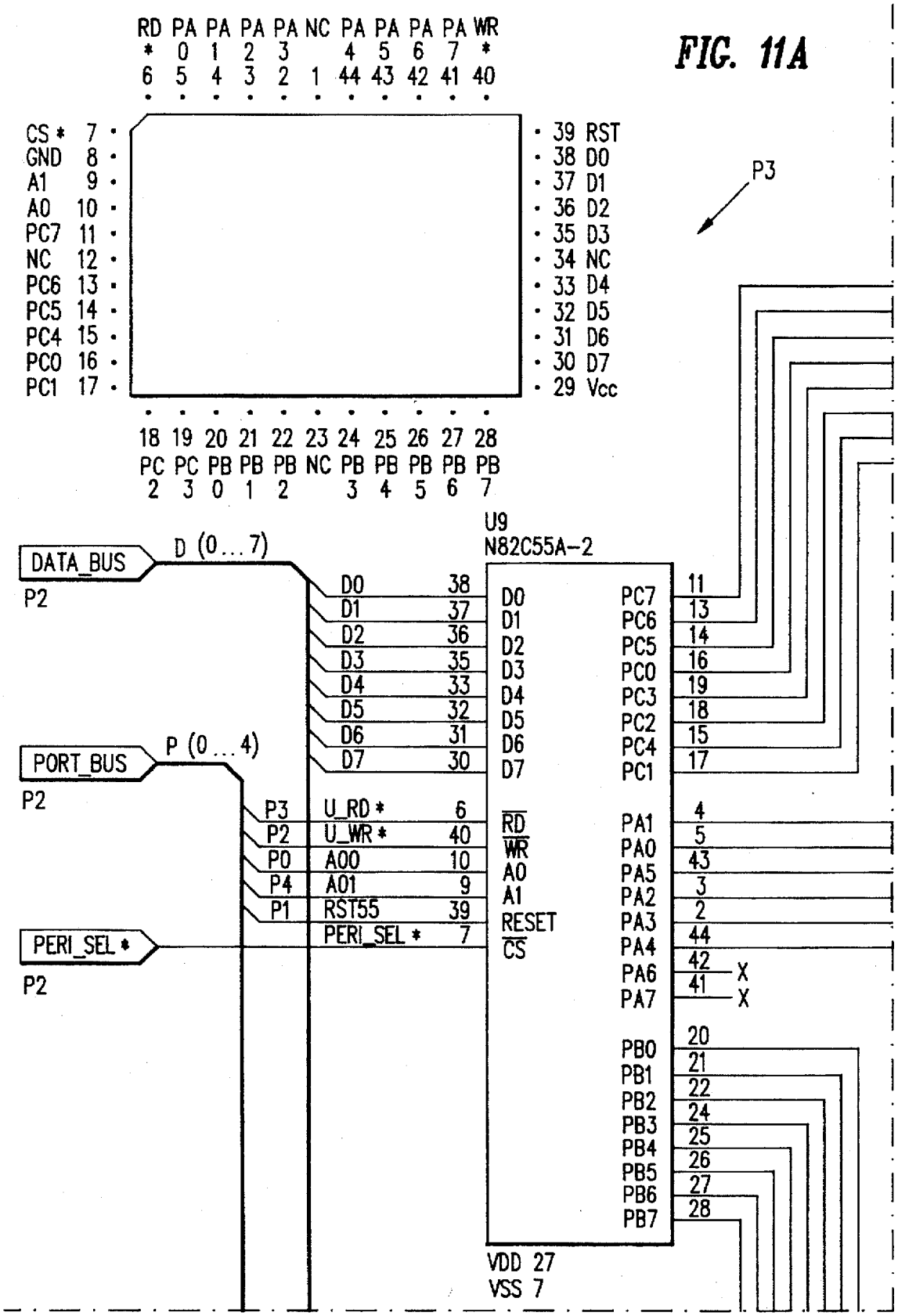
FIGS. 11A and 11G show a circuit diagram for the peripherals interface circuit of FIG. 9.
Figure 11B:
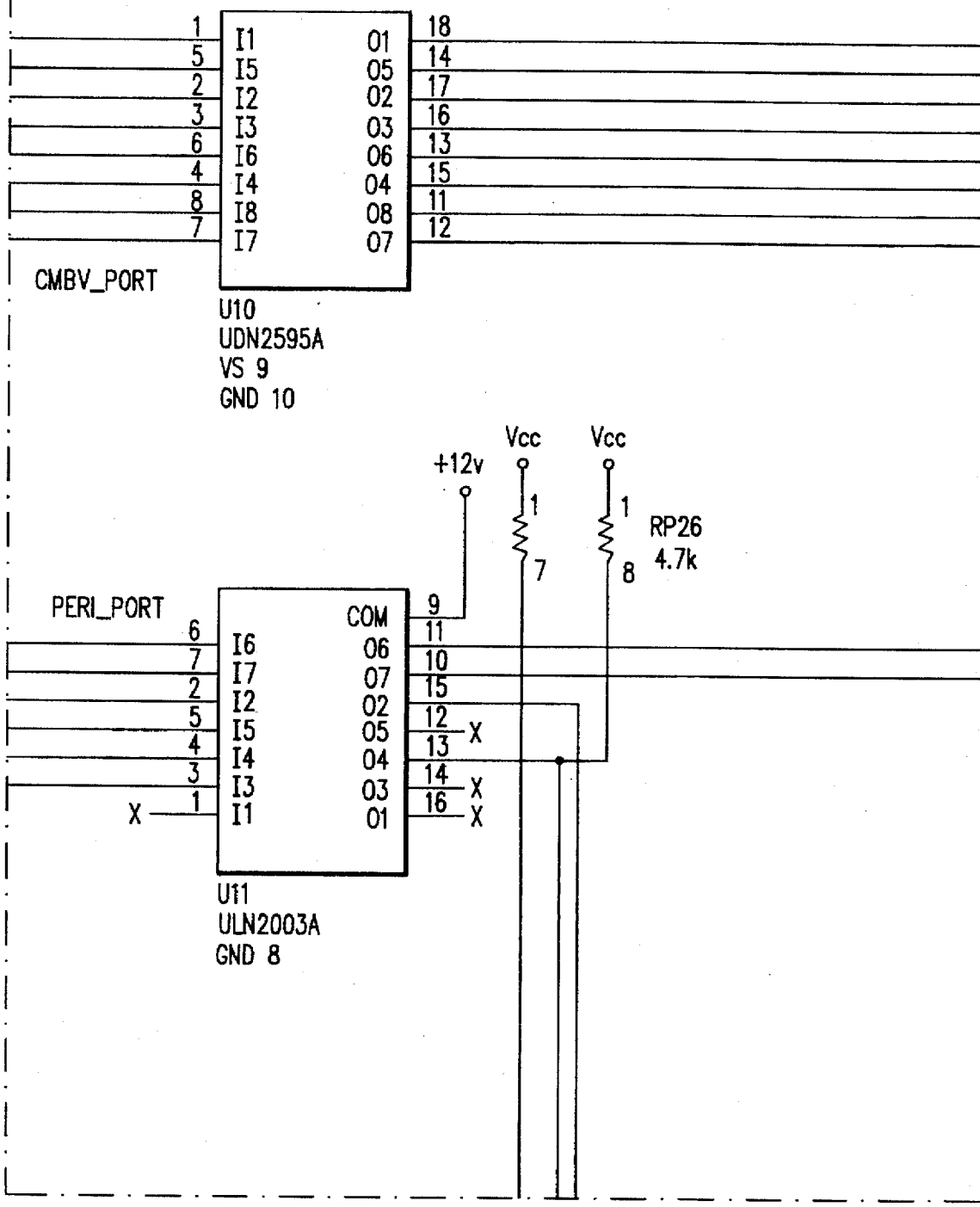
FIG. 11 is a key for assembling FIGS. 11A–11G into a circuit diagram.
Figure 11C:
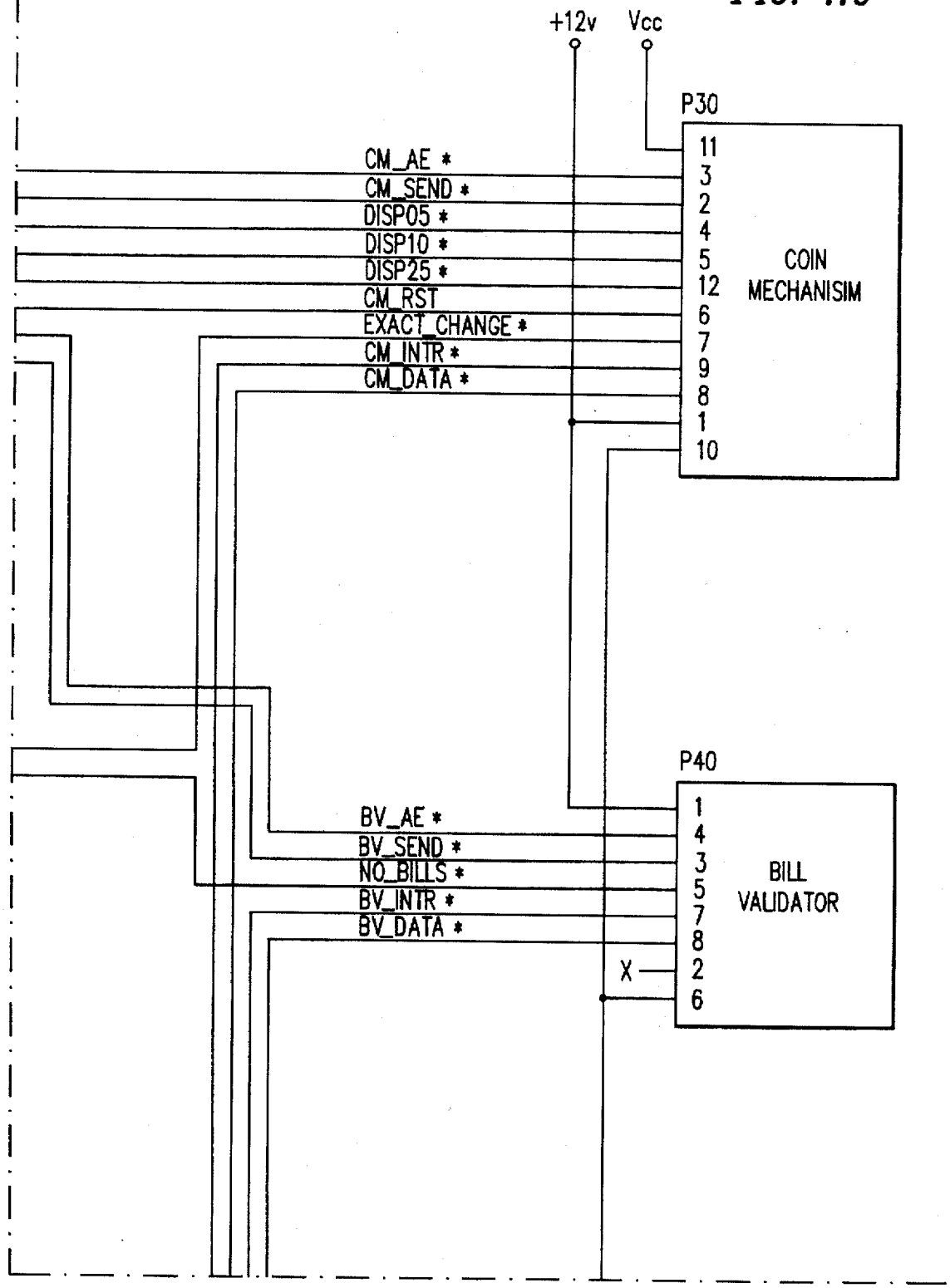
Figure 11D:
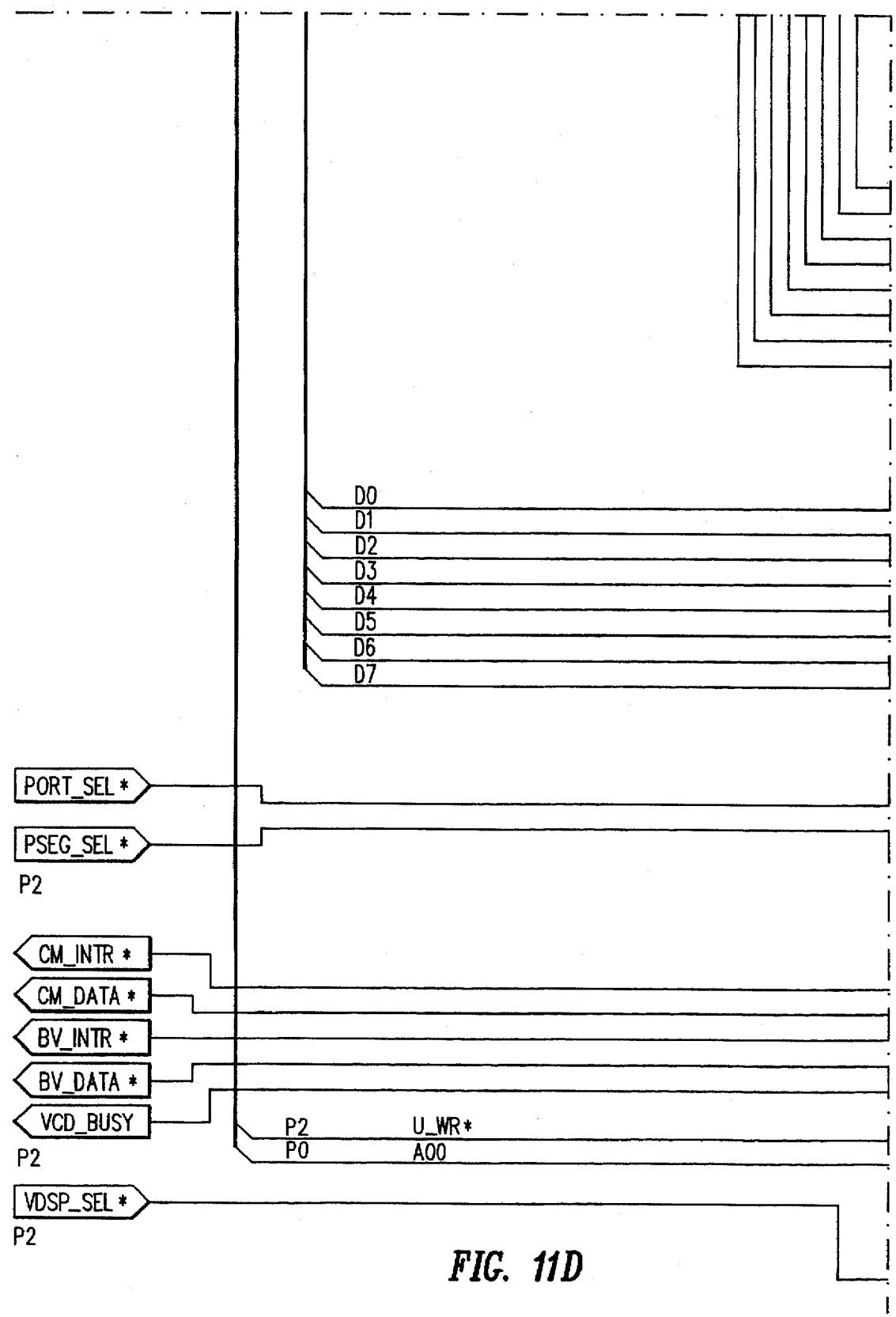
Figure 11E:
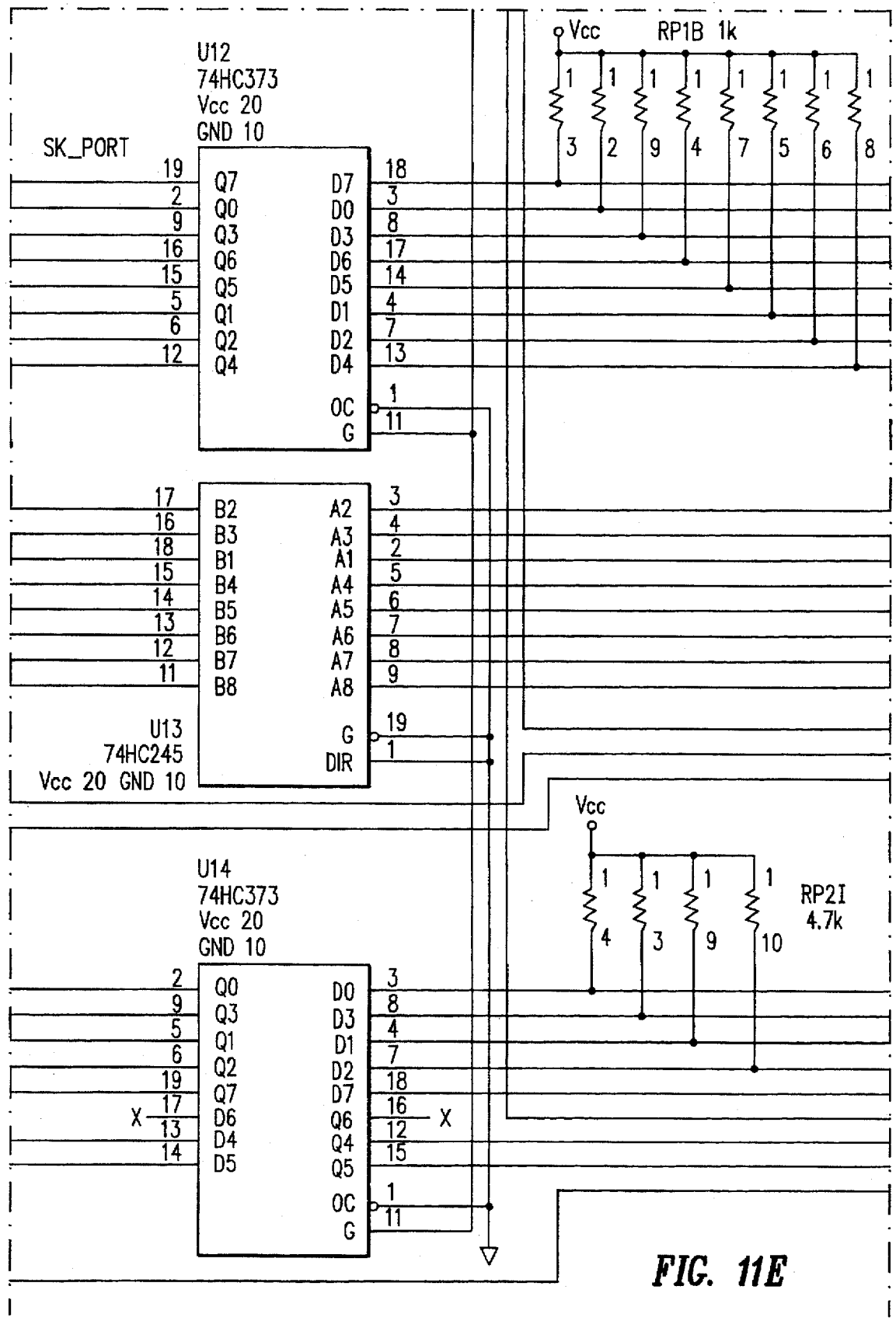
Figure 11F:
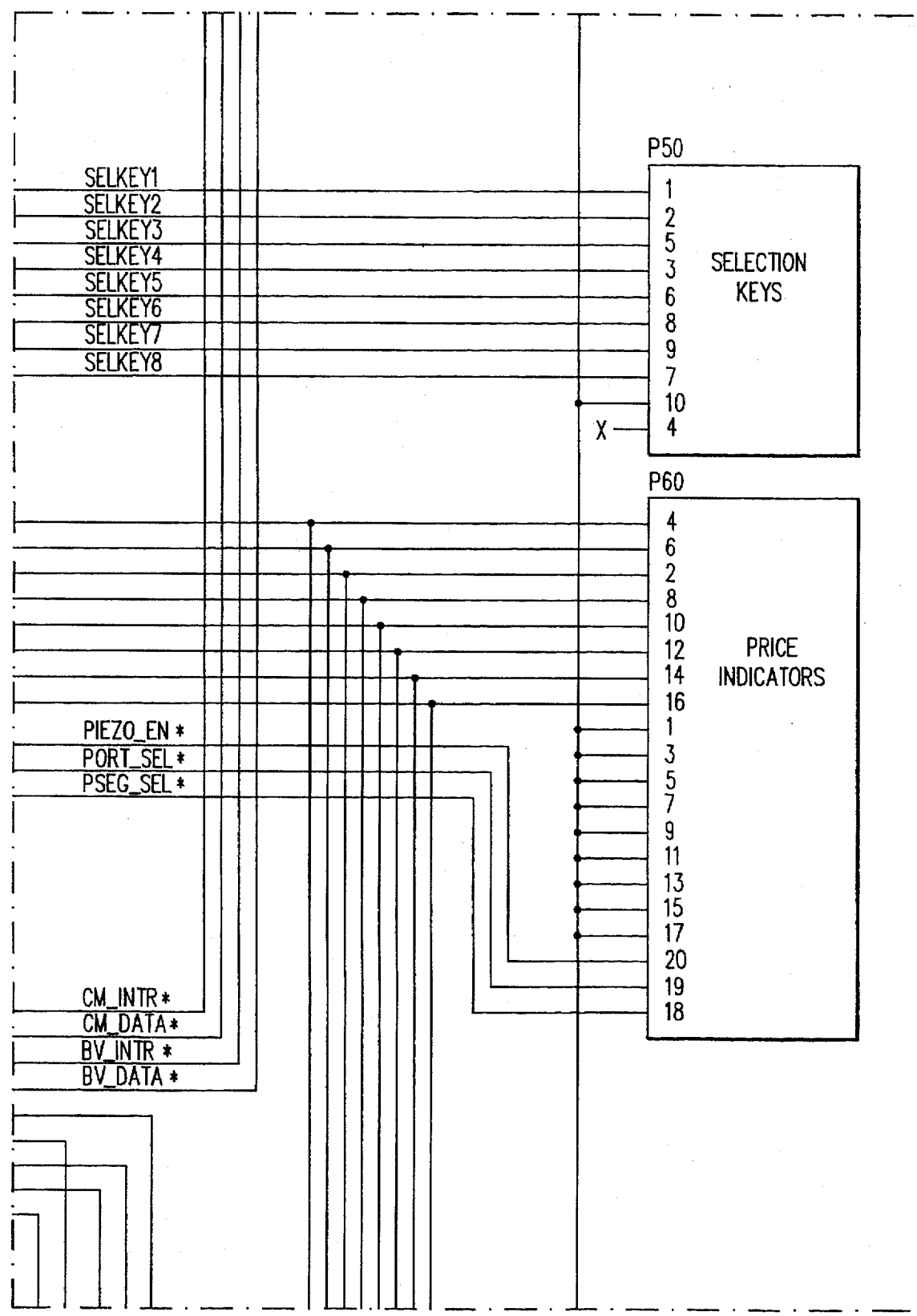
Figure 11C:
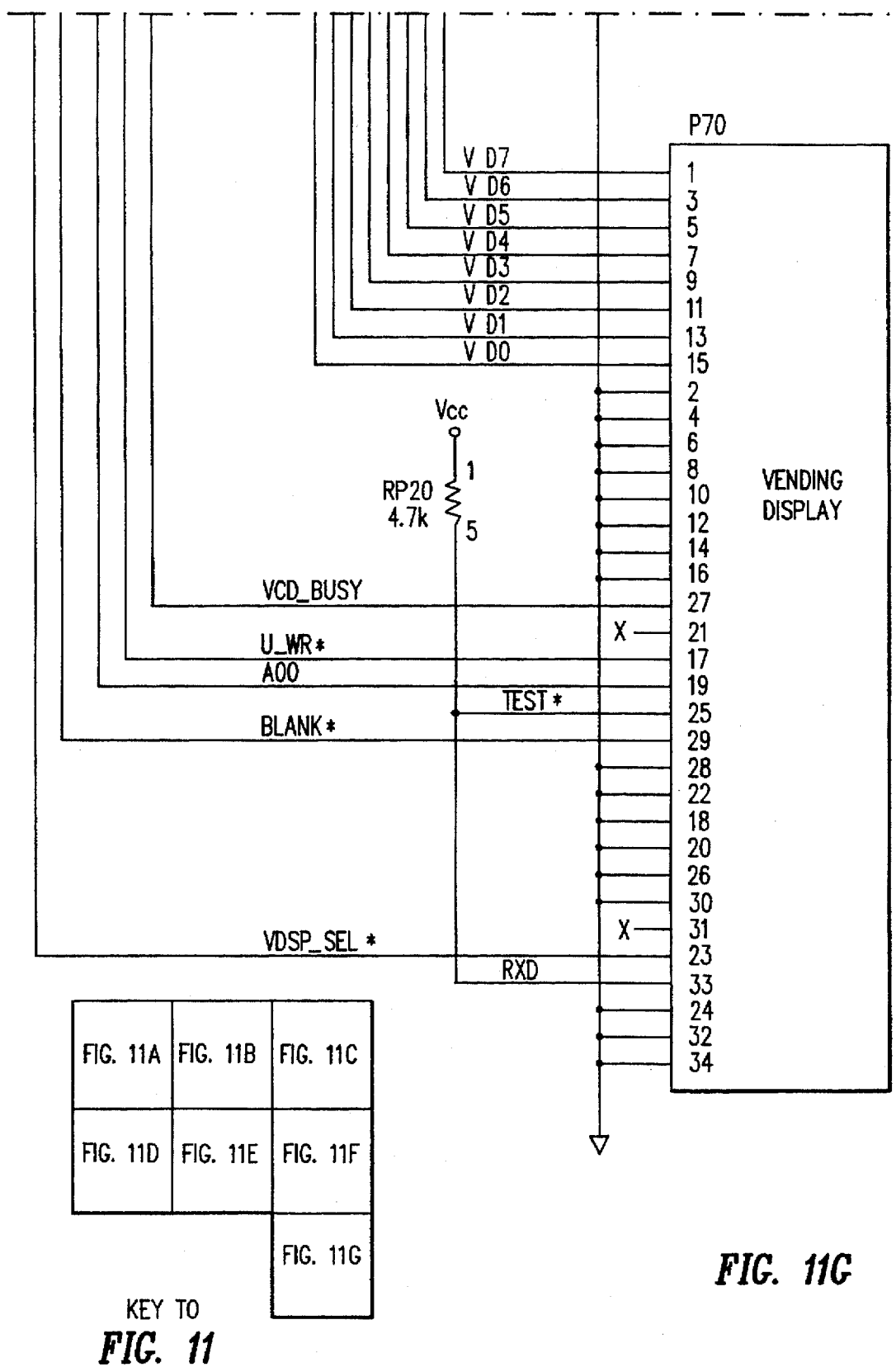
Figure 12A:
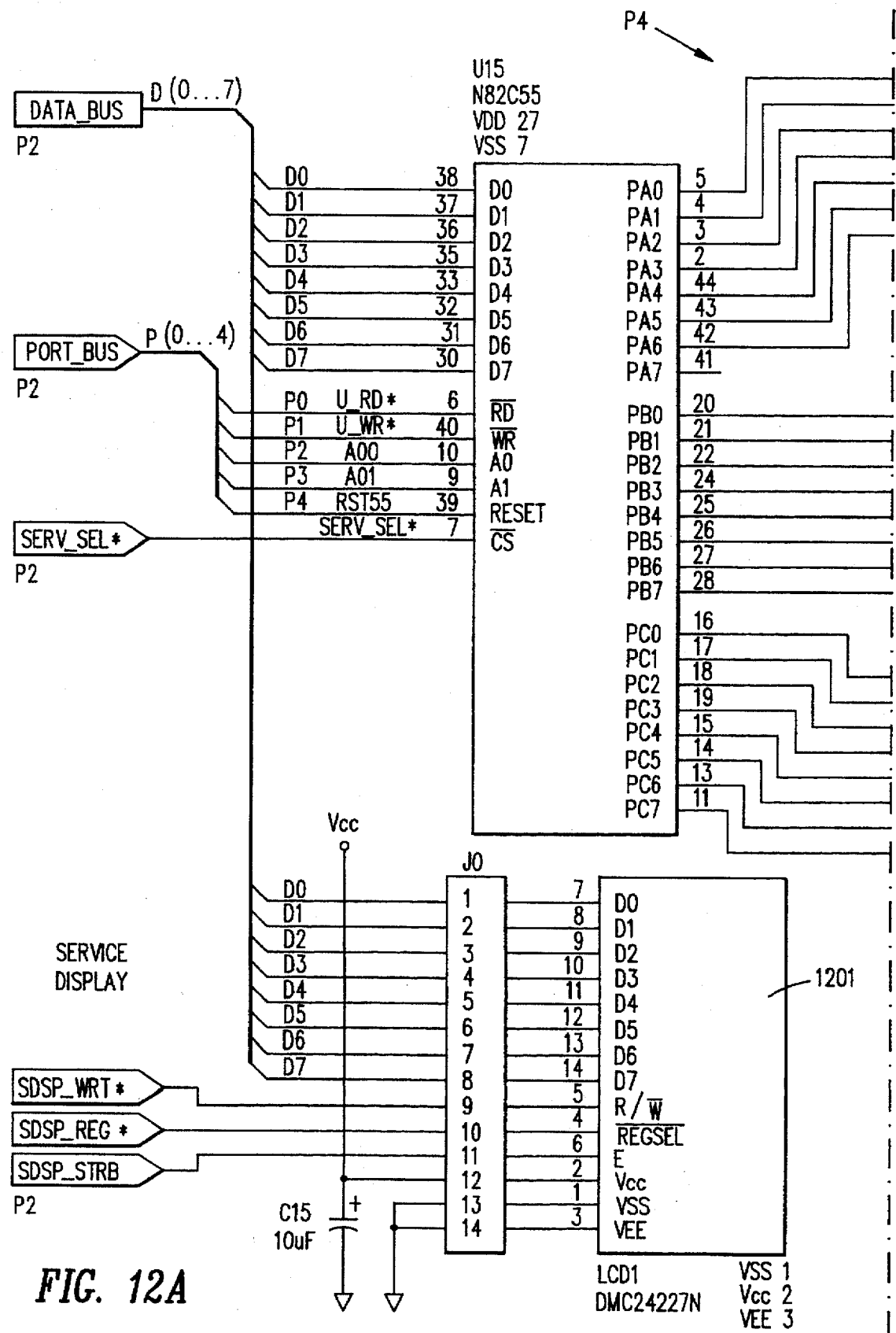
Figure 12B:
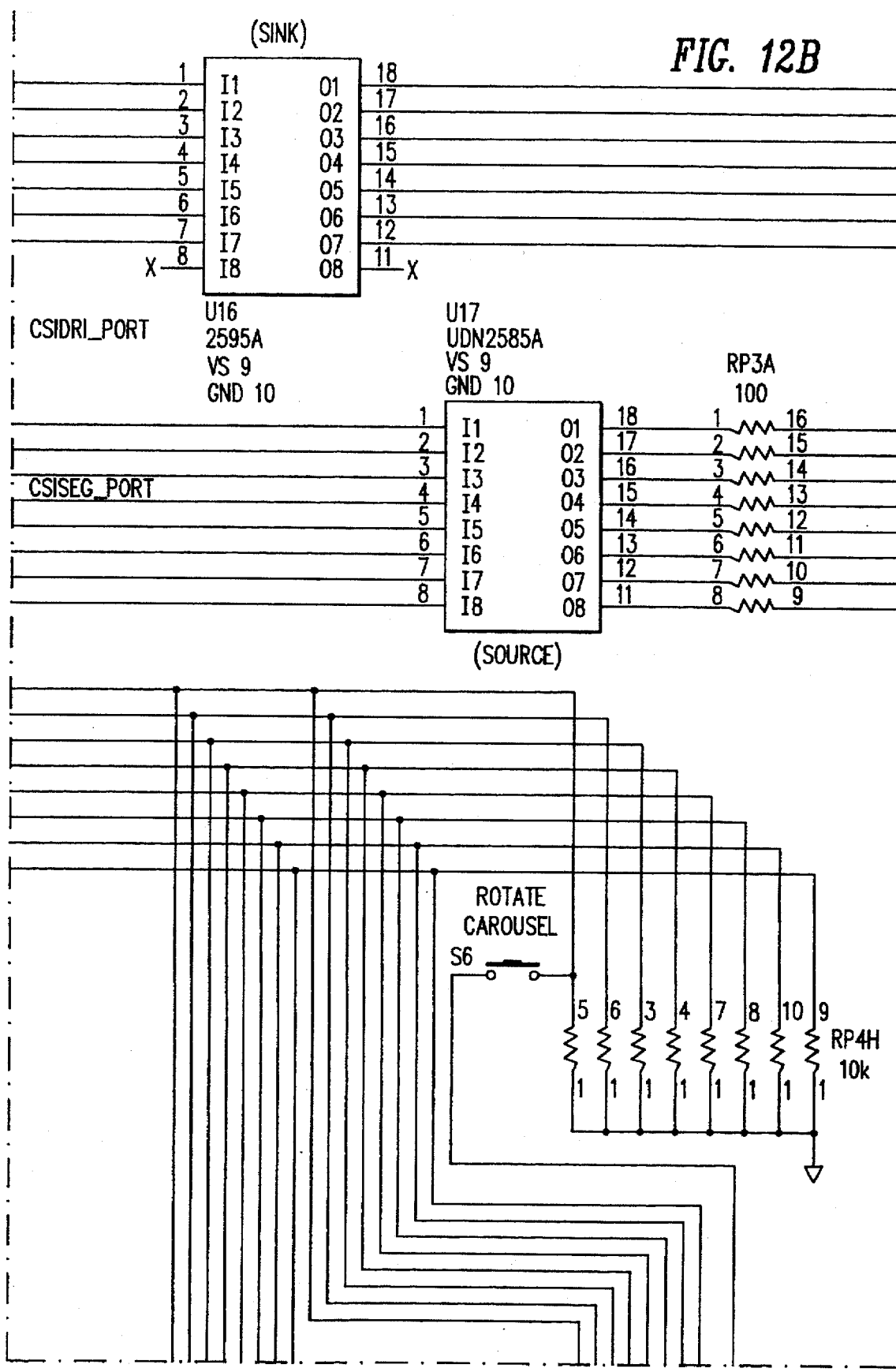
Figure 12C:
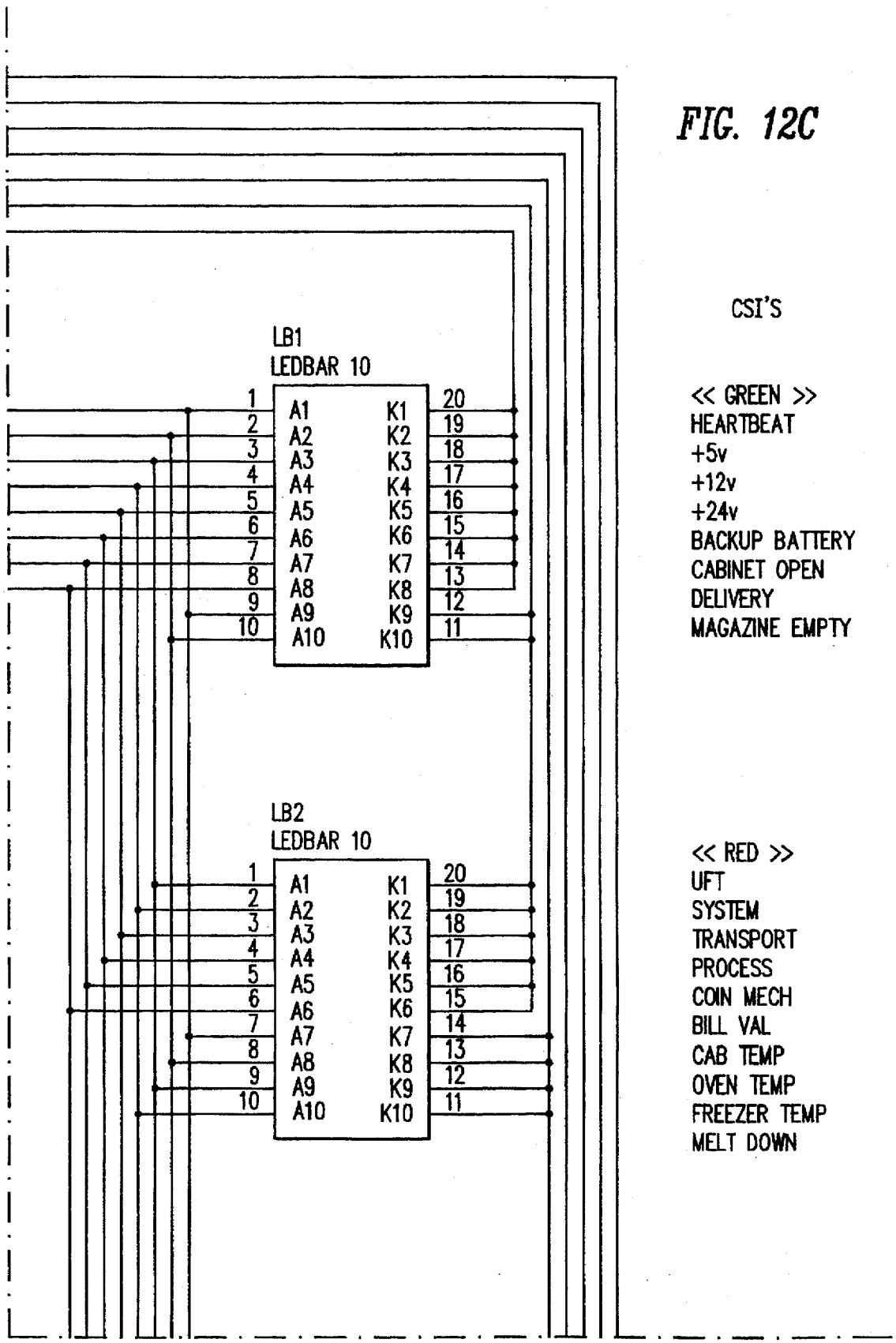
Figure 12E:
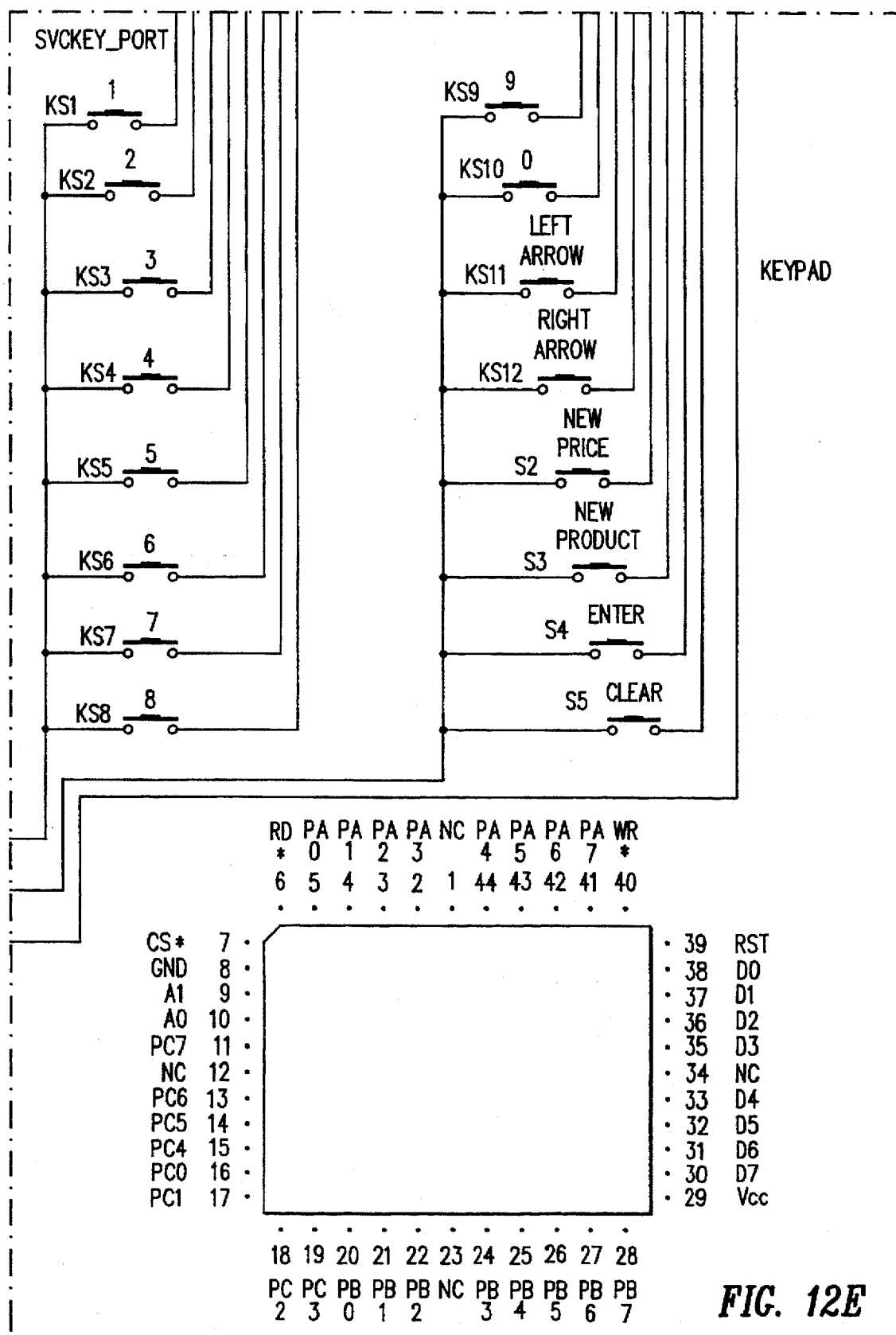
Figure 12F:
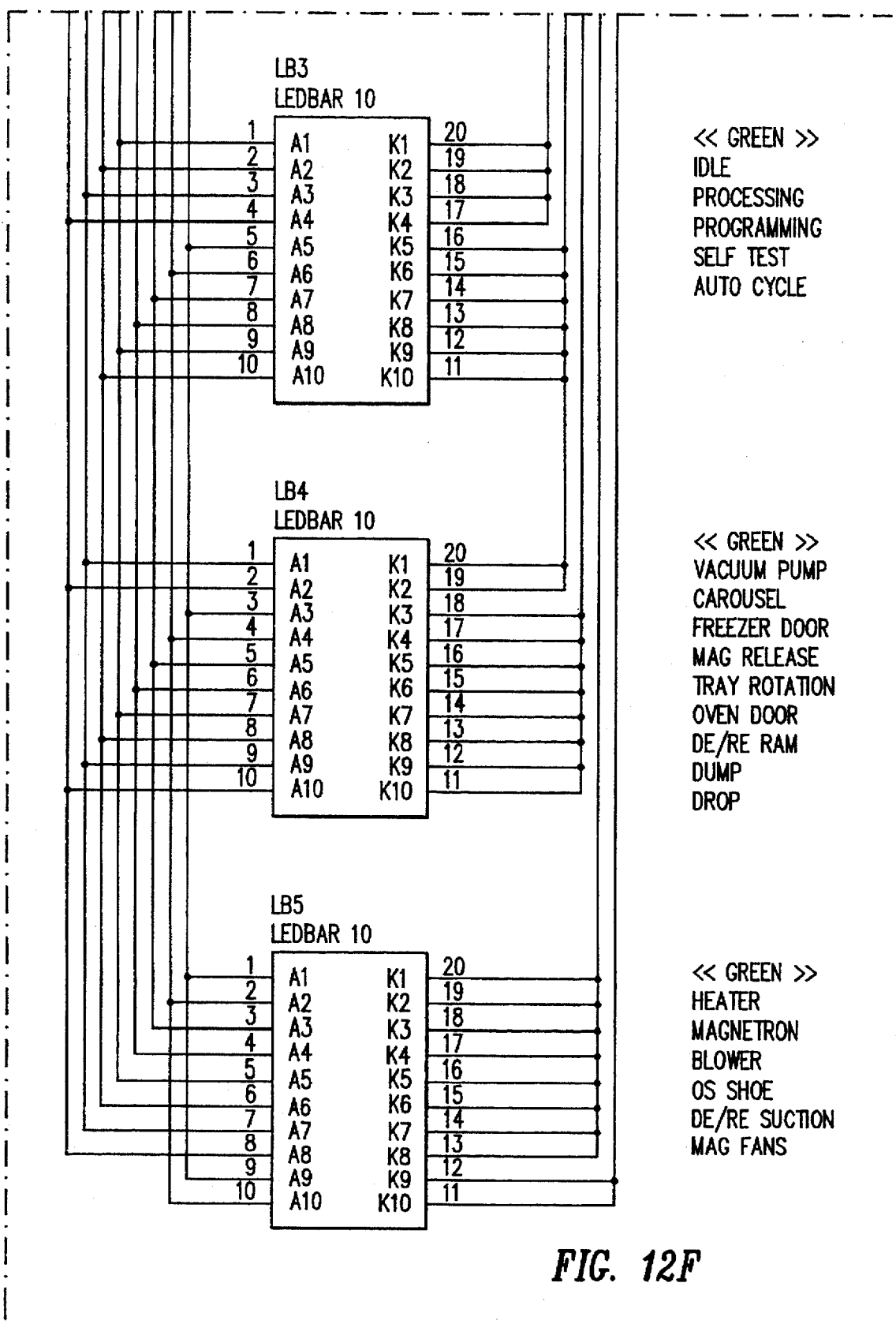
Figure 13A:
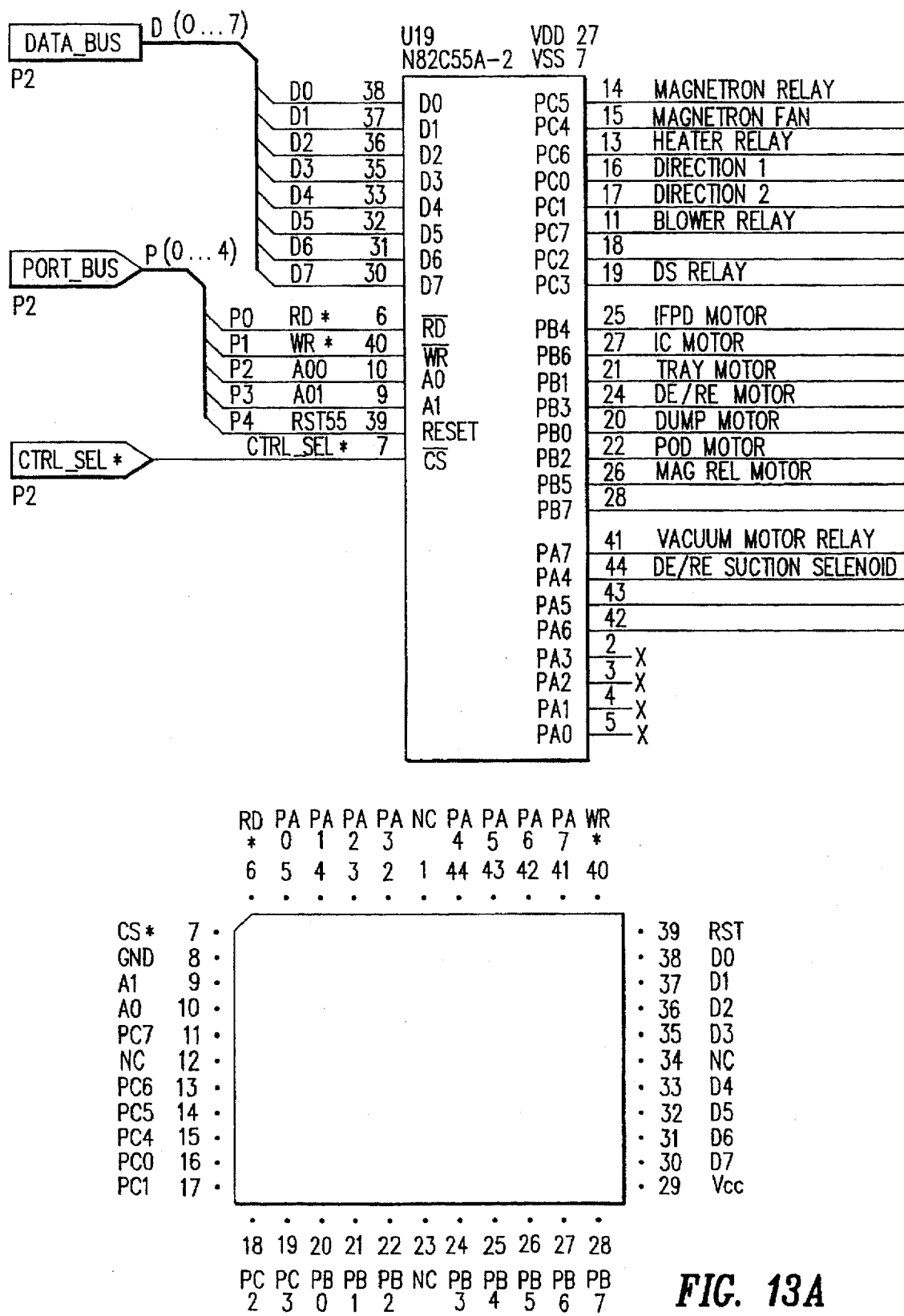
FIGS. 13A and 13F show a circuit diagram of the controls interface circuit of FIG. 9.
Figure 13B:
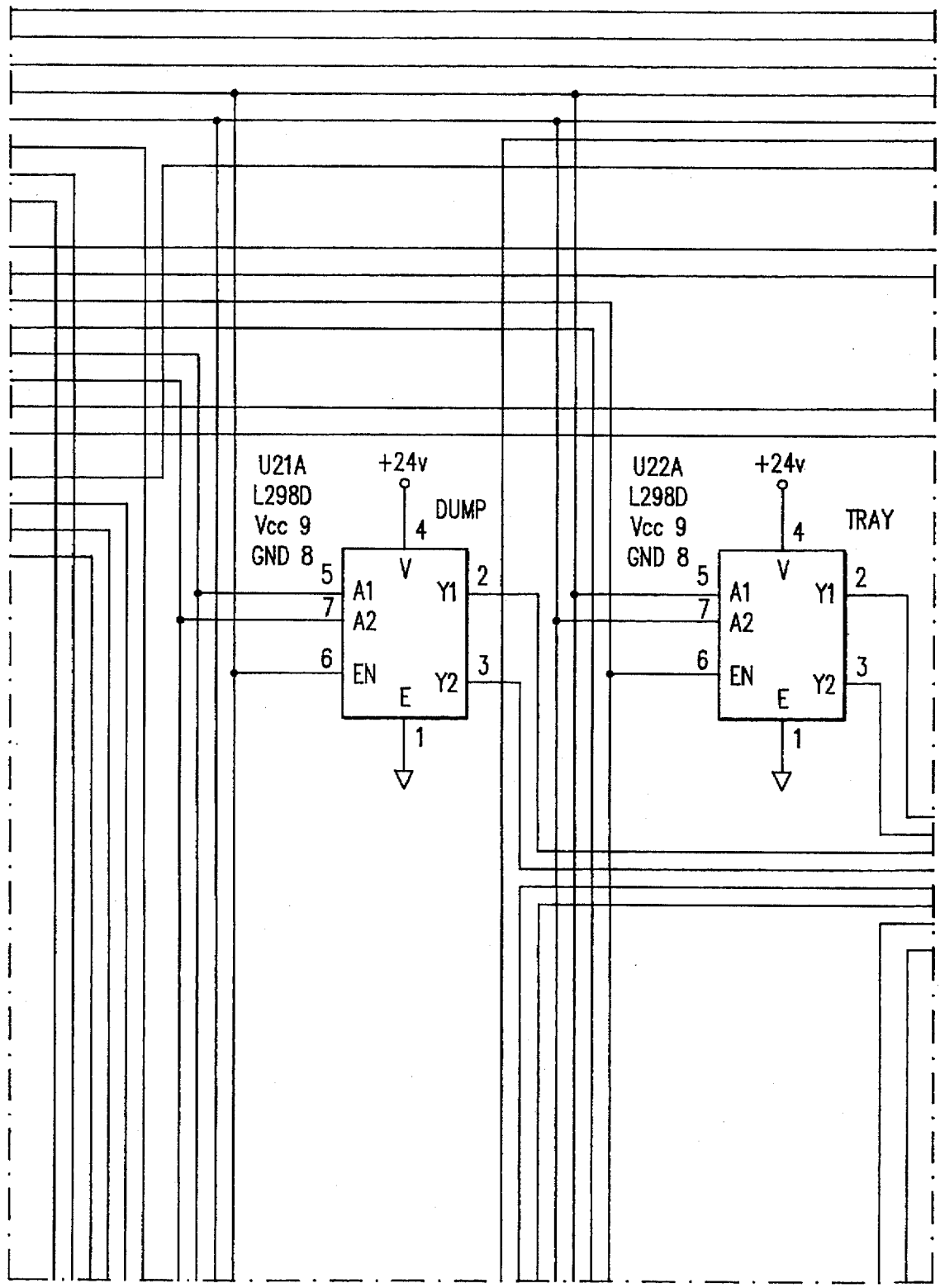
FIG. 13 is a key for assembling FIGS. 13A–13F.
Figure 13C:
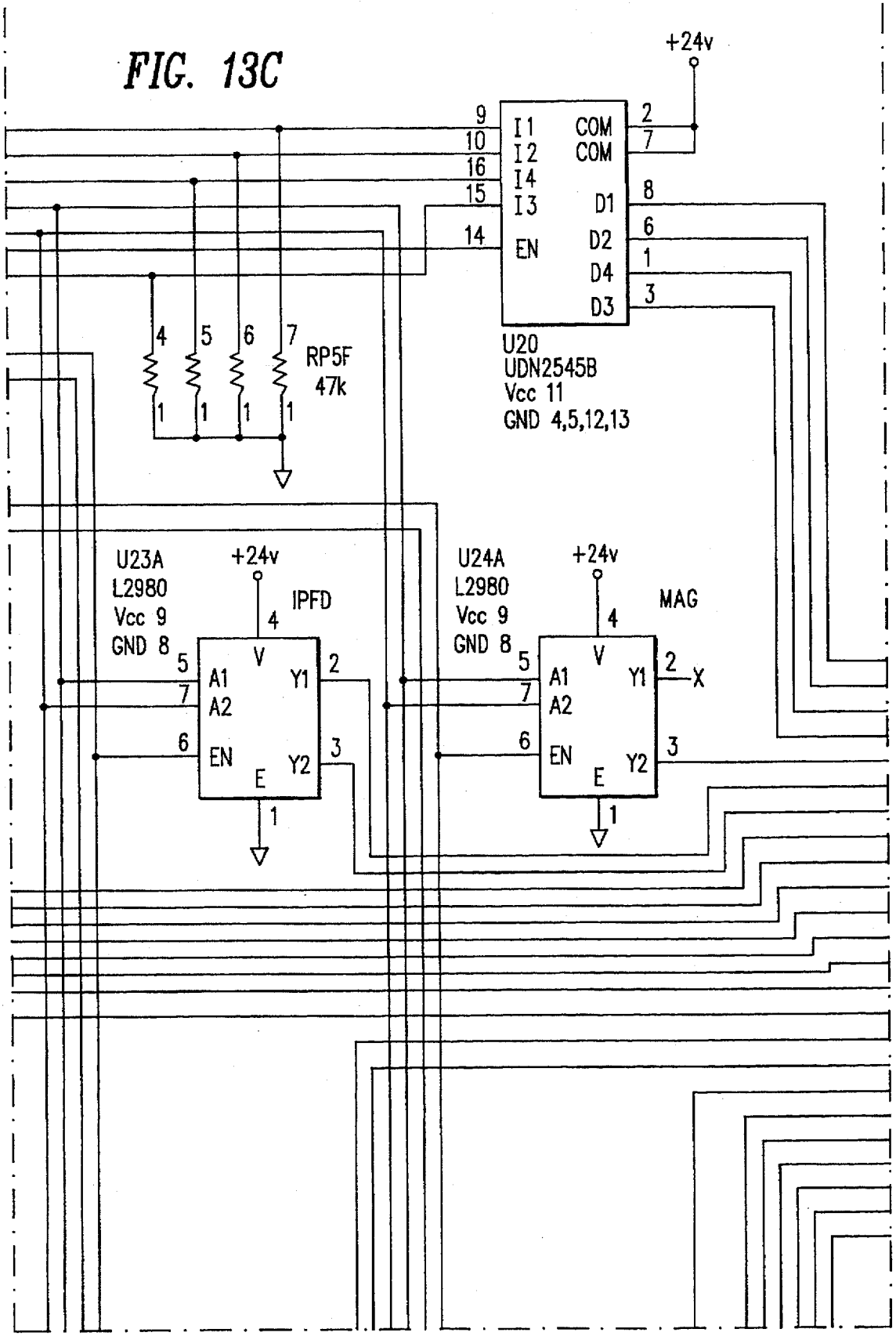
Figures 13, 13D:
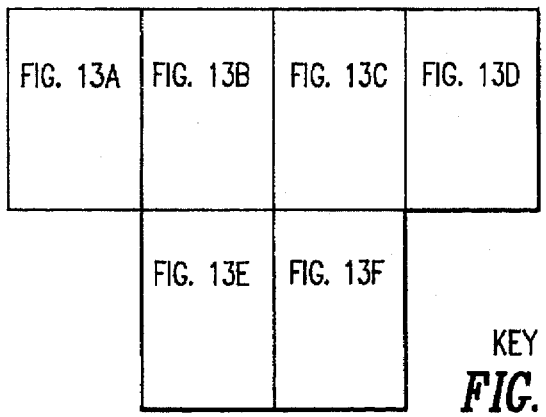
Figure 13E:
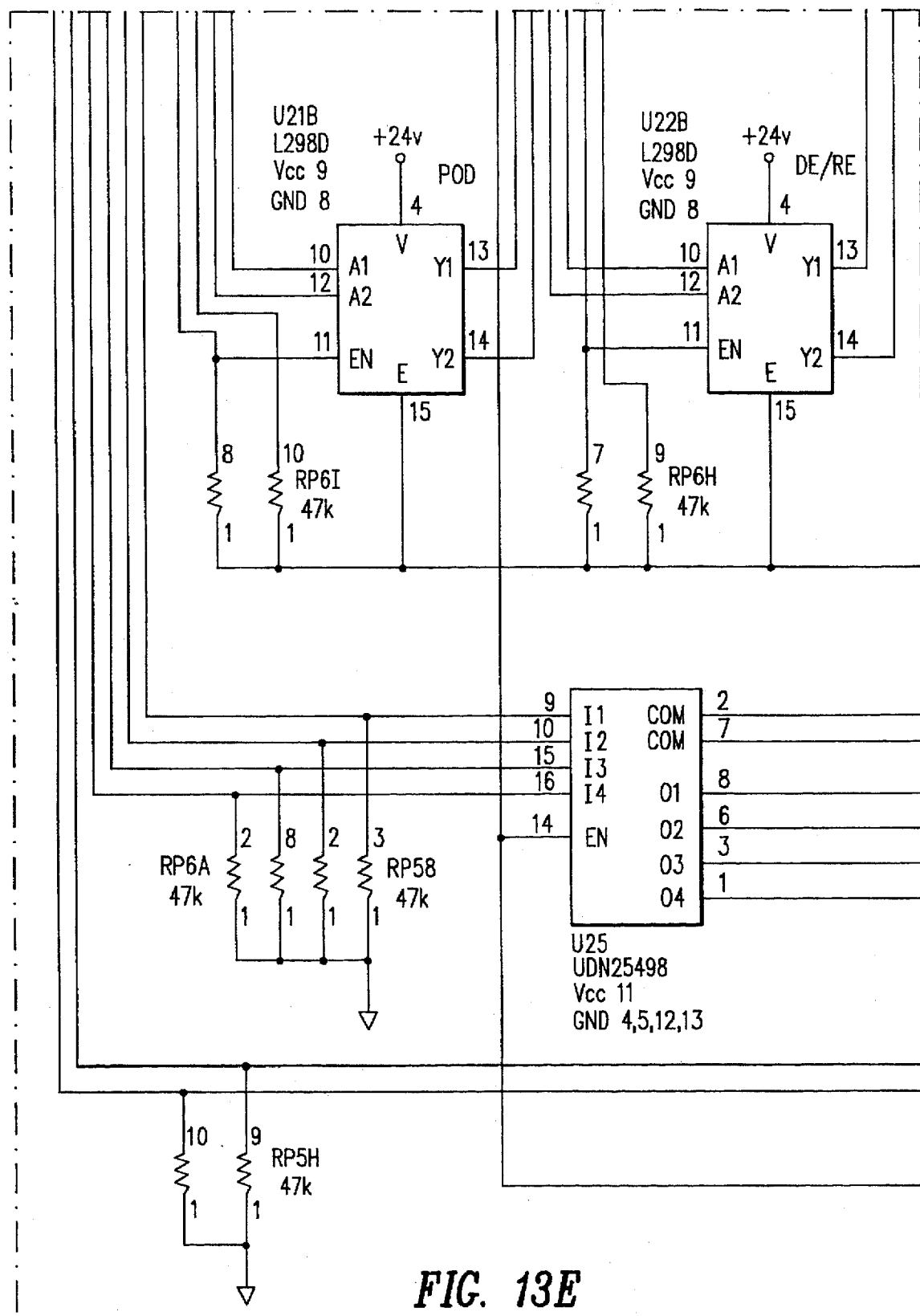
Figure 13F:
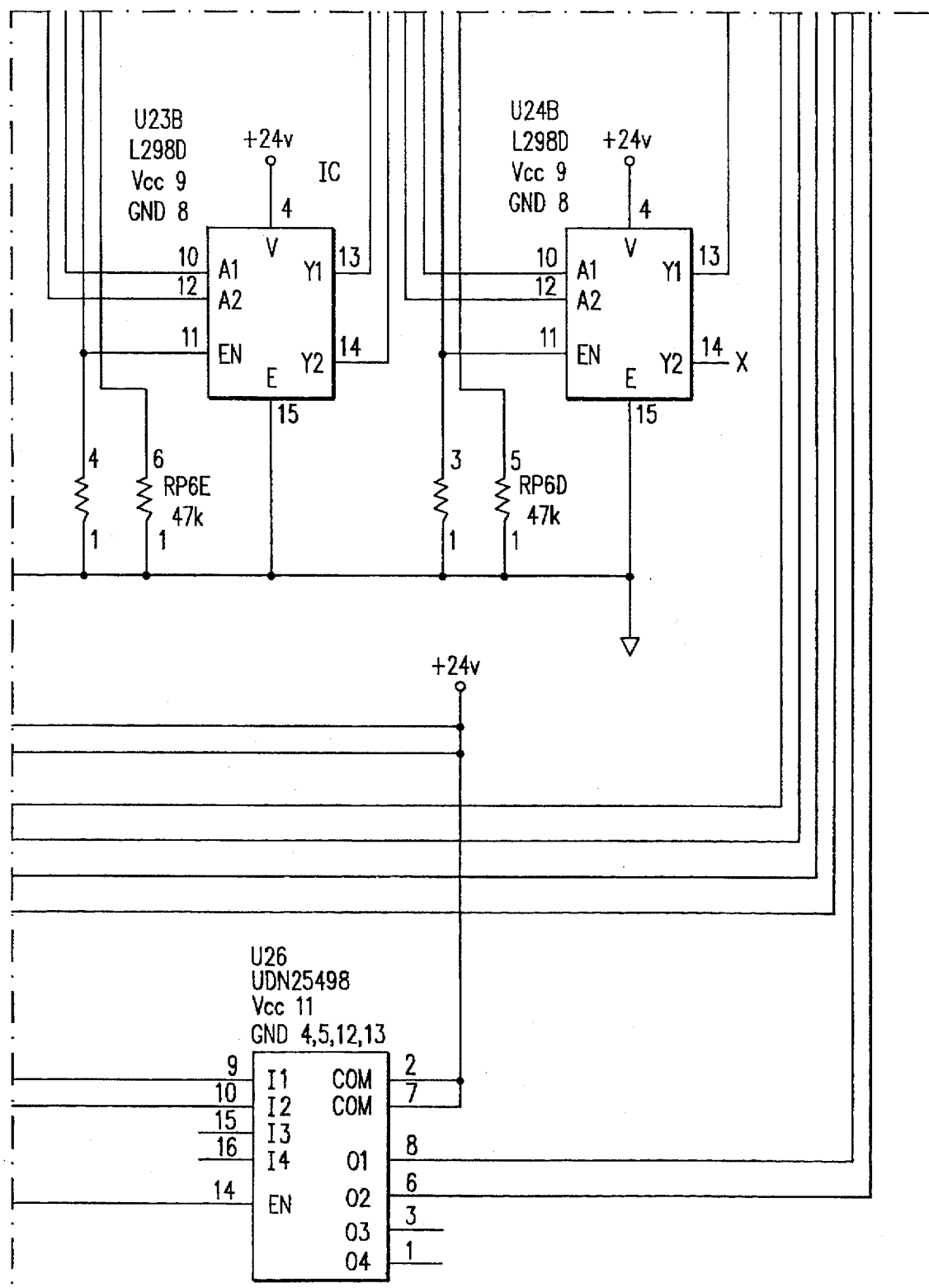

The transfer of cook cycles from RAM U7 to microprocessor U1 occurs only after a user has inserted coins and bills into the money mechanism 106, implemented in this embodiment by coin mechanism P30 and bill validator P40 and after a user presses one of the selection keys P50 (FIG. 11F).

Controller circuit P2 also includes a reset mechanism U2 which creates a pulse signal for resetting controller board P1. The pulse generated by reset mechanism U2 does not affect the non-volatile RAM U7 because RAM U7 is powered by battery V_BATT 28.

FIGS. 11A–11B show a circuit diagram for the peripherals interface circuit P3 of FIG. 9. Peripherals interface circuit P3 interfaces with the various inputs and outputs of vending machine 100, such as coin mechanism P30, bill validator P40, selection keys P50, price indicators P60 and vending display P70, via interface chips such as chips U10, U11, U12, U13, and U14. Peripherals interface circuit P3 also includes a programmable I/O chip U9 which acts as the main port for buses DATA_BUS and PORT_BUS.

Vending display P70 is one embodiment of display 105 (FIG. 1) which displays the cook process timer that measures the total time elapsed from the selected food product's introduction into the oven to its subsequent delivery. The cook process timer data is driven by the driver U14 for vending display P70.

FIGS. 12A–12F show a circuit diagram for the service interface circuit P4 of FIG. 9. Service interface circuit P4 includes keys KS1, KS2, KS3, KS4, KS5, KS6, KS7, KS8, KS9, KS10, KS11, KS12 and function keys S2, S3, S4 and S5 for one embodiment of a keypad 302 of FIG. 4A. Service interface circuit P4 includes a port U15 for the keys of keypad 302 as well as for the status displays LB1, LB2, LB3, LB4 and LB5 which are part of operator display 301 of FIG. 4A.

Service interface circuit P4 includes a service display 1201 which is included in one embodiment of an operator display 301 of FIG. 3. The prompts shown in FIGS. 7A–7F are shown on service display 1201.

FIGS. 13A–13F show a circuit diagram for controls interface circuit P5 of FIG. 9. Controls interface circuit P5 includes a programmable I/O chip U19 and various driver chips U20, U21A, U21B, U22A, U22B, U23A, U23B, U24A, U24B, U25, and U26. Controls interface circuit P5 includes a connector P9 connected to the various motors and relays of vending machine 100. For example, in connector P9, pin 1 drives the magnetron relay, pin 2 drives the magnetron fan, pin 4 drives the heater relay and pin 6 drives the oscillating shoe relay. All of the signals on the pins of connector P9 are active low signals, so that a low signal energizes the corresponding relay, which in turn drives the attached motor for example, a motor for the oscillating shoe.

Some of the components of vending machine 100 have two signals such as, for example, lines 23 and 7 both of which go to the POD motor. The two signals are such that a positive signal on line 23 and a negative signal on line 7 causes the oven door to be moved in one direction (e.g. open) while a positive signal on line 7 and a negative signal on line 23 causes the oven door be moved in another direction (e.g. shut).

Figure 14A:
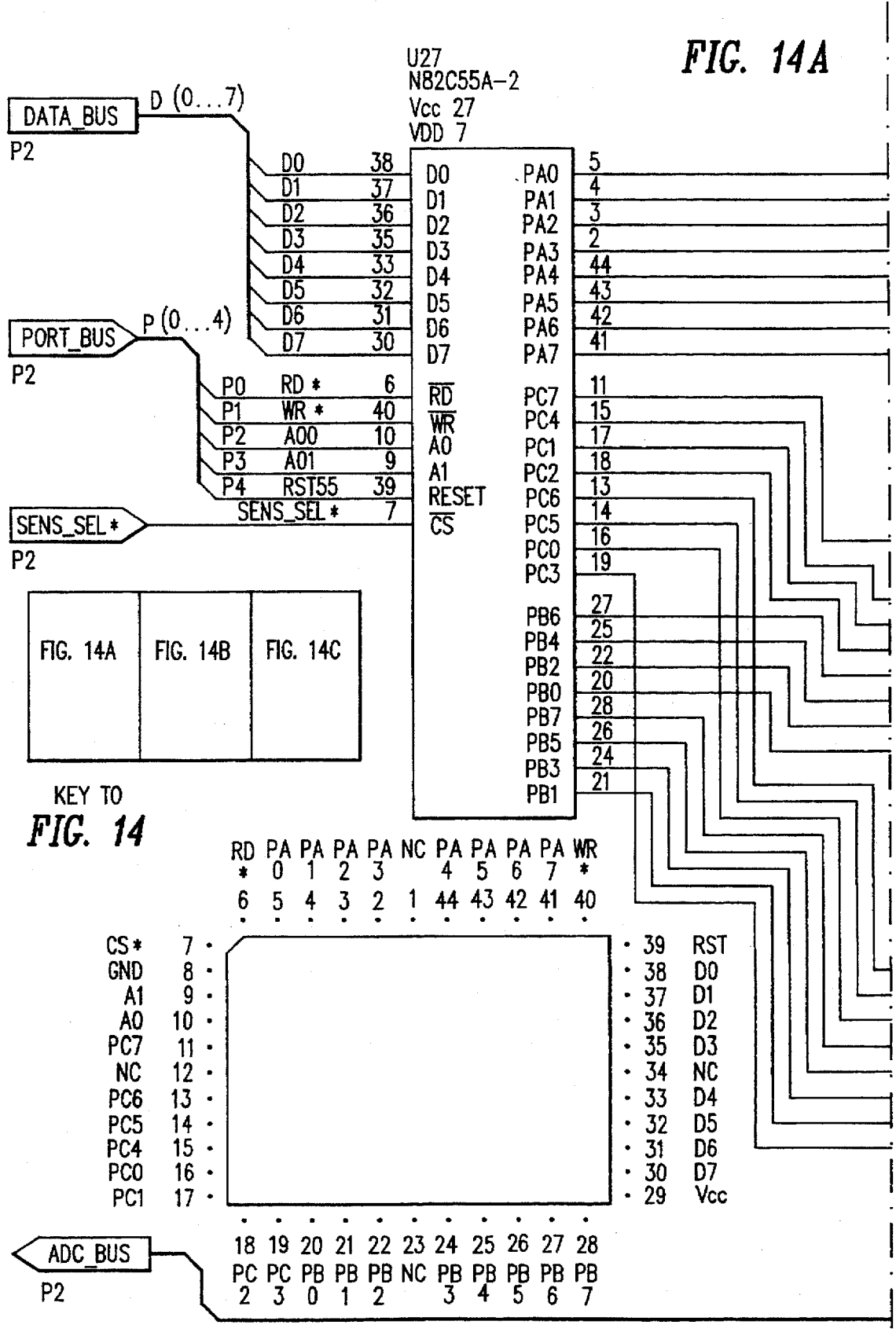
Figure 14C:
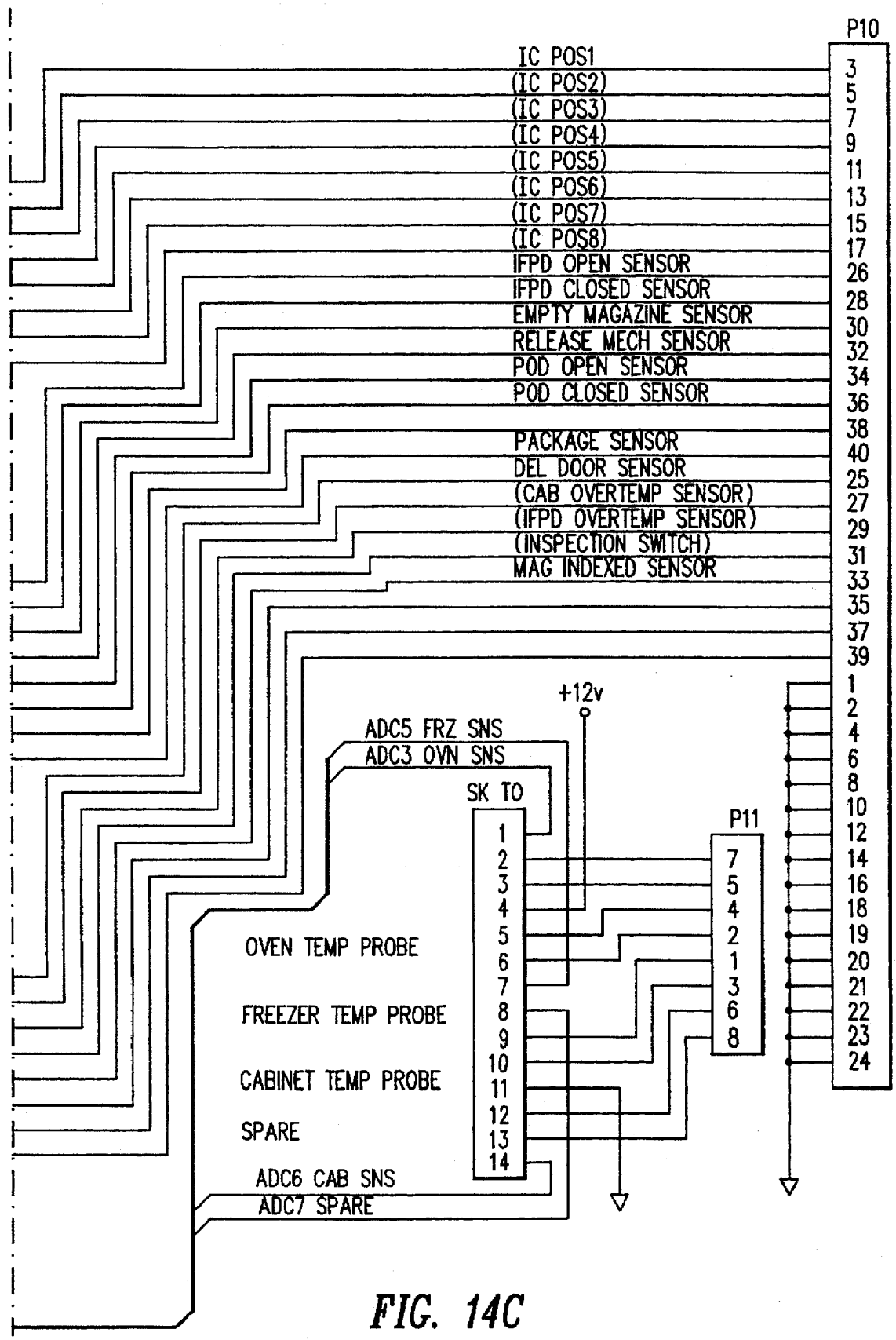

FIGS. 14A–14C show a circuit diagram for the sensors interface circuit P6 of FIG. 9. Sensors interface circuit P6 includes an oven temperature probe connected to pins 2 and 3 of socket SKT0. A thermostat controller maintains the oven temperature at 450° Fahrenheit in this embodiment. Hence, the amount of time duration for a cook cycle is determined based on an oven temperature of 450° Fahrenheit.

Figure 15A:
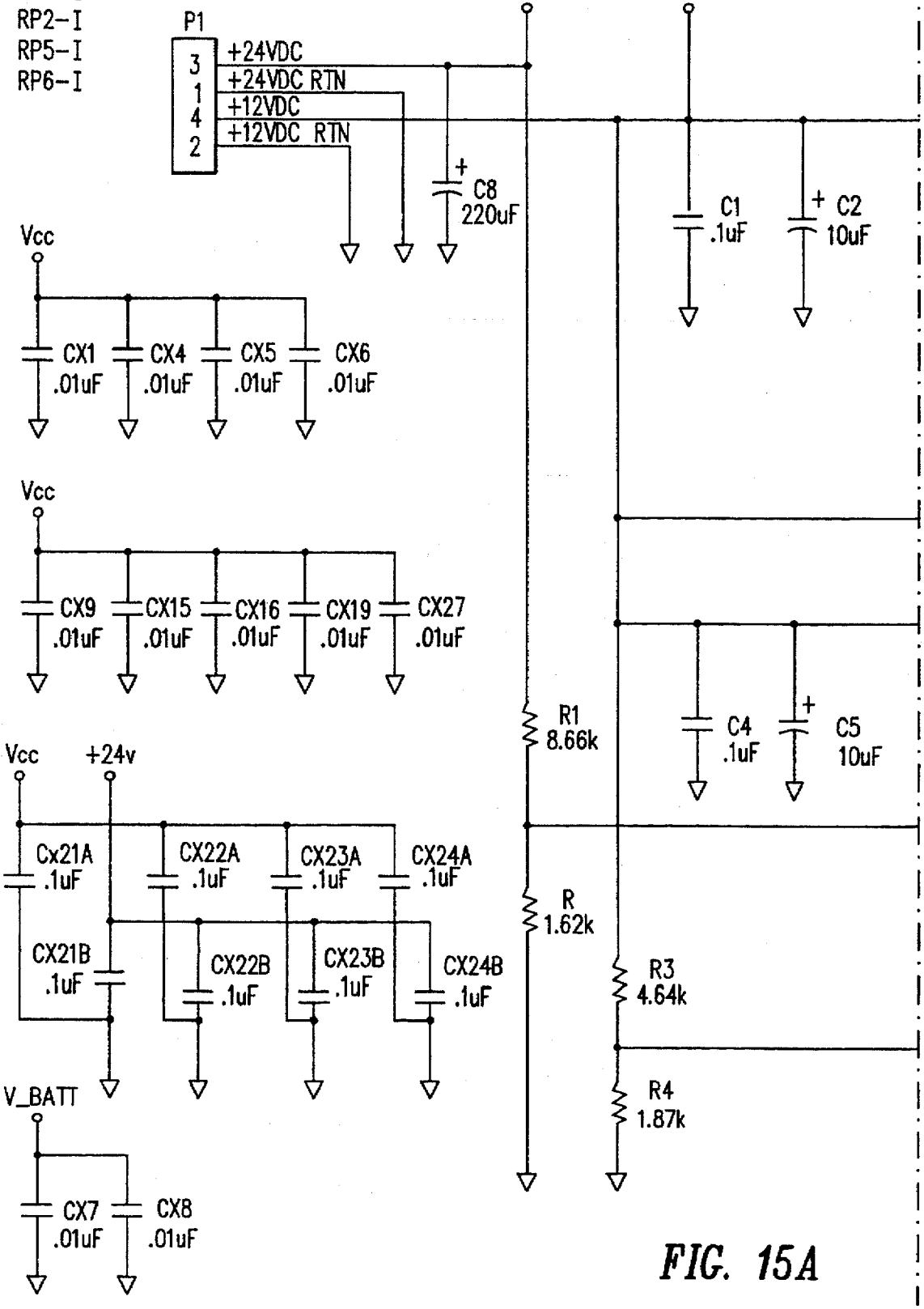
FIGS. 15A and 15B show a circuit diagram of the controller power supply circuit of FIG. 9.
Figure 15B:
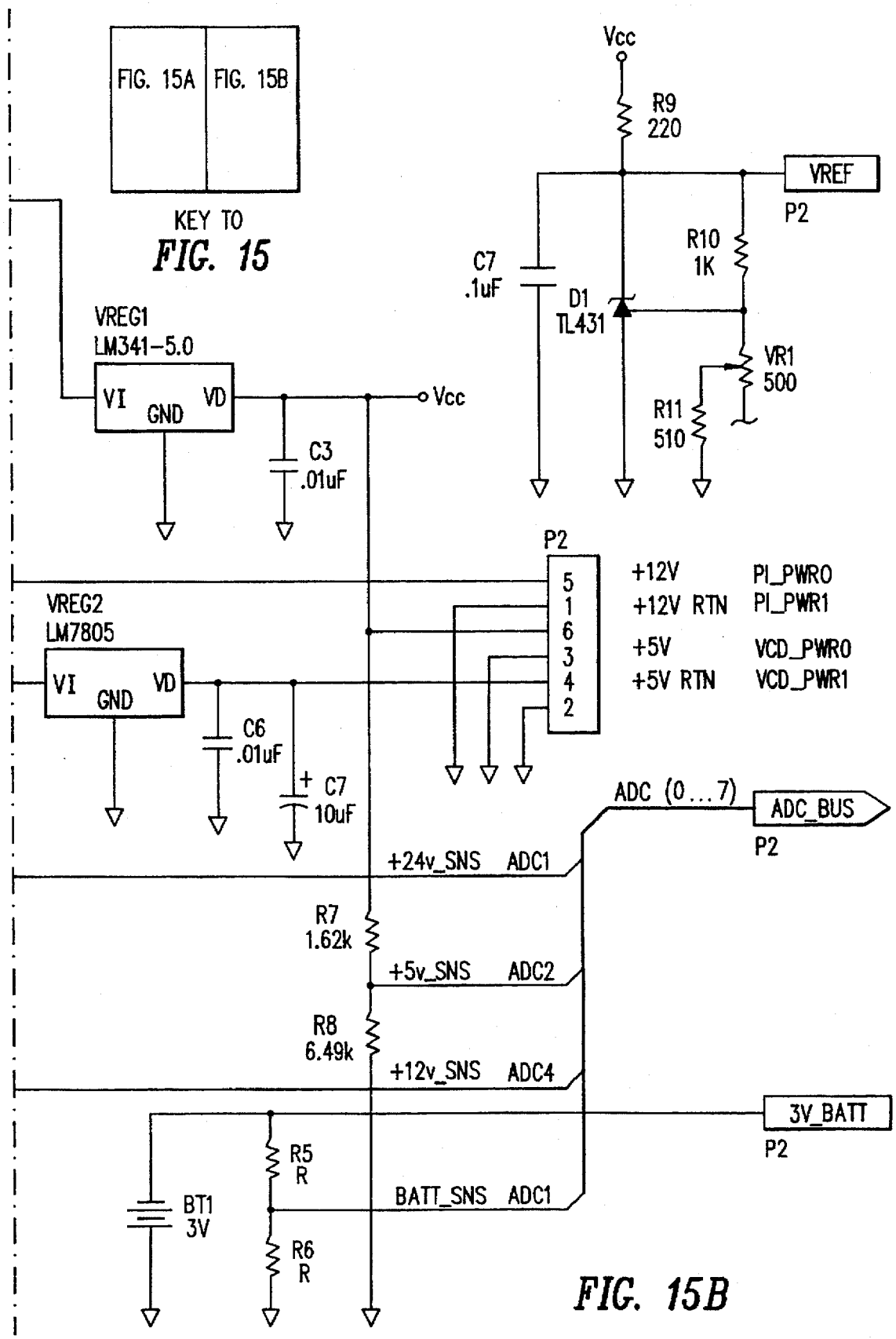

FIGS. 15A and 15B show a circuit diagram for the controller power supply circuit P7 for controller board P1 of FIG. 9. As shown in FIG. 15A, the V_BATT signal is connected via capacitors CX7 and CX8 of 0.01 microfarads, which act as filter capacitors to distribute the capacitance on the controller board. Battery BT1 of 3 volts is the 3 volt battery for the RAM U7 of FIG. 10B.

Although, in one embodiment of this invention, cook cycles currently stored in RAM 305 are programmed by an operator, such cook cycles can also be downloaded via a communication port U18 (FIG. 12D) connected to an RS232 port P8 which interfaces with a modem.

Although a vending machine has been described above, cook cycles can be used in any cooking apparatus in accordance with this invention. In one embodiment, the cook cycles are used in an oven wherein the food product is inserted by hand and the cook cycle is started once the oven door is closed and a product selection key is pressed.

Although push button product selection keys 111A, 111B, 111C and 111D are shown for one embodiment of a vending machine 100, any other type of switches can be used in accordance with this invention. For example, a sliding switching or a rotary switch can be used with different positions indicating different products.

Although two heat sources, microwave 410 and hot air impingement apparatus 416, each having three cook cycles are described above for one embodiment, any number of cook cycles can be programmed and used with any number of heat sources for cooking food in a cooking apparatus in accordance with the present invention.

Although one embodiment of the present invention described above uses a software program code stored in EEPROM, according to the principles of the present invention hardware circuits which perform the software functions are also feasible.

Although one embodiment of this invention stores start time and duration as the parameters of a cook cycle, any other form of cooking data can be stored in a cook cycle in accordance with this invention. For example, instead of duration, a different parameter such as a stop time can be stored in the cook cycle. Moreover, additional parameters such as pressure of hot air, oven temperature or surface temperature of the food product can also be stored in a cook cycle.

Although in one embodiment, cook cycles in EEPROM are transferred into random-access-memory where they are optionally programmed by an operator, in another embodiment, there is no random-access-memory for the cook cycles. Instead, the EEPROM cook cycles are directly used by the microprocessor and the operator is not allowed to change the EEPROM cook cycles programmed at the factory.

Although in one embodiment the food product to be cooked is transferred automatically from a carousel to a location adjacent to a heat source, the food product can be transferred by any other means. For example, a user can insert the food product into an oven, shut the oven door and then operate the product selection key to signal the microprocessor to start cooking the food product.

The above description is intended to illustrate specific embodiments of the present invention and is not intended to be limiting. The person of ordinary skill in the art will be able to derive numerous modifications and variations within the scope of the present invention as defined in the following claims.

APPENDIX A

```
;---------------------------------------------------------------;
;
;                    CSTARTUP.S03
;
;
;
;---------------------------------------------------------------;
       NAME    CSTARTUP $defmodel.inc                       ; Defines memory model EXTERN     _R                ; Register bank (0, 8, 16 or 24)
       EXTERN     resets                    ;do this first ;---------------------------------------------------------------;
; The C stack segment. Should be mapped into internal data RAM
;
;---------------------------------------------------------------;

RSEG    CSTACK
stack_begin:

DS      30                   ; Increase if needed

COMMON     INTVEC            ; Should be at location zero startup:   LJMP   init_C
       RSEG    RCODE                ;Should be loaded after INTVEC init_C:    MOV    SP,#stack_begin - 1 ; From low to high addresses ;---------------------------------------------------------------;
;           C variable initialization section
;
;           ================================
;
;---------------------------------------------------------------;

MOV   R0,#stack_begin - 1  ; Assumes that CSTACK is last
CLEAR_IRAM:
          MOV   @R0,#0
          DJNZ  R0,CLEAR_IRAM MOV   DPTR,#SFE (X_UDATA)     ; XDATA
          MOV   R6,DPH
          MOV   R7,DPL
          MOV   DPTR,#SFB (X_UDATA)
NEXT_X_UDATA:
          LCALL COMP_R67_DPTR
          JZ    INIT_VARS
          CLR   A
          MOVX  @DPTR,A
          INC   DPTR
          SJMP  NEXT_X_UDATA INIT_VARS:
          MOV   DPTR,#DATA_TABLE     ; DATA
          LCALL DI_INIT
```

-31-

```
                MOV     DPTR,#IDATA_TABLE       ; IDATA
                LCALL   DI_INIT
                MOV     DPTR,#XDATA_TABLE       ; XDATA
                LCALL   X_INIT
 5              MOV     DPTR,#YDATA_TABLE       ; For the -y compiler option
                LCALL   X_INIT ;---------------------------------------------------------;
        ;        C variable initialization section end
10      ;
        ;---------------------------------------------------------;

mov        psw,#_R      ;select the initial register bank
15              lcall   resets          ;perform vmc resets() tasks ;---------------------------------------------------------;
        ; Last part of the C variable initializer code.
20      ;
        ;---------------------------------------------------------;
        COMP_R67_DPTR:
        ;=====================================;
        ;         *** WDG ***                 ;
25      ;                                     ;
        ; ACC, B, R0-R3 may be used           ;
        ;=====================================;
                MOV     A,R7
                XRL     A,DPL
30              JNZ     NOT_EQUAL
                MOV     A,R6
                XRL     A,DPH
        NOT_EQUAL:
                RET
35      DI_INIT:
                CLR     A
                MOVC    A,@A+DPTR
                MOV     R0,A
40              MOV     A,#1
                MOVC    A,@A+DPTR
                MOV     R1,A
                MOV     A,#2
                MOVC    A,@A+DPTR
45              MOV     R6,A
                MOV     A,#3
                MOVC    A,@A+DPTR
                MOV     DPL,A
                MOV     DPH,R6
50      MORE_DI_COPY:
        ;=====================================;
        ;         *** WDG ***                 ;
        ;                                     ;
        ; ACC, B, R2-R6 may be used           ;
55      ;=====================================;
                MOV     A,R0
                XRL     A,R1
                JNZ     $+3
                RET
60              CLR     A
                MOVC    A,@A+DPTR
                MOV     @R0,A
                INC     DPTR
                INC     R0
65              SJMP    MORE_DI_COPY
```

```
        X_INIT:
            CLR     A
            MOVC    A,@A+DPTR
            MOV     R4,A
  5         MOV     A,#1
            MOVC    A,@A+DPTR
            MOV     R5,A
            MOV     A,#2
            MOVC    A,@A+DPTR
 10         MOV     R6,A
            MOV     A,#3
            MOVC    A,@A+DPTR
            MOV     R7,A
            MOV     A,#4
 15         MOVC    A,@A+DPTR
            MOV     R0,A
            MOV     A,#5
            MOVC    A,@A+DPTR
            MOV     DPL,A
 20         MOV     DPH,R0
        MORE_X_COPY:
            LCALL   COMP_R67_DPTR
            JNZ     $+3
            RET
 25         CLR     A
            MOVC    A,@A+DPTR
            INC     DPTR
            MOV     R0,DPH
            MOV     R1,DPL
 30         MOV     DPH,R4
            MOV     DPL,R5
            MOVX    @DPTR,A
            INC     DPTR
            MOV     R4,DPH
 35         MOV     R5,DPL
            MOV     DPH,R0
            MOV     DPL,R1
            SJMP    MORE_X_COPY

40     DATA_TABLE:
            DB      SFB (D_IDATA)
            DB      SFE (D_IDATA)
            DW      SFB (D_CDATA)
        IDATA_TABLE:
 45         DB      SFB (I_IDATA)
            DB      SFE (I_IDATA)
            DW      SFB (I_CDATA)
        XDATA_TABLE:
            DW      SFB (X_IDATA)
 50         DW      SFE (X_CDATA)
            DW      SFB (X_CDATA)
        YDATA_TABLE:
            DW      SFB (ECSTR)
            DW      SFE (CCSTR)
 55         DW      SFB (CCSTR)

RSEG    D_UDATA
            RSEG    I_UDATA
            RSEG    X_UDATA
 60         RSEG    D_CDATA
            RSEG    I_CDATA
            RSEG    X_CDATA
            RSEG    D_IDATA
            RSEG    I_IDATA
 65         RSEG    X_IDATA
```

```
            RSEG    ECSTR
            RSEG    CCSTR

ENDMOD      startup
;----------------------------------------------------------------;
; Function/module: exit (int code)
;
;
; When C-SPY is used this code will automatically be replaced
;
; by a 'debug' version of exit().
;
;----------------------------------------------------------------;
            MODULE      exit PUBLIC      exit
            $DEFFN      exit(0,0,0,0,0,0,0,0)
            PUBLIC      ?C_EXIT

RSEG    RCODE

END
```

We claim:

1. An apparatus comprising:
a microcontroller;
a product selection switch coupled to said microcontroller, said product selection switch being associated with one or more displays for indicating a food product to be selected by a user, said product selection switch indicating a selected food product to said microcontroller on being operated by said user;
a memory coupled to said microcontroller, said memory storing a plurality of data structures, each data structure comprising a cook cycle representative of the process for cooking a food product by a heat source, each cook cycle comprising a default cook cycle parameter;
a keypad connected to said microcontroller, wherein said keypad transmits a modified cook cycle parameter to said microcontroller on entry of said modified cook cycle parameter by an operator, and further wherein said microcontroller overwrites said default cook cycle parameter with said modified cook cycle parameter in said memory; and
a first heat source having an input lead coupled to said microcontroller;
wherein said microcontroller reads from said memory said modified cook cycle parameter corresponding to said selected food product indicated by said product selection switch and wherein said microcontroller operates said first heat source to heat at least a portion of said selected food product using said modified cook cycle parameter to control operation of said first heat source.

2. The apparatus of claim 1 further comprising a money acceptor having an output lead coupled to said microcontroller, said microcontroller initiating heating of selected food product only after said money acceptor signals receipt of a predetermined amount of money.

3. The apparatus of claim 1 further comprising a delivery chute, said delivery chute delivering said selected product after cooking by said heat source.

4. The apparatus of claim 1 further comprising a refrigeration compartment and a refrigeration unit, said refrigeration unit keeping said food product cool in said refrigeration compartment.

5. The apparatus of claim 1 wherein said first heat source comprises a microwave oven.

6. The apparatus of claim 1 wherein said first heat source comprises a hot air impingement apparatus.

7. The apparatus of claim 1 wherein said memory comprises a random access memory and a read only memory, said read only memory being encoded with at least said data structure, and further wherein said microcontroller loads at least a portion of said data structure from said read only memory into said random access memory on startup of said apparatus.

8. The apparatus of claim 7 further comprising a battery, wherein said random access memory is coupled to and at least partially powered by said battery.

9. The apparatus of claim 8 wherein a first cook cycle encoded in said random access memory and corresponding to a first food product is different from a second cook cycle encoded in said read only memory for said first food product.

10. The apparatus of claim 8 wherein said apparatus except for said random access memory is substantially powered by a primary power supply and said random access memory maintains said modified cook cycle parameter for at least a period of time during loss of power from said primary power supply.

11. The apparatus of claim 7 wherein said cook cycle encoded in said read only memory comprises start times and durations for automatically turning on and off said first heat source multiple times during operation by said microcontroller.

12. The apparatus of claim 1 comprising a plurality of heat sources, each of said plurality of heat sources having an input lead coupled to said microcontroller, said microcontroller using said data structure to operate at least two of said plurality of heat sources to cook said selected food product.

13. The apparatus of claim 12 wherein said first heat source is a microwave and a second heat source is a hot air impingement apparatus.

14. The apparatus of claim 1 further comprising a transfer mechanism which transfers said food product to a location sufficiently adjacent said heat source for cooking by said heat source.

15. The apparatus of claim 13 further comprising means for using a plurality of cook cycles to automatically turn on and off multiple times each of said microwave and said hot air impingement apparatus.

16. A method for cooking a food product selected by a user, said method comprising:
storing in memory of a computer a default cook cycle parameter, said default cook cycle parameter being included in a cook cycle, said cook cycle being representative of the process for cooking a food product by a heat source;
receiving a modified cook cycle parameter from a keypad and overwriting said default cook cycle parameter with said modified cook cycle parameter in said memory;
receiving a food product selection signal;
retrieving from said memory said cook cycle on receipt of said food product selection signal;
selecting a first heat source from a plurality of heat sources; and
operating said first heat source to cook said selected food product using said cook cycle parameter from said modified cook cycle to control operation of said first heat source.

17. The method of claim 16 wherein each cook cycle comprises a cook start time, said operating step comprising turning on said first heat source after passage of said cook start time, said cook start time being measured from the time a door of an oven is closed.

18. The method of claim 17 wherein said cook cycle parameter is a duration of time, said operating step comprising turning off said first heat source after said duration of time, said duration being measured from said cook start time.

19. The method of claim 16 wherein said received cook cycle parameter is retrieved in said retrieving step.

20. The method of claim 16 wherein said storing step comprises storing in random access memory at an installation site.

21. The method of claim 16 wherein said retrieving is from read only memory.

22. The method of claim 16 wherein said storing is storing in read only memory at the factory.

23. The method of claim 22 further comprising powering said random access memory from battery.

24. The method of claim 16 wherein said operating further comprises turning on a second heat source while said first heat source is on.

25. The method of claim 24 wherein said first heat source is a microwave and wherein said second heat source is a hot air impingement apparatus.

26. The method of claim 16 wherein said operating comprises turning on and off a plurality of heat sources multiple times.

27. The method of claim 11 wherein said operating comprises turning on a plurality of heat sources, each heat source being turned on after another heat source has been turned off.

28. The method of claim 16 further comprising transferring a package of said selected food product adjacent a heater prior to said cooking.

29. The method of claim 16 further comprising accepting money after said storing and prior to said receiving.

30. The method of claim 16 further comprising delivering said selected food product to said user on completion of said cooking.

31. The method of claim 16 further comprising indicating a time for completion of said cooking.

32. A cooking apparatus comprising:

a heat source having an input lead;

means for computing having an output terminal coupled to said heat source input lead;

means for or storage operatively coupled to said means for computing, said means for storage being encoded with a plurality of data structures, each data structure comprising a cook cycle, each cook cycle comprising cook cycle parameter representative of cooking of a food product by said heat source;

means for modifying cook cycles encoded in said means for storage, said means for modifying being coupled to said means for computing; and means for receiving a selection signal, said selection signal representing a food product selected by a user, said means for receiving a selection signal being operatively coupled to said means for computing;

wherein said means for computing reads from said means for storage a cook cycle corresponding to said selected food product and said means for computing turns on said heat source for the duration of a cook time retrieved from said corresponding cook cycle.

33. The cooking apparatus of claim 32 wherein each cook cycle comprises a cook start time, each cook start time representing a time interval measured from a common reference time.

34. The cooking apparatus of claim 32 further comprising means for receiving cook time from an operator, said means for receiving cook time being operatively coupled to said means for computing.

35. The cooking apparatus of claim 32 wherein said means for storage is random access memory.

36. The cooking apparatus of claim 35 wherein said cook time is copied into said means for storage from read only memory.

37. The cooking apparatus of claim 36 wherein said copying is performed by a start-up process.

38. The cooking apparatus of claim 32 further comprising a battery, wherein said means for storage is powered by said battery.

* * * * *